United States Patent
Eskildsen et al.

(10) Patent No.: US 7,145,455 B2
(45) Date of Patent: Dec. 5, 2006

(54) MEMS BASED SPACE SAFETY INFRARED SENSOR APPARATUS AND METHOD

(75) Inventors: Kenneth G. Eskildsen, Great Neck, NY (US); Robert E. Lee, Garden City, NY (US)

(73) Assignee: Honeywell International, Inc., Morristown, NJ (US)

( * ) Notice: Subject to any disclaimer, the term of this patent is extended or adjusted under 35 U.S.C. 154(b) by 163 days.

(21) Appl. No.: 10/920,783

(22) Filed: Aug. 18, 2004

(65) Prior Publication Data

US 2006/0038679 A1 Feb. 23, 2006

(51) Int. Cl.
G08B 13/00 (2006.01)

(52) U.S. Cl. ............... 340/541; 340/545.3; 250/338.1; 250/339.02

(58) Field of Classification Search ............... 340/541, 340/545.1, 545.3; 250/338.1, 339.02, 574
See application file for complete search history.

(56) References Cited

U.S. PATENT DOCUMENTS

| | | | |
|---|---|---|---|
| 4,238,675 A | * | 12/1980 | Turlej et al. ............... 250/353 |
| 4,258,255 A | * | 3/1981 | Guscott ...................... 250/221 |
| 4,920,268 A | * | 4/1990 | Walters et al. .............. 250/353 |
| 5,414,255 A | * | 5/1995 | Hampson .................... 250/221 |
| 5,424,718 A | * | 6/1995 | Muller et al. ............... 340/567 |

\* cited by examiner

*Primary Examiner*—Toan N. Pham
(74) *Attorney, Agent, or Firm*—Scully, Scott, Murphy & Presser, P.C.

(57) ABSTRACT

A space safety apparatus monitoring a volume of space encompassing a field of view (FOV) for detecting an intrusion including a gas or vapor, and includes a micro-electro-mechanical system (MEMS) having mirror elements in a mirror array for reflecting infra-red (IR) energy beam collected from the FOV and an IR energy detector for detecting the IR energy reflected by the MEMS array and converting the IR energy to an output signal. A processor adjusts an angle of an element of the MEMS mirror array by varying a control signal, or by switching from one to another focusing element. The method includes detection in a volume of space by positioning a MEMS mirror array to reflect IR signal with respect to active elements of an IR detector; and collecting IR energy from an $i^{th}$ portion of the FOV.

77 Claims, 38 Drawing Sheets

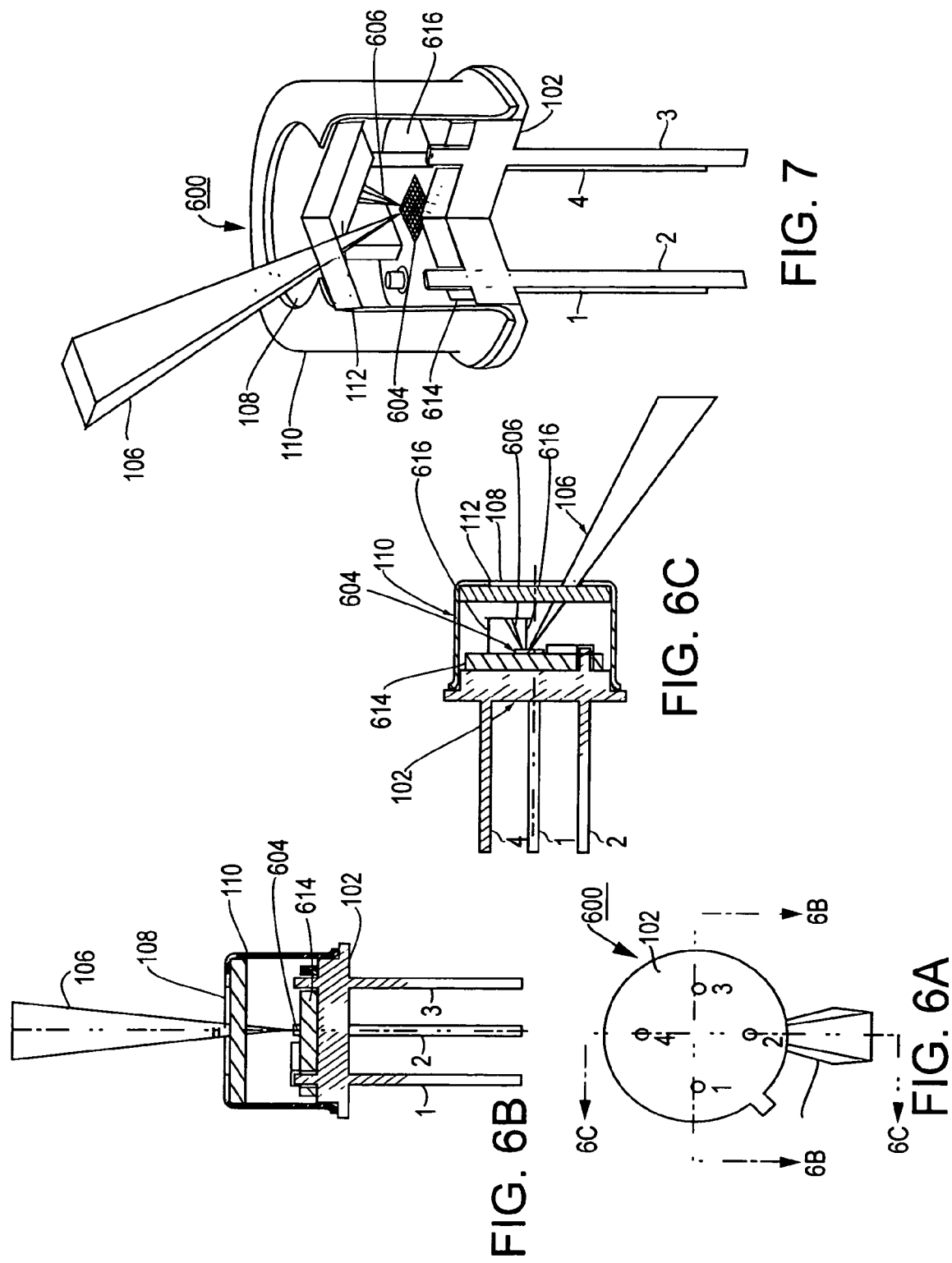

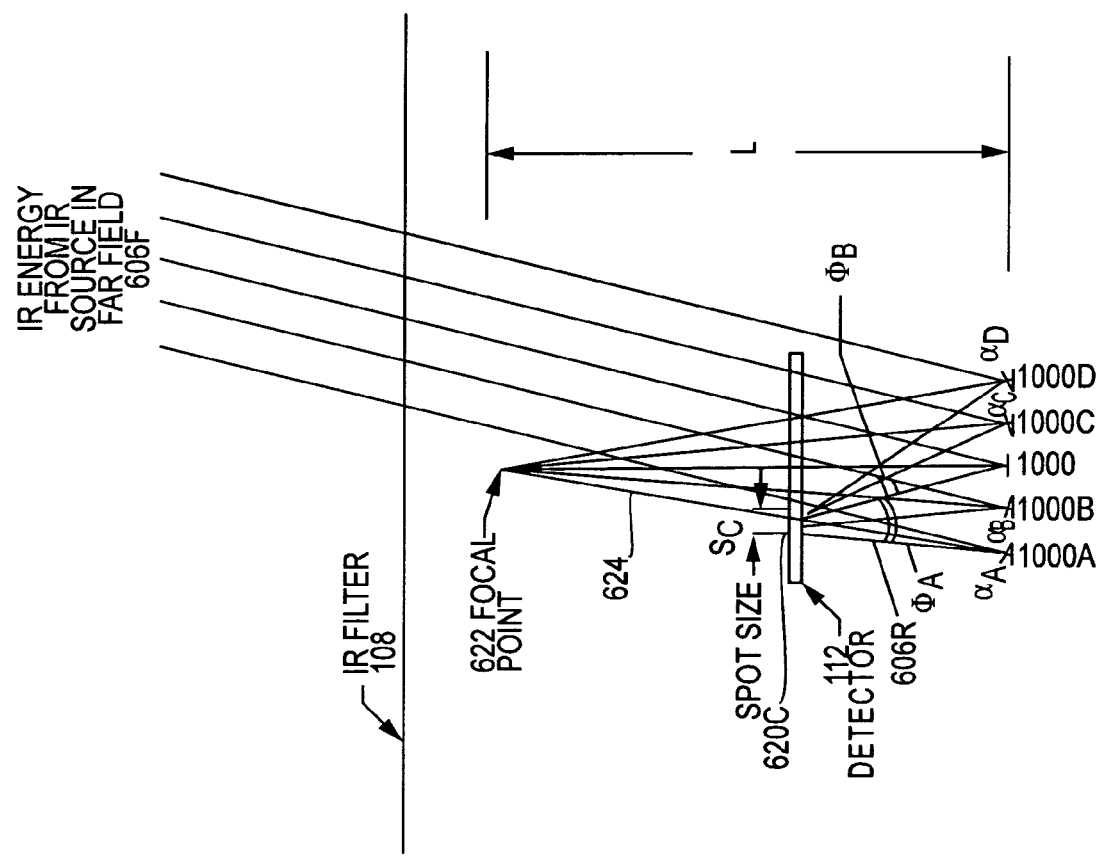

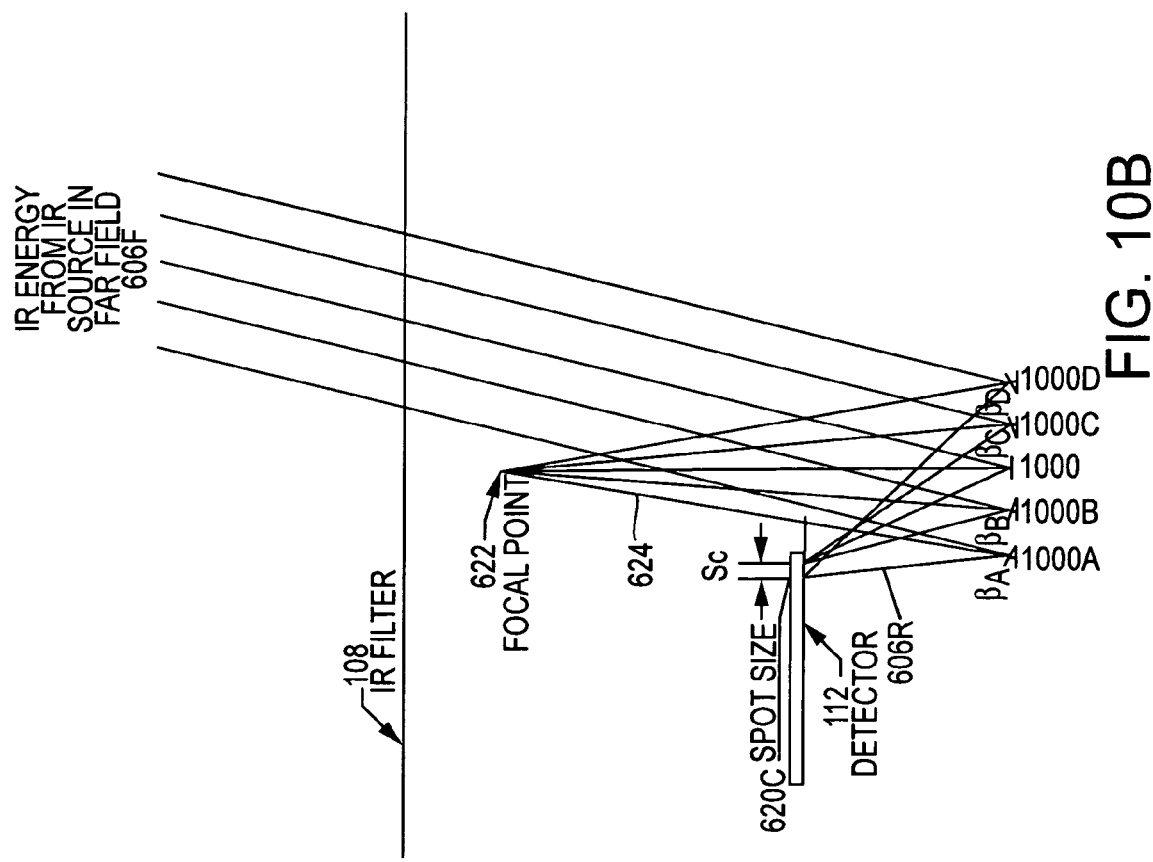

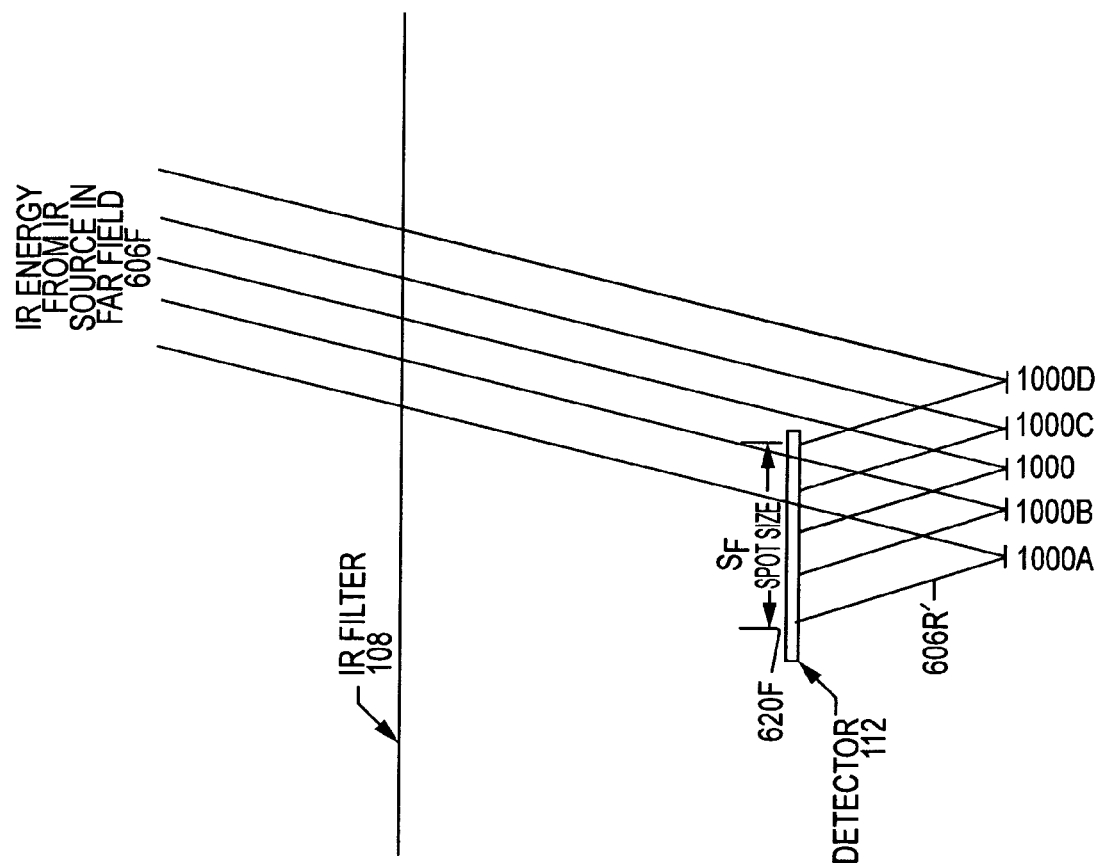

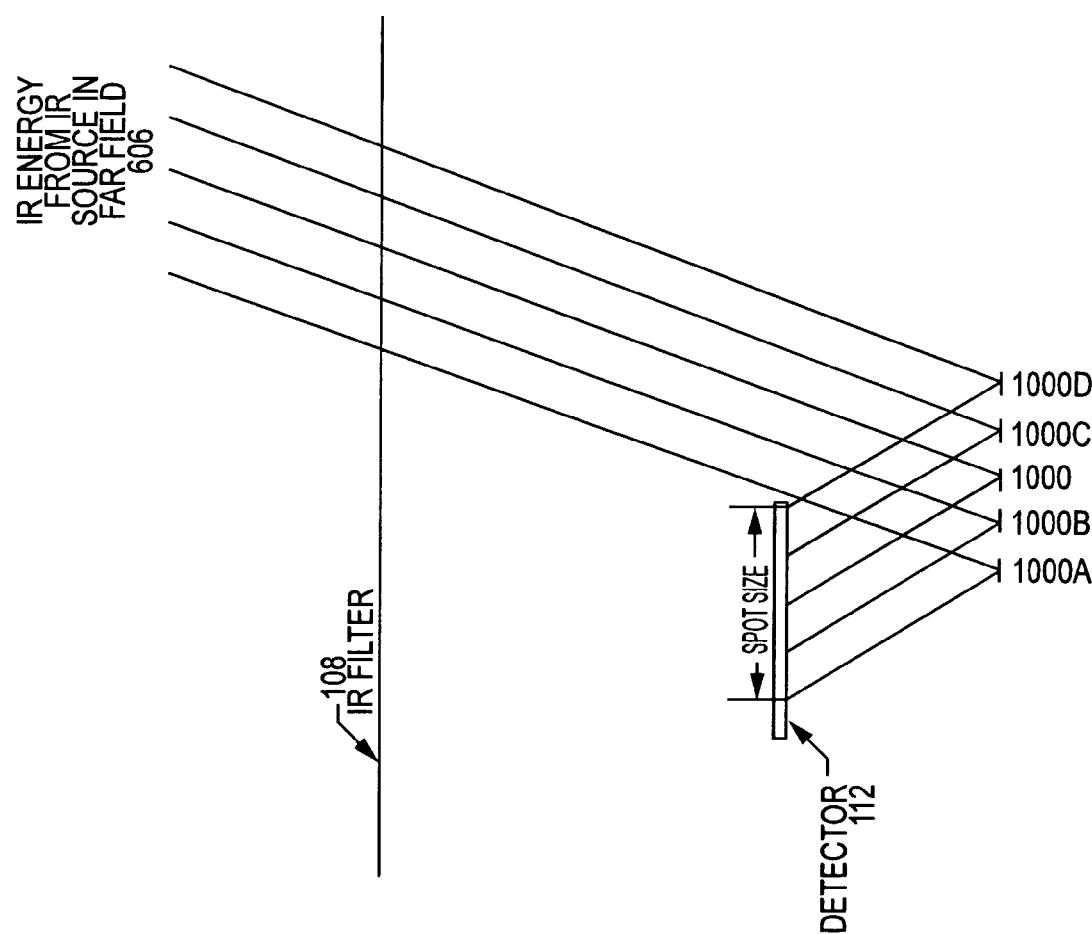

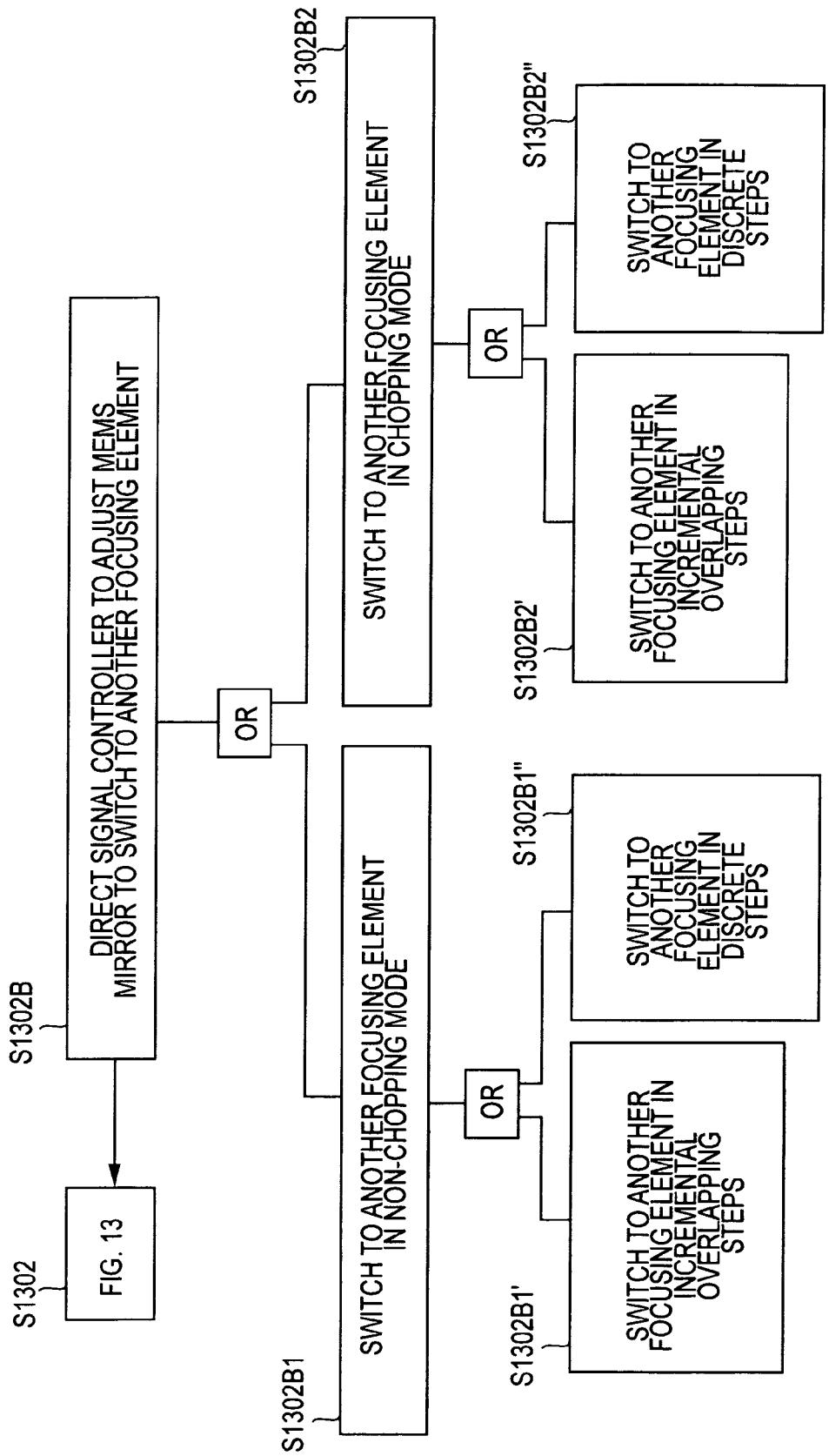

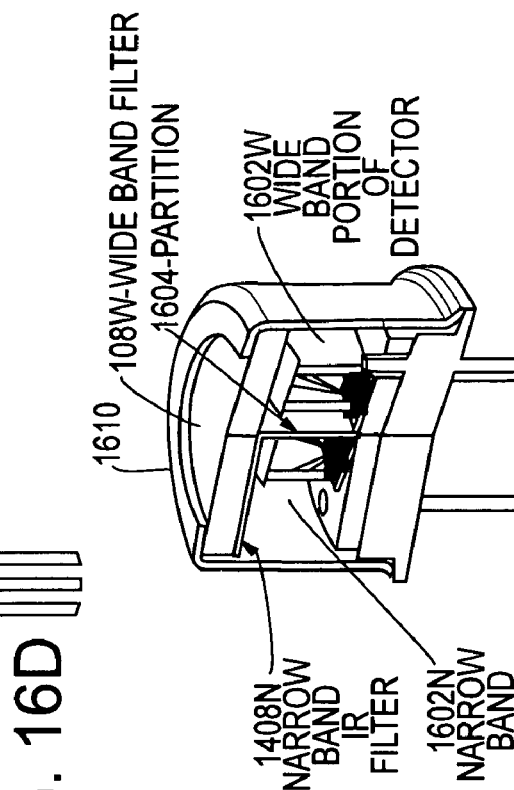
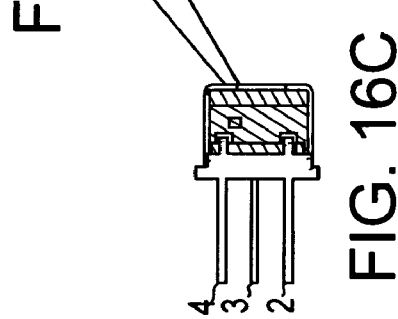
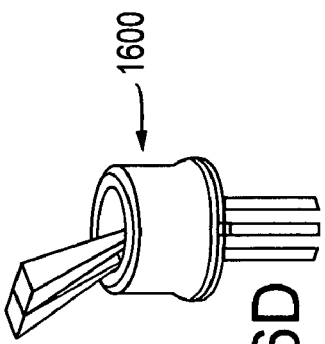
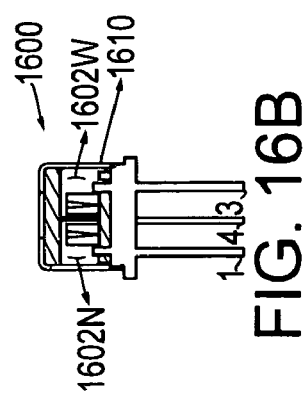
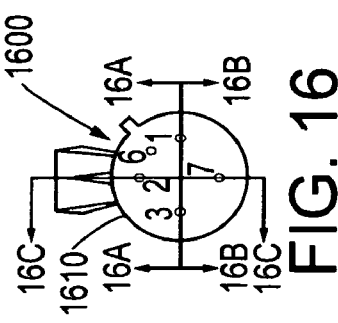
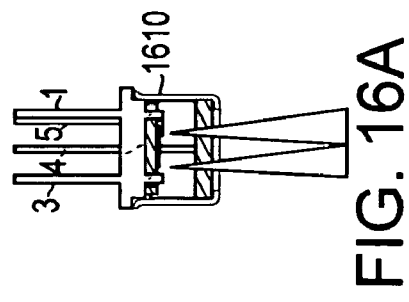

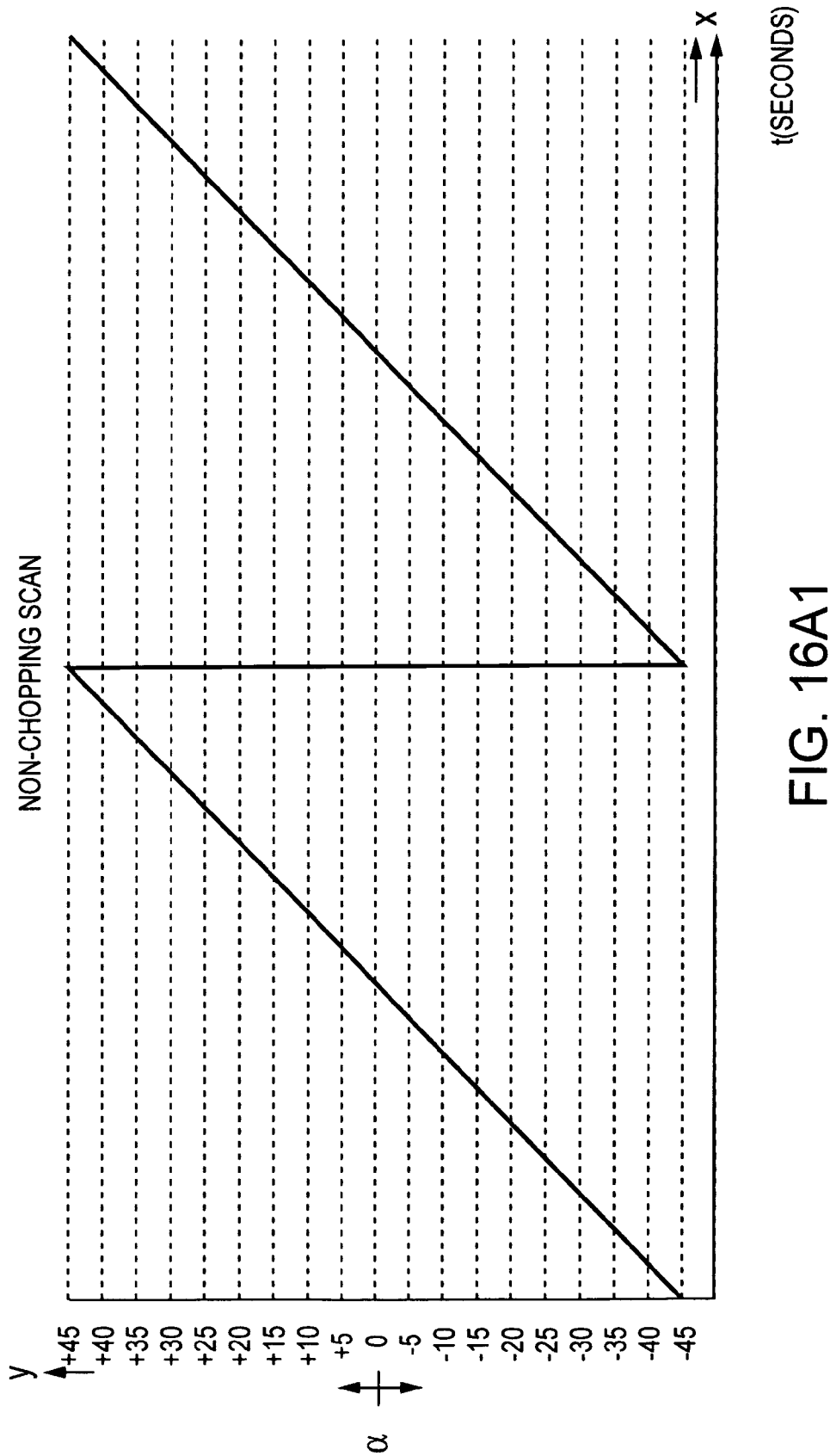
FIG. 16A1

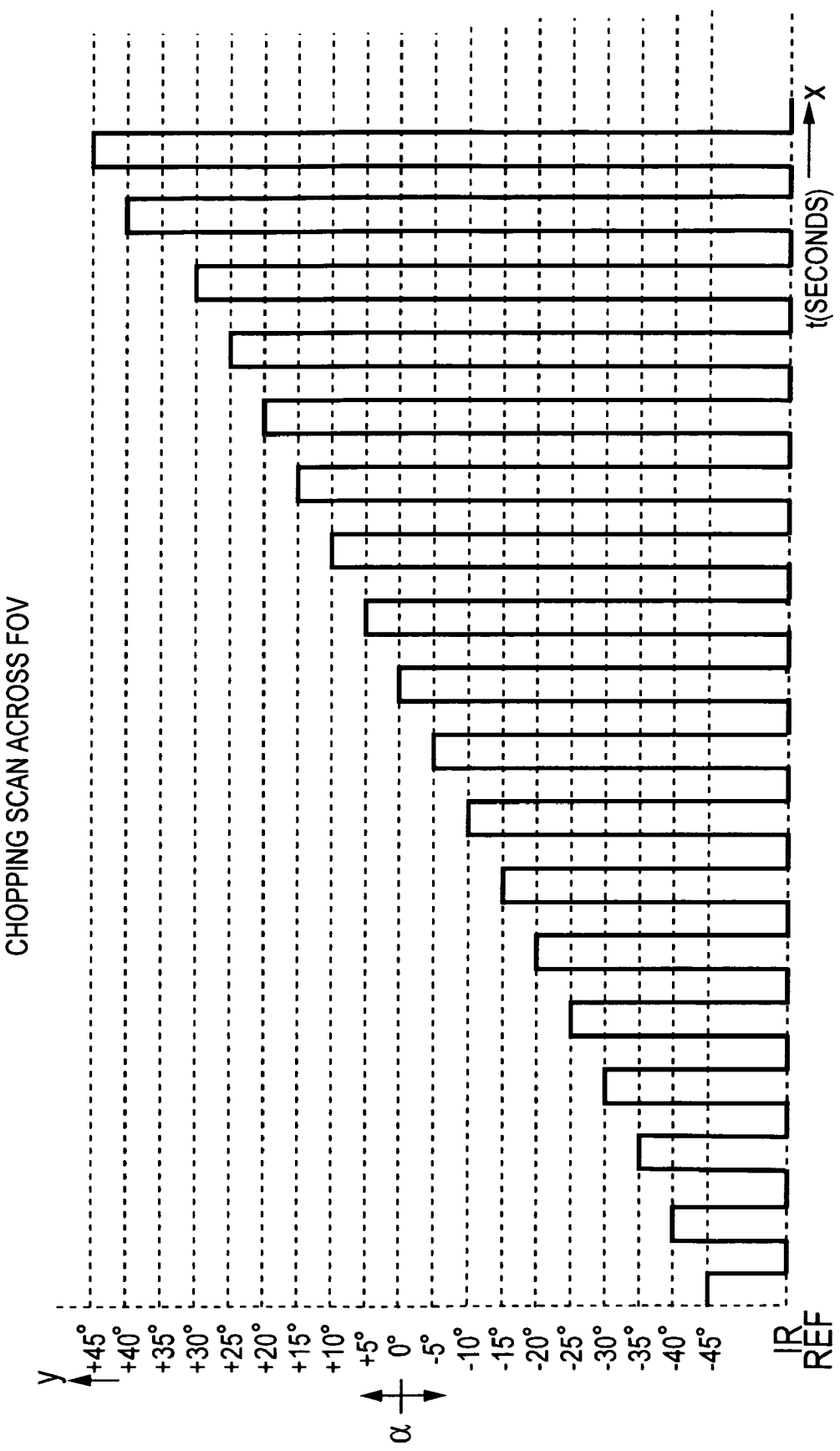
FIG. 16A2

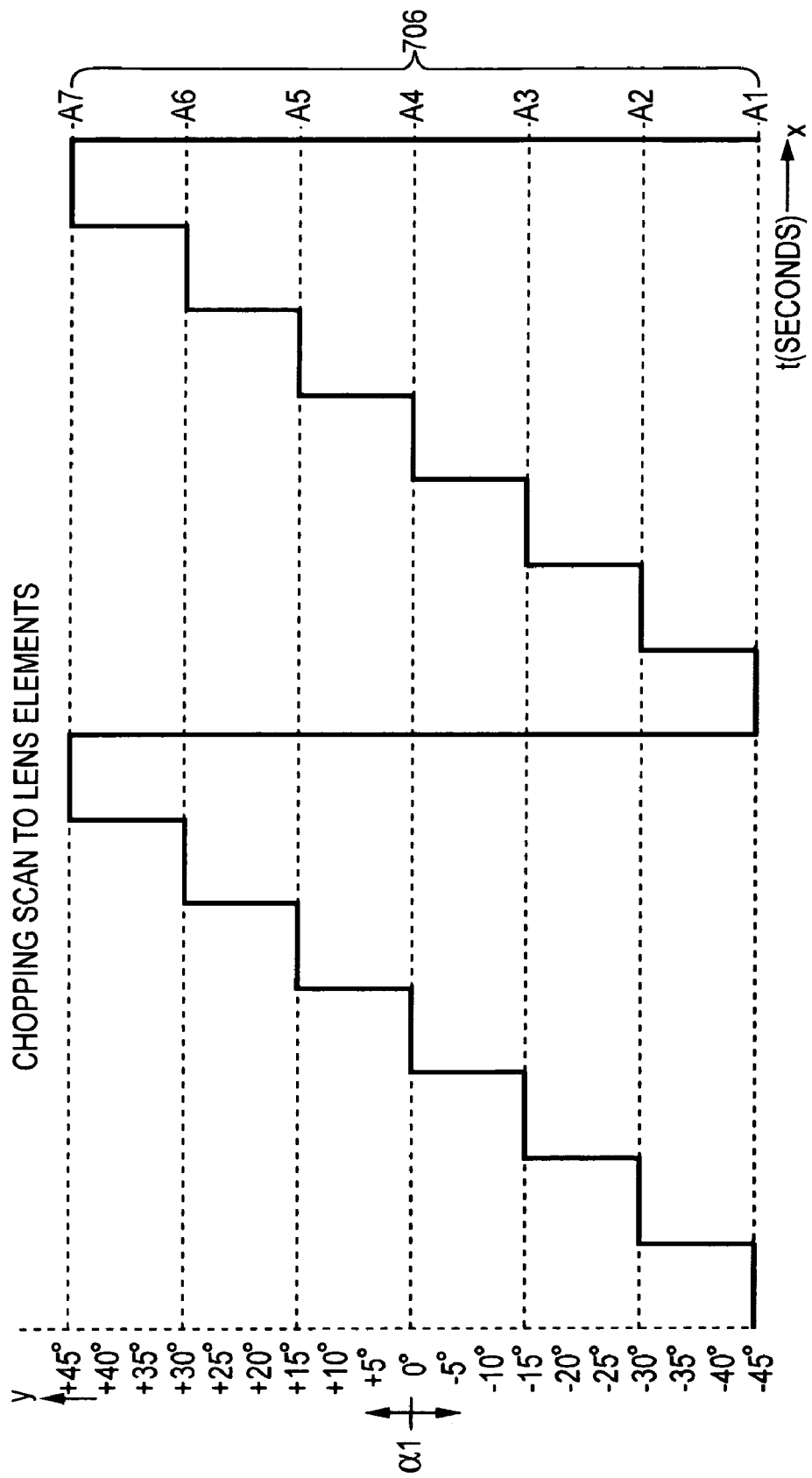
FIG. 16B1

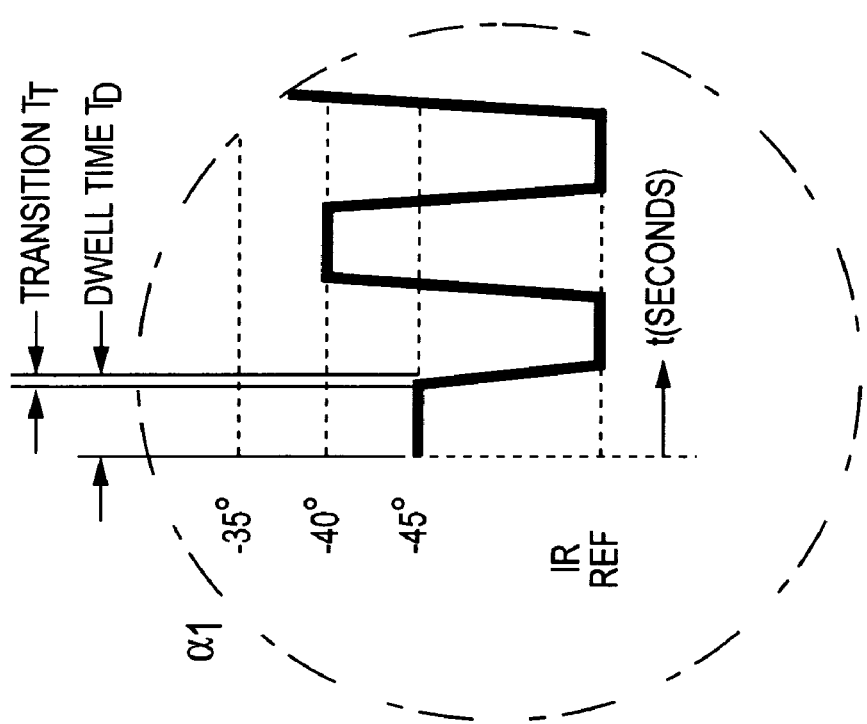
FIG. 16B2'

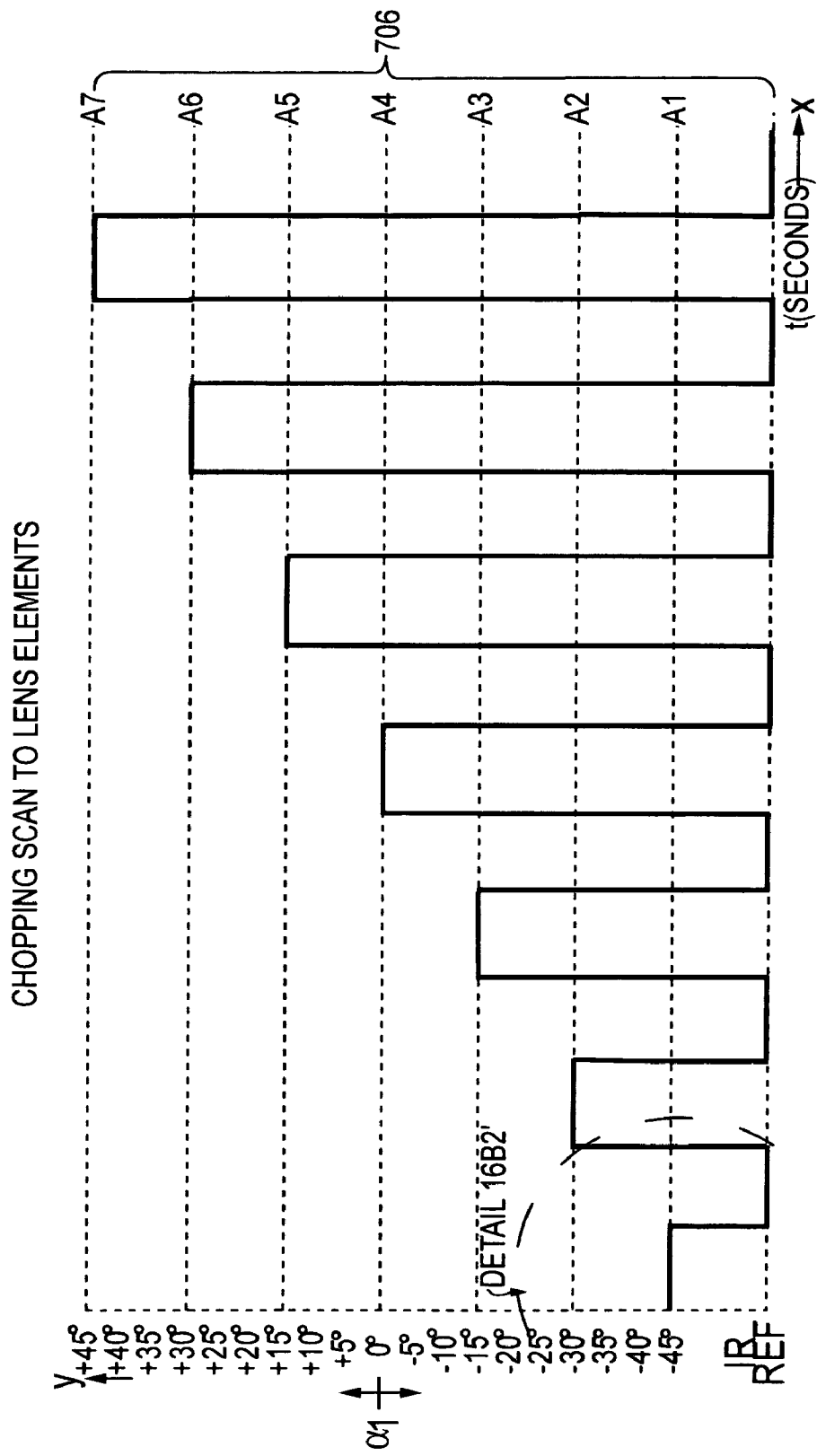
FIG. 16B2

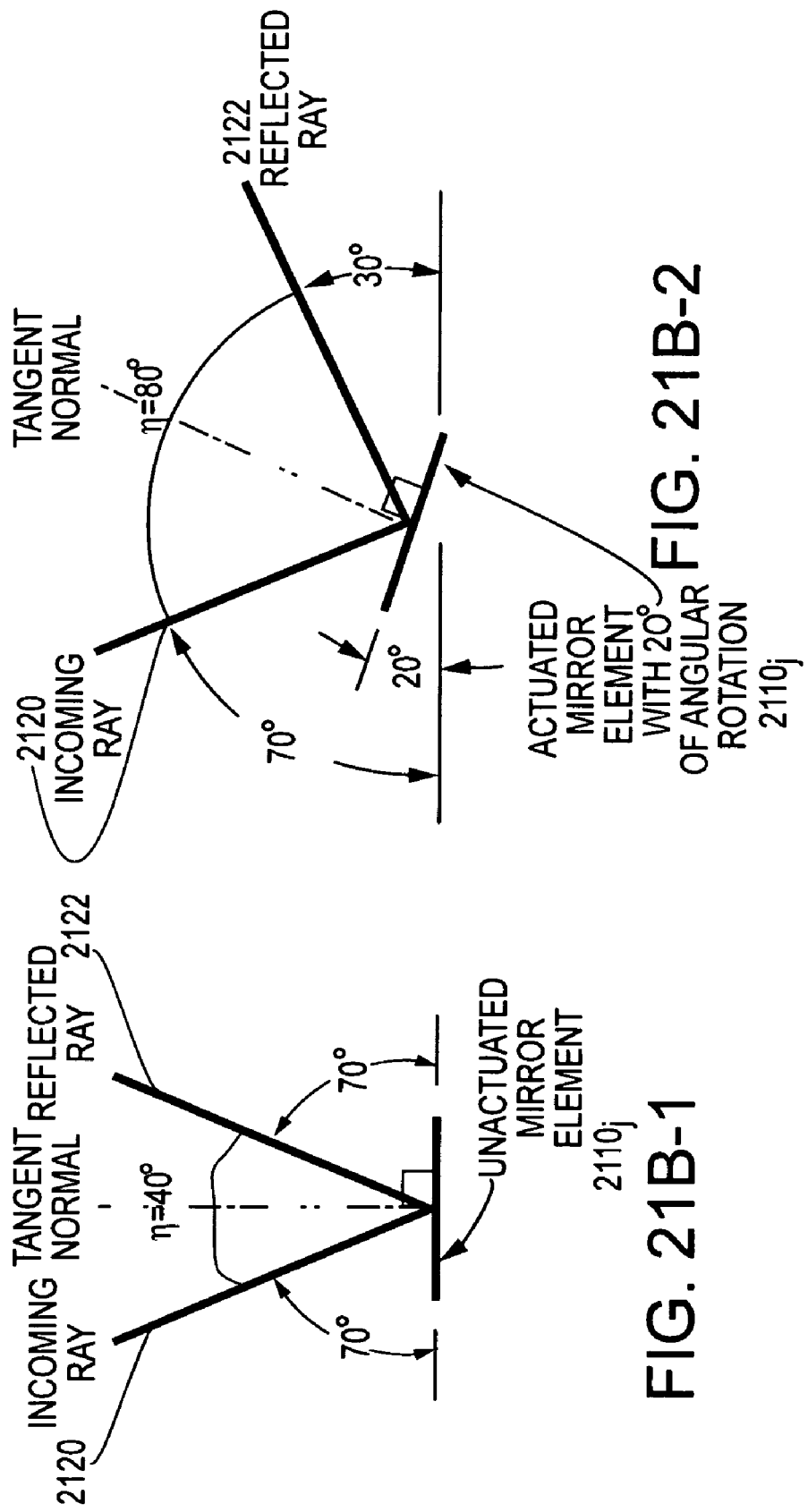

MEMS BASED SPACE SAFETY INFRARED SENSOR APPARATUS AND METHOD

BACKGROUND OF THE INVENTION

1. Field of Invention

The invention relates generally to the field of intrusion detection systems for animate, inanimate or gaseous substances relying on infrared signal detection and, more specifically, to a space safety infrared signal intrusion detection system which incorporates a micro-electro-mechanical system (MEMS) mirror array.

2. Description of Related Art

Passive infrared (IR) sensors detect intruders moving within the field of view (FOV) by measuring the temperature gradient caused by an intruder. The sensor's FOV is fixed and is determined by the optical properties of the lens or mirror system. The FOV is subdivided into static active and inactive zones; the motion of an intruder from an active to an inactive zone is detected as an alarm. The IR energy from each active zone is focused on the IR detector and the IR detector cannot determine which active zone is collecting the energy. The problem with this arrangement is that other sources of IR energy within a zone or zones can be detected as alarm signals as well. Examples include a space heater cycled on and off or a sunlit shade moving from a breeze within the detector's zones. Other sources of noise include a pet such as a small dog. Also, the inactive zones offer a path that an intruder can traverse without detection. Others have tried to solve these problems as follows: One product has an algorithm to detect repetitive motion within a zone and desensitize the detector to ignore this signal. This also desensitizes the sensor to intruders as well. Another approach uses a CCD camera to monitor the protected space and employs video processing algorithms to detect motion. The problem with this approach is that the protected space needs to be illuminated to detect the motion. Another approach uses a second lens system to minimize the inactive zones but this approach still suffers from the other shortcomings.

SUMMARY OF THE INVENTION

To address the above and other issues, the present invention is directed to a space safety apparatus monitoring a volume of space encompassing a field of view, the space safety apparatus for detecting an intrusion within the volume of space, the apparatus comprising a micro-electro-mechanical system (MEMS) having mirror elements in a mirror array for reflecting infra-red (IR) energy beam collected from the FOV; and an IR energy detector for detecting the IR energy reflected by the MEMS array and converting the IR energy to an output signal. The present invention is also directed to a method for moving the IR zone within the FOV of an intrusion protected space or volume by means of a multi-axis MEMS mirror array. This motion of the IR zone effectively scans the IR signature of the protected space or volume. The intrusion can be an effect caused by the presence within the volume of space of an animate or inanimate object, for example a robotic vehicle, or a gas or vapor.

In a particular aspect of the invention, a first embodiment of the present invention is directed to a space safety apparatus for detecting an intrusion in a volume of space comprising: a focusing element for focusing an infra-red (IR) energy beam collected from the volume of space; a filter element for filtering the infra-red (IR) energy beam collected from the volume of space; a micro-electro-mechanical system (MEMS) having mirror elements in a mirror array for reflecting the IR energy; an IR energy detector for detecting the IR energy reflected by said MEMS array and converting the IR energy to an output signal; an amplifier for amplifying the output signal; an analog to digital converter for converting the output signal from analog to digital; a processor for processing the output signal, a memory storage for storing the output signal; a controller for adjusting an angle of at least one element of said MEMS mirror array; and an alarm for annunciating detection of an intrusion resulting from a change in amplitude of the output signal corresponding to a change in amplitude of the IR energy beam. The output signal can be one of electrical, magnetic, optical, acoustical, pneumatic and hydraulic pressure. The controller can adjust an angle by varying a control signal to said at least one element of said MEMS mirror array. The control signal can be one of electrical, magnetic, optical, acoustical, pneumatic and hydraulic pressure. The controller can derive a reference signal by switching said MEMS mirror array between the FOV and an IR reference. Varying an electrical control signal to said MEMS mirror array can cause motion of at least one mirror element of said MEMS mirror array, the motion being by at least one of thermal expansion and electrostatic force. The controller can actuate the MEMS mirror array to traverse the FOV of said IR detection apparatus by traversing the FOV in a non-chopping mode, either in incremental, overlapping steps or in discrete, finite steps.

The controller can actuate the MEMS mirror array to traverse the FOV of said IR detection apparatus by traversing the FOV in a chopping mode, either in incremental, overlapping steps or in discrete, finite steps. The space safety apparatus can further comprise an IR source providing a reference value for detecting at least one of tampering with and degradation of said space safety apparatus. The MEMS mirror array can be comprised of mirror elements each capable of rotation to simulate a finite element representation of a curved mirror or the mirror elements can be configured to simulate a finite element representation of a flat mirror.

A detector assembly of the first embodiment can comprise: said filter element; said MEMS mirror array disposed on a ceramic substrate; and said IR energy detector disposed to detect the IR energy reflected by said MEMS array. The detector assembly can further comprise: a detector assembly housing enclosing at least said filter element; said MEMS mirror array disposed on a ceramic substrate; said JR energy detector disposed to detect the IR energy reflected by said MEMS array; and a detector assembly housing base for coupling to said detector assembly housing. The detector assembly housing base can further comprise at least four pins for coupling to a printed circuit board, at least one of said pins receives power, one of said pins is a ground one of said pins sends a signal, and one of said pins provides MEMS mirror array control signal. The detector assembly can be coupled to a printed circuit board. The printed circuit board can comprise: said amplifier; said analog to digital converter; said processor; said memory storage; said controller for adjusting an angle of at least one mirror element of said MEMS mirror array; and said alarm for annunciating detection of an intrusion. The printed circuit board and said detector assembly can be disposed within an enclosure housing and disposed on an enclosure base for coupling to said enclosure housing such that said MEMS mirror array within said detector assembly can receive the IR energy through a window within said enclosure housing. The window can be comprised of a focusing element for focusing the IR energy. The detector assembly can be disposed on said printed circuit board such that said MEMS mirror array within said detector assembly is parallel to said printed circuit board and said printed circuit board is disposed at an angle of about 10° with respect to said enclosure base. The enclosure housing can further comprise an IR source disposed in proximity to said window such that said MEMS mirror array can receive and reflect IR energy from said IR source onto said IR detector elements, said IR source providing a reference value for detecting at least one of tampering with and degradation of said space safety apparatus.

In another aspect of the invention, a second embodiment of the present invention is directed to a space safety apparatus for detecting an intrusion in a volume of space comprising: a plurality of focusing elements for focusing infrared (IR) energy collected from within the volume of space; a filter element for filtering the IR energy collected from within the volume of space; a micro-electro-mechanical system (MEMS) mirror array for reflecting the IR energy; an IR energy detector for detecting the IR energy reflected by said MEMS array and converting the IR energy to an output signal; an amplifier for amplifying the output signal; an analog to digital converter for converting the output signal from analog to digital; a processor for processing the output signal, a memory storage for storing the output signal; a controller for adjusting said MEMS array by switching from one to another of said plurality of focusing elements; and an alarm for annunciating detection of an intrusion resulting from a change in amplitude of the output signal corresponding to a change in amplitude of the IR energy beam. The output signal can be one of electrical, magnetic, optical, acoustical, pneumatic and hydraulic pressure. The controller can derive a reference signal by switching said MEMS mirror array between the FOV and an IR reference. The plurality of focusing elements can comprise at least one of (a) a lens element, and (b) a mirror focusing element. The controller can adjust the MEMS array by switching from one to another of said plurality of focusing elements by traversing the FOV either in incremental, overlapping steps or in discrete, finite steps.

The controller can actuate the MEMS mirror array to traverse the FOV of said IR detection apparatus by traversing the FOV in a chopping mode, either in incremental, overlapping steps or in discrete, finite steps. The space safety apparatus can further comprise an IR source providing a reference value for detecting at least one of tampering with and degradation of said space safety apparatus. The MEMS mirror array can be comprised of mirror elements each capable of rotation to simulate a finite element representation of a curved mirror or the mirror elements can be configured to simulate a finite element representation of a flat mirror.

A detector assembly of the second embodiment can comprise: said filter element; said plurality of focusing elements; said MEMS mirror array disposed on a ceramic substrate; and said IR energy beam detector disposed to detect the passive IR beam reflected by said MEMS array. The detector assembly can further comprise: a detector assembly housing enclosing at least said plurality of focusing elements; said filter element; said MEMS mirror array disposed on a ceramic substrate; and said IR energy detector disposed to detect the IR energy reflected by said MEMS array; and a detector assembly housing base for coupling to said detector assembly housing. The detector assembly housing base further comprises at least four pins for coupling to a printed circuit board, at least one of said pins receives power, one of said pins is a ground, one of said pins sends a signal, and one of said pins provides MEMS control signal. The detector assembly can be coupled to a printed circuit board. The printed circuit board can comprise: said amplifier; said analog to digital converter; said processor; said memory storage; said controller for adjusting of said MEMS mirror array; and said alarm for annunciating detection of an intrusion. The printed circuit board and said detector assembly can be disposed within an enclosure housing and disposed on an enclosure base for coupling to said enclosure housing such that said MEMS mirror array within said detector assembly can receive the IR energy beam through a window within said enclosure housing. The window can be comprised of a focusing element for focusing the IR energy. The detector assembly can be disposed on said printed circuit board such that said MEMS mirror array within said detector assembly is parallel to said printed circuit board and said printed circuit board is disposed at an angle of about 10° with respect to said enclosure base. The enclosure housing can further comprise an IR source disposed in proximity to said window such that said MEMS mirror array can receive and reflect IR energy from said IR source onto said IR detector elements, said IR source providing a reference value for detecting at least one of tampering with and degradation of said space safety apparatus.

In yet another aspect of the invention, a third embodiment of the present invention is directed to a space safety apparatus where the space safety apparatus is for detecting an intrusion within a volume of space encompassing a FOV, wherein the intrusion is a gas or vapor in the volume of space encompassing the FOV, wherein the FOV comprises: an infra-red (IR) energy reference source emitting an IR energy beam; an air path from the volume of space providing a potential gas or vapor sample to be detected and through which the IR energy beam passes; a collimating lens between the IR energy source and the air path for collimating the IR energy beam emitted by said IR energy reference source; a focusing element for focusing the collimated IR energy beam from the air path; the space safety apparatus further comprising a narrow band bandpass filter element for filtering the collimated IR energy beam, the IR energy beam passing through said air path prior to passing through said narrow band filter element; a micro-electro-mechanical system (MEMS) mirror array for reflecting the narrow band IR energy beam from said narrow band bandpass filter; an IR energy detector for detecting a change in the narrow band IR energy beam reflected by said MEMS array and converting the narrow band IR energy beam to an output signal; an amplifier for amplifying the output signal from the narrow band detector; an analog to digital converter for converting the output signal from the narrow band detector from analog to digital; a processor for processing the output signal from the narrow band detector; a memory storage for storing the output signal from the narrow band detector; a wide band bandpass filter element for filtering the collimated IR energy beam, the IR energy beam passing through said air path prior to passing through said wide band filter element; a micro-electro-mechanical system (MEMS) mirror array for reflecting the wide band IR energy beam from said wide band bandpass filter; an IR energy detector for detecting the wide band IR energy beam reflected by said MEMS array and converting the wide band IR energy beam to an output signal, said IR energy detector for detecting the wide band IR energy beam; an amplifier for amplifying the output signal from the wide band detector; an analog to digital converter for converting the output signal from the wide band detector from analog to digital; a processor for processing the output signal from the wide band detector; a memory storage for storing the output signal from the wide band detector; an IR reference enabling a reference signal to be derived by switching said MEMS mirror array between the IR Source and said IR reference; a controller for adjusting an angle of at least one element of said MEMS mirror array; and an alarm for annunciating detection of a gas or vapor in response to a change in output signal corresponding to a change in the ratio of the IR energy beams received from said narrow band detector. The output signal can be one of electrical, magnetic, optical, acoustical, pneumatic and hydraulic pressure. The controller can adjust an angle by varying a control signal to said at least one mirror element of said MEMS mirror array. Varying a control signal to said MEMS mirror array causes motion of at least one mirror element of said MEMS mirror array, varying an electrical control signal causing motion by at least one of thermal expansion and electrostatic force. The controller can actuate said MEMS mirror array to traverse the FOV of said IR detection apparatus by traversing the FOV in a chopping mode, the traversing of the FOV in a chopping mode can be achieved by traversing the FOV in incremental, overlapping steps or in discrete, finite steps. The space safety apparatus for detecting a gas or vapor can further comprise an IR source providing a reference value for detecting at least one of tampering with and degradation of said space safety apparatus. The MEMS mirror array can be comprised of mirror elements each capable of rotation to simulate a finite element representation of a curved mirror or configured to simulate a finite element representation of a flat mirror.

A detector assembly of the third embodiment can comprise: at least one of said narrow band filter element and said wide band filter element; at least one of said narrow band and said wide band MEMS mirror array disposed on a ceramic substrate; and said IR energy beam detector disposed to detect the IR beam reflected by said MEMS array. The detector assembly can further comprise: a detector assembly housing enclosing at least one of said narrow band and said wide band IR filter element; at least one of said narrow band and said wide band said MEMS mirror array disposed on a ceramic substrate and disposed to detect the IR beam reflected by said MEMS array and a detector assembly housing base for coupling to said detector assembly housing. The detector assembly can comprise both said narrow and said wide band IR energy beam detectors, and a partition can separate the narrow band IR energy beam detector from the wide band IR energy beam detector; or the detector assembly can comprise both said narrow band and said wide band MEMS mirror arrays, and a partition can separate the narrow band MEMS mirror array from the wide band MEMS mirror array; or the detector assembly can comprise both said narrow band and wide band filter elements, and a partition can separate the narrow band filter element from the wide band filter element. The detector assembly housing base can further comprise at least five pins for coupling to a printed circuit board, one of said pins receiving power, one of said pins being a ground, one of said pins sends a signal from said narrow band IR detector, one of said pins sends a signal from said wide band IR detector, and one of said pins provides MEMS control signal. The detector assembly can be coupled to a printed circuit board, the printed circuit board can comprise: at least one of said amplifiers; at least one of said analog to digital converters; said processor; said memory storage; said controller; and said alarm for annunciating detection of the gas or vapor in response to the ratio of the output signals from the narrow band and wide band detectors. The printed circuit board and said detector assembly can be disposed within an enclosure housing and disposed on an enclosure base for coupling to said enclosure housing such that said at least one MEMS mirror array within said detector assembly can receive the IR energy beam through a window within said enclosure housing. The detector assembly can be disposed on said printed circuit board such that said MEMS mirror array within said detector assembly is parallel to said printed circuit board and said printed circuit board is disposed at an angle of about 30° to 45° with respect to said enclosure base. The window can be comprised of a focusing element for focusing the IR energy beam. The enclosure housing can further comprise an IR source disposed in proximity to said window such that said MEMS mirror array can receive and reflect IR energy from said IR source onto said IR detector elements. The IR source can provide a reference value for detecting at least one of tampering with and degradation of said gas or vapor detection apparatus. The output signal filtered by the narrow band filter can comprise a plurality of peak values. The ratio of narrow band to wide band detector when less than one indicates the presence of a gas or vapor within the air path. When the ratio is close to unit, it indicates a change in the output power of the IR source or a change in ambient lighting.

In yet another aspect of the invention, a fourth embodiment of the present invention is directed to a space safety apparatus for detecting an intrusion within a volume of space encompassing a FOV, wherein the intrusion is a gas or vapor in the volume of space encompassing the FOV, wherein the FOV comprises: an infra-red (IR) energy reference source emitting an IR energy beam; an air path from the volume of space providing a potential gas or vapor sample to be detected and through which the IR energy beam passes; a collimating lens between the IR energy source and the air path for collimating the IR energy beam emitted by said IR energy reference source; and a plurality of focusing elements for focusing the collimated IR energy beam from the air path, the space safety apparatus further comprising a narrow band bandpass filter element for filtering the collimated IR energy beam, the IR energy beam passing through said air path prior to passing through said narrow band filter element; a micro-electro-mechanical system (MEMS) mirror array for reflecting the narrow band IR energy beam from said narrow band bandpass filter; an IR energy detector for detecting a decrease in the narrow band IR energy beam reflected by said MEMS array and converting the narrow band IR energy beam to an output signal; an amplifier for amplifying the output signal from the narrow band detector; an analog to digital converter for converting the output signal from the narrow band detector from analog to digital; a processor for processing the output signal from the narrow band detector; a memory storage for storing the output signal from the narrow band detector; a wide band bandpass filter element for filtering the collimated IR energy beam, the IR energy beam passing through said air path prior to passing through said wide band filter element; a micro-electro-mechanical system (MEMS) mirror array for reflecting the wide band IR energy beam from said wide band bandpass filter; an IR energy detector for detecting the wide band IR energy beam reflected by said MEMS array and converting the wide band IR energy beam to an output signal, said IR energy detector for detecting the wide band IR energy beam; an amplifier for amplifying the output signal from the wide band detector; an analog to digital converter for converting the output signal from the wide band detector from analog to digital; a processor for processing the output signal from the wide band detector; a memory storage for storing the output signal from the wide band detector; an IR reference enabling a reference signal to be derived by switching said MEMS mirror array between the IR source and said IR reference; a controller for adjusting said MEMS array by switching between focusing elements in a chopping mode alternating between said IR source and said IR reference; and an alarm for annunciating detection of a gas or vapor in response to a change in output signal corresponding to a change in the IR energy beam received from said narrow band detector. The output signal can be one of electrical, magnetic, optical, acoustical, pneumatic and hydraulic pressure. The focusing element can be at least one of (a) a lens element and (b) a mirror focusing element. The controller can actuate said MEMS mirror array to switch between focusing elements in a chopping mode between focusing elements in incremental, overlapping steps or in discrete, finite steps. The space safety apparatus for detecting a gas or vapor can further comprise an IR source providing a reference value for detecting at least one of tampering with and degradation of said space safety apparatus. The MEMS mirror array can be comprised of mirror elements each capable of rotation to simulate a finite element representation of a curved mirror or configured to simulate a finite element representation of a flat mirror.

A detector assembly of the fourth embodiment can comprise: at least one of said narrow band and said wide band filter elements; at least one of said narrow band and said wide band MEMS mirror array disposed on a ceramic substrate; and said IR energy beam detector disposed to detect the IR beam reflected by said MEMS array. The detector assembly can further comprise: a detector assembly housing enclosing at least one of said narrow band filter element and said wide band filter element; at least one of said narrow band and wide band MEMS mirror arrays disposed on a ceramic substrate; and at least one of said narrow band and wide band IR energy beam detectors disposed to detect the IR energy reflected by said MEMS array; and a detector assembly housing base for coupling to said detector assembly housing. The detector assembly can comprise both said narrow and said wide band IR energy beam detectors, and a partition can separate the narrow band IR energy beam detector from the wide band IR energy beam detector; or the detector assembly can comprise both said narrow band and said wide band MEMS mirror arrays, and a partition can separate the narrow band MEMS mirror array from the wide band MEMS mirror array; or the detector assembly can comprise both said narrow band and wide band filter elements, and a partition can separate the narrow band filter element from the wide band filter element. The detector assembly housing base can further comprise at least five pins for coupling to a printed circuit board, one of said pins receiving power, one of said pins being a ground, one of said pins sends a signal from said narrow band detector, and one of said pins sends a signal from said wide band detector. The detector assembly can be coupled to a printed circuit board, the printed circuit board can comprise: at least one of said amplifiers; at least one of said analog to digital converters; said processor; said memory storage; said controller; and said alarm for annunciating detection of an intrusion in response to the output signal. The printed circuit board and said detector assembly can be disposed within an enclosure housing and disposed on an enclosure base for coupling to said enclosure housing such that said at least one MEMS mirror array within said detector assembly can receive the IR energy beam through a window within said enclosure housing. The detector assembly can be disposed on said printed circuit board such that said MEMS mirror array within said detector assembly is parallel to said printed circuit board and said printed circuit board is disposed at an angle of about 30° to 45° with respect to said enclosure base. The window can be comprised of a focusing element for focusing the IR energy beam. The enclosure housing can further comprise an IR source disposed in proximity to said window such that said MEMS mirror array can receive and reflect IR energy from said IR source onto said IR detector elements. The IR source can provide a reference value for detecting at least one of tampering with and degradation of said gas or vapor detection apparatus.

In both the third and fourth embodiments, the processor calculates the ratio of the instantaneous peak values of the output signal of the narrow band detector to the instantaneous peak values of the output signal of the wide band detector during a given time period. The processor can also calculate the ratio of the average of the instantaneous peak values of the output signal of the narrow band IR detector to the average of the instantaneous peak values of the output signal of the wide band IR detector during a given time period. The processor can also average the ratios of the instantaneous peak values of the output signal of the narrow band IR detector to the instantaneous peak values of the wide band IR detector during a given time period. In all cases, occurrence of ratios having a value significantly less than one (1) during the given time period indicates concentration of a gas or vapor within the air path and occurrence of ratios having a value close to one (1) during the given time period indicates a shift in at least one of IR output and ambient light to enable self-calibration of the narrow band and wide band IR detectors by the processor. The magnitude of the ratios calculated is proportional to the concentration of gas or vapor present. The magnitude of the ratio of the signal drop indicates the percentage of gas present.

In a method of detecting an intrusion in a volume of space encompassing a field of view (FOV), the method comprises the steps of: a) positioning a micro-electro-mechanical system (MEMS) mirror array of rows and columns of mirror elements to reflect an infra-red (IR) energy beam with respect to active elements of an IR detector corresponding to the FOV; and b) collecting the IR energy from an $i^{th}$ portion of the FOV at a pre-determined scan rate. The step (b) of collecting the IR energy from an $i^{th}$ portion of the FOV at a pre-determined scan rate can comprise the steps of: (b'1) focusing the IR energy beam; (b'2) filtering the IR energy beam; (b'3) reflecting the IR energy beam by the MEMS mirror array onto a detector; (b,4) detecting the IR energy beam by means of the detector; (b,5) converting the IR energy beam to an output signal; (b'6) amplifying the output signal; (b'7) converting the output signal from analog to digital; and (b'8) processing the output signal by means of a processor prior to annunciating detection. The output signal can be one of electrical, magnetic, optical, acoustical, pneumatic and hydraulic pressure. The method can further comprise the step of: (b'9) controlling the MEMS mirror array to measure all mirror array elements corresponding to the entire FOV by scanning. The method of detecting an intrusion can further comprise the steps of: (c) determining whether all mirror array elements have been measured; d1) if no, repeating step (b); d2) if yes, storing the scan of the mirror array elements; e) processing the results of the scan; f) determining if an intrusion has been detected based on the results of the scan by detecting a change in the IR energy beam level; g1) if yes, annunciating an alarm; g2) if maybe, returning to step (b) of collecting IR energy from an $i^{th}$ portion of a field of view (FOV) by re-scanning a limited volume of the space where an intrusion appears to be detected, and g3) if no, returning to step (b). The method the step (b) of collecting the IR energy from an $i^{th}$ portion of the FOV can further include the steps of at least one of: b1') actuating the MEMS mirror to traverse the FOV; and b1") directing a signal controller to adjust the MEMS mirror to switch from one to another focusing element. At least one of the step (b1') of actuating the MEMS mirror to traverse the FOV, and (b1") directing a signal controller to adjust the MEMS mirror to switch from one to another focusing element can include the steps of at least one of: (b2) traversing the FOV in a non-chopping mode, and (b3) traversing the FOV in a chopping mode. The step (b2) of traversing the FOV in a non-chopping mode can include the steps of at least one of: (b2') traversing the FOV in incremental, overlapping steps; and (b2") traversing the FOV in discrete, finite steps. The step (b3) of traversing the FOV in a chopping mode can include the steps of at least one of: (b3') traversing the FOV in incremental, overlapping steps; and (b3") traversing the FOV in discrete, finite steps. The step (b) of collecting the IR energy from an $i^{th}$ portion of the FOV can include the step of: (b4) adjusting an angle of at least one mirror element of said MEMS mirror array, wherein the step (b4) of adjusting an angle includes the step of: (b5) varying a control signal to said at least one element of said MEMS mirror array. The control signal can be one of electrical, magnetic, optical, acoustic, pneumatic and hydraulic pressure. The step (b5) of varying a control signal to said at least one element of said MEMS mirror array can cause motion of said at least one mirror element of said MEMS mirror array, said step (b5) of varying of a control signal can cause motion by at least one of thermal expansion and electrostatic force. The focusing element can comprise at least one of (a) a lens element; and (b) a mirror focusing element. The step of (g2) of re-scanning a limited volume of the space where an intrusion appears to be detected can include the steps of at least one of: (g2') re-scanning at the pre-determined scan rate; and (g2") re-scanning at a different scan rate. The step (b2) of traversing the FOV in a non-chopping mode can produce an output signal with a peak value, such that a shift in the peak value indicates movement of a heat source within the FOV. The step (b3) of traversing the FOV in a chopping mode can produce an output signal with a plurality of peak values, such that a shift in amplitude of at least one of the plurality of peak values indicates movement of a heat source within the FOV.

In a method of detecting an intrusion within a volume of space encompassing a FOV, wherein the intrusion is a gas or vapor in the volume of space encompassing the FOV, the method comprises the steps of: (a)positioning a micro-electro-mechanical system (MEMS) mirror array to reflect a collimated infra-red (IR) energy beam with respect to active elements of an IR detector, a portion of the collimated beam filtered by a narrow IR band bandpass filter, a portion of the collimated beam filtered by a wide IR band bandpass filter, an IR energy source disposed at a distal end of the air path with respect to the MEMS mirror array; (b) measuring, at a pre-determined scan rate, the IR energy of the IR heat source at the distal end of the air path through the narrow IR band bandpass filter and a narrow IR band detector; (c) measuring, at the pre-determined scan rate, the temperature of a point at a known reference temperature in the MEMS mirror array through the narrow IR band bandpass filter and a narrow IR band detector; (d) measuring, at the pre-determined scan rate, the IR energy of said IR heat source at the distal end of the air path through the wide IR band bandpass filter and the wide IR band detector; (e) measuring, at the pre-determined scan rate, the temperature of a point at a known reference temperature in the MEMS mirror array through the wide IR band bandpass filter and the wide IR band detector; (f)measuring the IR energy beam received by the detector with the wideband filter. The step (c) of measuring, at the pre-determined scan rate, the temperature of a point at a known reference temperature in the MEMS mirror array through the narrow IR band bandpass filter and a narrow IR band detector and (d) of measuring, at the pre-determined scan rate, the energy of an IR heat source in the air path through the wide IR band bandpass filter and the wide IR band detector can each comprise the steps of: (b1) focusing the IR energy beam; (b2) filtering the IR energy beam; (b3) reflecting the IR energy beam by the MEMS mirror array onto a detector; (b4) detecting the IR energy beam by means of the detector; (b5) converting the IR energy beam to an output signal; (b6) amplifying the output signal; (b7) converting the output signal from analog to digital; and (b8) processing the output signal by means of a processor prior to annunciating detection. The output signal can be one of electrical, magnetic, optical, acoustical, pneumatic or hydraulic pressure. The method can further comprise the step of: (b9) controlling the MEMS mirror array to measure all mirror array elements by scanning. The method can further comprise the steps of: (g) determining whether all mirror array elements have been measured; (h1) if no, repeating steps (b) through (f); (h2) if yes, storing the scan of the field of view; (i) processing the results of the scan; (j) determining if a gas or vapor has been detected based on the results of the scan by detecting a change in the ratio of the IR energy beam received by the detector with the narrow-band filter to the IR energy beam received by the detector with the wideband filter during a given time period; (k1) if yes, annunciating an alarm; (k2) if maybe, returning to steps (b) through (f) of measuring the temperatures by re-scanning the air path where the gas or vapor appears to be detected, and (k3) if no, returning to steps (b) through (f). The step (j) can be performed by the step (j') of calculating the ratio of the instantaneous peak values of the output signal of the narrow band detector to the instantaneous peak values of the output signal of the wide band detector during a given time period. The step (j) can be performed by the step (j") of calculating the ratio of the average of the instantaneous peak values of the output signal of the narrow band IR detector to the average of the instantaneous peak values of the output signal of the wide band IR detector during a given time period. The step (j) can be performed by the step (j'") of averaging the ratios of the instantaneous peak values of the output signal of the narrow band IR detector to the instantaneous peak values of the wide band IR detector during a given time period. In all cases, occurrence of ratios having a value significantly less than one (1) during the given time period indicates concentration of a gas or vapor within the air path and occurrence of ratios having a value close to one (1) during the given time period indicates a shift in at least one of IR output and ambient light to enable self-calibration of the narrow band and wide band IR detectors. The magnitude of the ratios calculated is proportional to the concentration of gas or vapor present. The steps (b) through (f) of measuring the IR energies and temperatures can include the steps of at least one of: (b1') directing a signal controller to adjust an angle of at least one mirror of said MEMS mirror array; and (b1") directing a signal controller to adjust the MEMS mirror to switch from one to another focusing element in a chopping mode following measurement of the energy of the IR source and the temperature of IR reference.

The step (b1') of directing a signal controller to adjust the angle of at least one mirror element can be performed by toggling the angle position. The step (b3) of adjusting an angle can include the step of: (b4) varying a control signal to said at least one element of said MEMS mirror array. The step (b2) of varying a control signal to said at least one element of said MEMS mirror array causes motion of said at least one mirror element of said MEMS mirror array, the control signal can be one of electrical, magnetic, optical, acoustical, pneumatic and hydraulic pressure, said step (b2) of varying of an electrical control signal causing motion by at least one of thermal expansion and electrostatic force. The focusing element can comprise at least one of (a) a lens element; and (b) a mirror focusing element. The step of (k2) of re-scanning the air path where a gas or vapor appears to be detected includes the steps of at least one of: (k2') re-scanning at the pre-determined scan rate; and (k2") re-scanning at a different scan rate.

In an alternate configuration, the present invention is directed to the space safety apparatus of the first and second embodiments wherein said detector assembly further comprises a viewing port and said mirror elements of said MEMS mirror array are disposed within the detector assembly. The mirror elements are start and end position mirror elements that are configured in rows and columns. All rows and columns of said start and end position mirror elements can be oriented in start and end positions such that all of said mirror elements view inside said detector assembly housing. Alternatively, at least a portion of said rows and columns of said start and end position mirror elements can be oriented in start and end positions such that at least a portion of said mirror elements view outside said detector assembly housing.

The method of detecting an intrusion in a volume of space can further include said mirror elements that are start and end position mirror elements disposed in a detector assembly housing having an IR filter window for viewing outside said detector assembly housing, said method comprising the step of: orienting in start and end positions all rows and columns of said mirror elements to view inside said detector assembly housing. Alternatively, the method of detecting an intrusion in a volume of space can comprise the step of: orienting in start and end positions at least a portion of said rows and columns of said mirror elements to view outside said detector assembly housing.

BRIEF DESCRIPTION OF THE DRAWINGS

These and other features, benefits and advantages of the present invention will become apparent by reference to the following text and figures, with like reference numbers referring to like structures across the views, wherein:

FIG. 6A illustrates a plan view of the MEMS-based infra-red sensor of the present invention.

FIG. 6B illustrates a section view along section line 6B—6B of the MEMS-based infra-red sensor of FIG. 6A.

FIG. 6C illustrates a section view along section line 6C—6C of the MEMS-based infra-red sensor of FIG. 6A.

FIG. 7 is an isometric view of the prior art infra-red sensor of FIG. 6A–6C.

FIG. 10A illustrates a plan view two-dimensional representation of a finite element equivalent of a curved mirror of the present invention.

FIG. 10B illustrates a side view two-dimensional representation of a finite element equivalent of a curved mirror of the present invention.

FIG. 10C is a plan view of a finite element simulation of a flat mirror.

FIG. 10D is a side view of the finite element simulation of the flat mirror of FIG. 10C.

FIG. 11A-1 illustrates incremental scanning of the IR zones within the FOV.

FIG. 11A-2 illustrates discrete, finite scanning of the IR zones within the FOV.

FIG. 13B is a method diagram of a second alternative method of operating the MEMS-based IR sensor detection system of the present invention.

FIG. 16 illustrates a plan view of a MEMS based IR detector assembly which houses both narrow band and wide band detectors for gas detection.

FIG. 16A is a section view along section line 16A—16A of FIG. 16.

FIG. 16B is a section view along section line 16B—16B of FIG. 16.

FIG. 16C is a section view along section line 16C—16C of FIG. 16.

FIG. 16D is a perspective view of the detector assembly of FIG. 16.

FIG. 16E is a cutaway view of the detector assembly of FIG. 16D.

FIG. 16A1 illustrates a non-chopping scan across an FOV for the method of FIGS. 13 and 13A.

FIG. 16A2 illustrates a chopping scan across an FOV for the method of FIGS. 13 and 13A.

FIG. 16B1 illustrates a non-chopping scan for switching on/off of a lens element for the method of FIGS. 13 and 13B.

FIG. 16B2 illustrates a chopping scan for switching on/off of a lens element for the method of FIGS. 13 and 13B.

FIG. 16B2' illustrates a detail of FIG. 16B2.

FIG. 18-1 illustrates an electrical signal output for the non-chopping scan of FIGS. 16A1 and 16B1.

FIG. 18-2 illustrates an electrical signal output for the chopping scan of FIGS. 16A2 and 16B2.

FIG. 21B-1 illustrates a MEMS mirror element in an unactuated position.

FIG. 21B-2 illustrates a MEMS mirror element in an actuated position.

DETAILED DESCRIPTION OF THE INVENTION

The present invention is directed to a space safety apparatus monitoring a volume of space encompassing a field of view. The present invention uses a multi-axis MEMS array to redirect the IR energy of a beam within the FOV of the protected space. This effectively scans the IR signature of the room. The scanned IR signature is stored in memory, and compared to successive scans for changes in IR signature. Processing algorithms determine if changes in the scanned IR signature are consistent with the signature of the motion of an intrusion. When the proper change in signature is detected an alarm is annunciated. This solves the problems described above because the sensor can determine where within the FOV the IR energy is changing and the sensor therefore can monitor the movement of the IR energy within the FOV. Sources of false alarms can be filtered by monitoring the magnitude and width of the output signal to determine the size and shape of the source of variation. Areas which cause false alarms can be omitted from the scans or given less importance in the processing algorithm.

In addition, the protected space does not need to be illuminated for this system to work. The intrusion can be an effect caused by the presence within the volume of space of an animate or inanimate object, or example a robotic vehicle, and including a liquid or a gas or a vapor. Therefore, this system can also be used to detect any gas or vapor including, but not limited to harmful, toxic, explosive or flammable vapors or gases such as: carbon monoxide (CO), volatile organic compounds (VOCs), hydrogen ($H_2$), hydrocarbon gases such as methane ($CH_4$) and propane ($C_2H_6$) or other beneficial or non-toxic gases such as oxygen ($O_2$) or carbon dioxide ($CO_2$). The detection is achieved by adding narrowband IR bandpass filters centered around the frequency of the IR absorption of the specific gas to the optical path and comparing the IR absorption of the FOV with a reference signal. The reference signal is derived by using the MEMS array as an IR chopper that switches between the FOV and an IR reference. A second detector with a wide band filter, such as the detector used for motion detection, can be used to self calibrate the system.

Figure 1C:
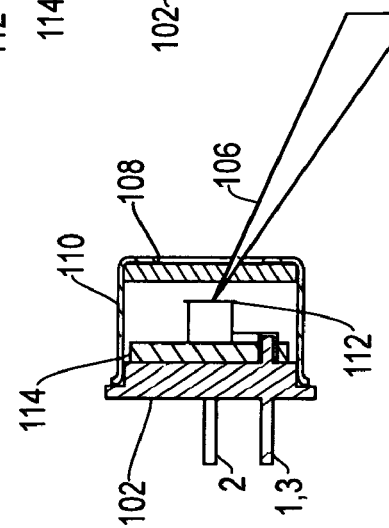
FIG. 1C illustrates a section view along section line 1C—1C of the prior art infra-red sensor of FIG. 1A.
Figure 1B:
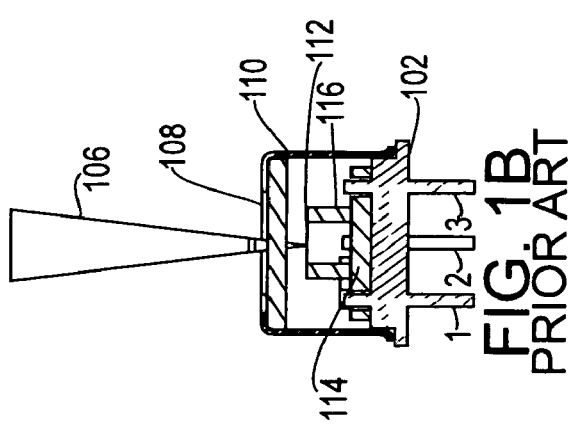
FIG. 1B illustrates a section view along section line 1B—1B of the prior art infra-red sensor of FIG. 1A.
Figure 1A:
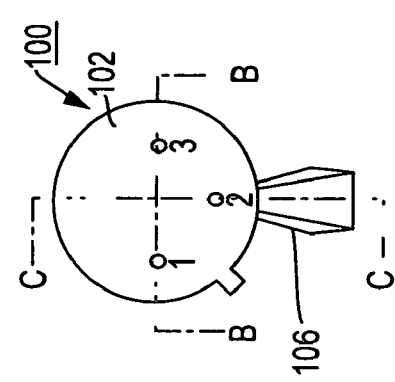
FIG. 1A illustrates a plan view of a infra-red sensor of the prior art as viewed from the bottom.

FIG. 1A illustrates a plan view of an infra-red sensor detector assembly 100 of the prior art showing the bottom of detector housing base 102, which comprises typically three connection pins 1, 2 and 3. Optical beam 106 is directed towards the sensor 100. Those skilled in the art recognize that while FIG. 1A illustrates a single element, a dual or quad element detector could also be used.

FIG. 1B is a section view along section line 1B—1B of the prior art infra-red sensor detector assembly 100 of FIG. 1A. The detector housing base 102 is formed with the connection pins 1, 2 and 3, which are typically three in number. The optical beam or beams 106 penetrate the infrared filter window 108 within the detector housing cover 110. The optical beams 106 are sensed by detector element or elements 112 which are mounted on spacers 116 for thermal isolation and then electrically coupled to ceramic substrate 114. The IR energy collected from the optical beam or beams 106 is converted by the detector element or elements 112 to an electrical signal which is conditioned by a field effect transistor (FET) and other components on the ceramic substrate 114.

FIG. 1C illustrates a section view along section line 1C—1C of the prior art infra-red sensor detector assembly 100 of FIG. 1A. Essentially the same components are shown as described for FIG. 1B but in the orientation more closely corresponding to the installed configuration for operation.

Figure 2:
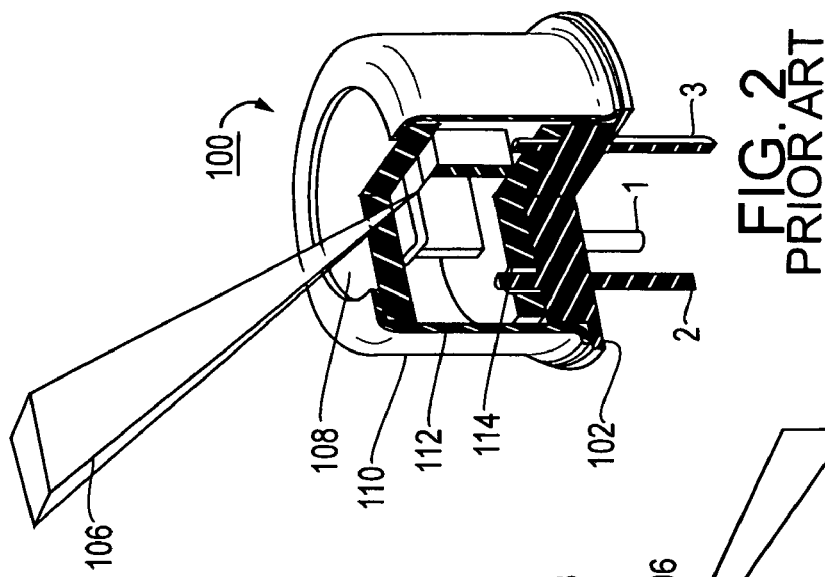
FIG. 2 is an isometric view of the prior art infra-red sensor of FIG. 1A–1C.

FIG. 2 is an isometric view of the prior art infra-red sensor detector assembly 100 of FIGS. 1A–1C. A cut-away view shows the optical beam or beams 106 being received by the detector elements 112. Again, essentially the same components are shown as described for FIG. 1B.

Figure 3:
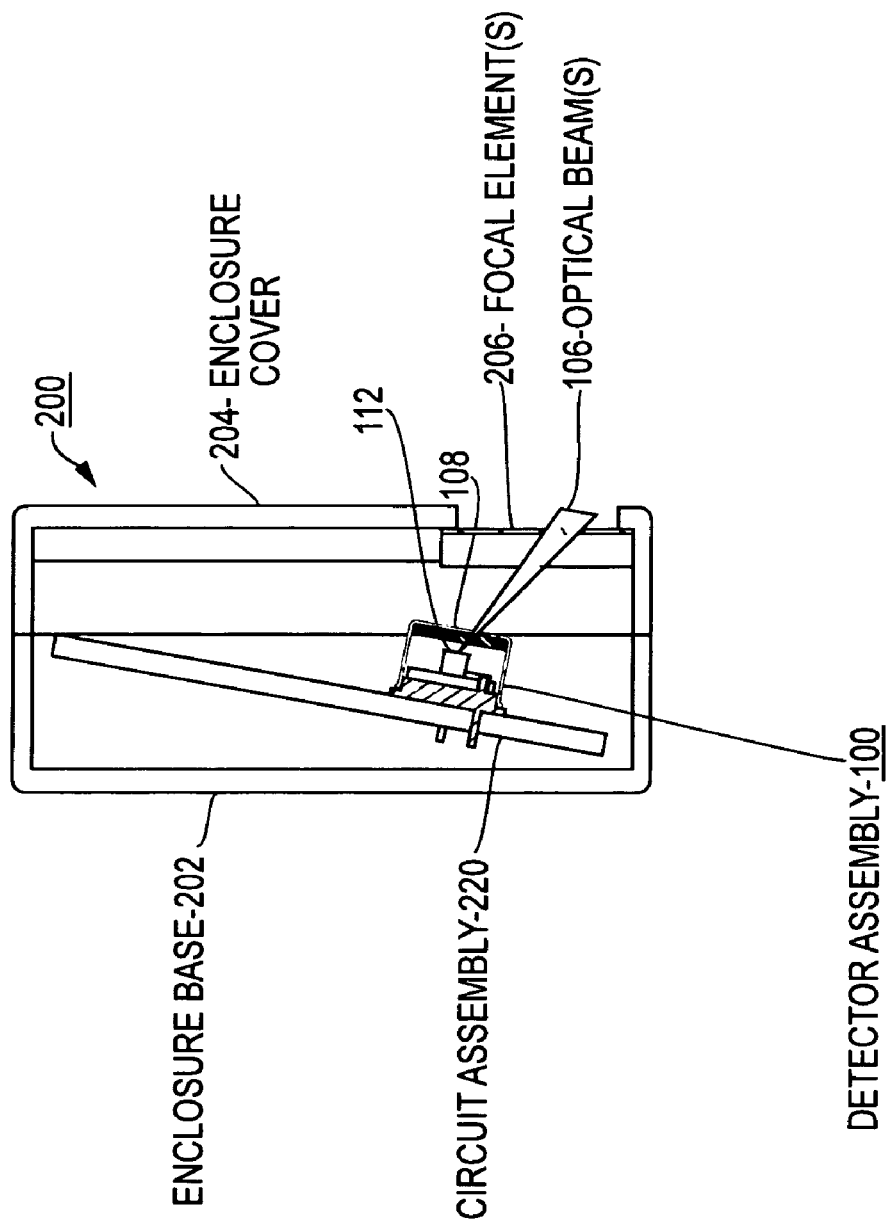
FIG. 3 is an elevation cross-sectional view of the infra-red sensor of the prior art of FIGS. 1A–1C as mounted within an enclosure.

FIG. 3 is an elevation cross-sectional view of the infra-red sensor detector assembly 100 of the prior art of FIGS. 1A–1C as mounted within an enclosure 200. The enclosure 200 is comprised of an enclosure base 202 to which an enclosure cover 204 mates to form the enclosure 200. The enclosure cover 204 includes focal element or elements 206. The detector assembly 100 is mounted on a printed circuit board (PCB) assembly 220 and positioned within the enclosure 200 at an angle so as to receive the optical signal beam or beams 106 through focal element or elements 206. FIG. 3 shows a lens or lenslet optical system. Those skilled in the art recognize that a mirrored optical system could be used as an alternate approach.

Figure 4:
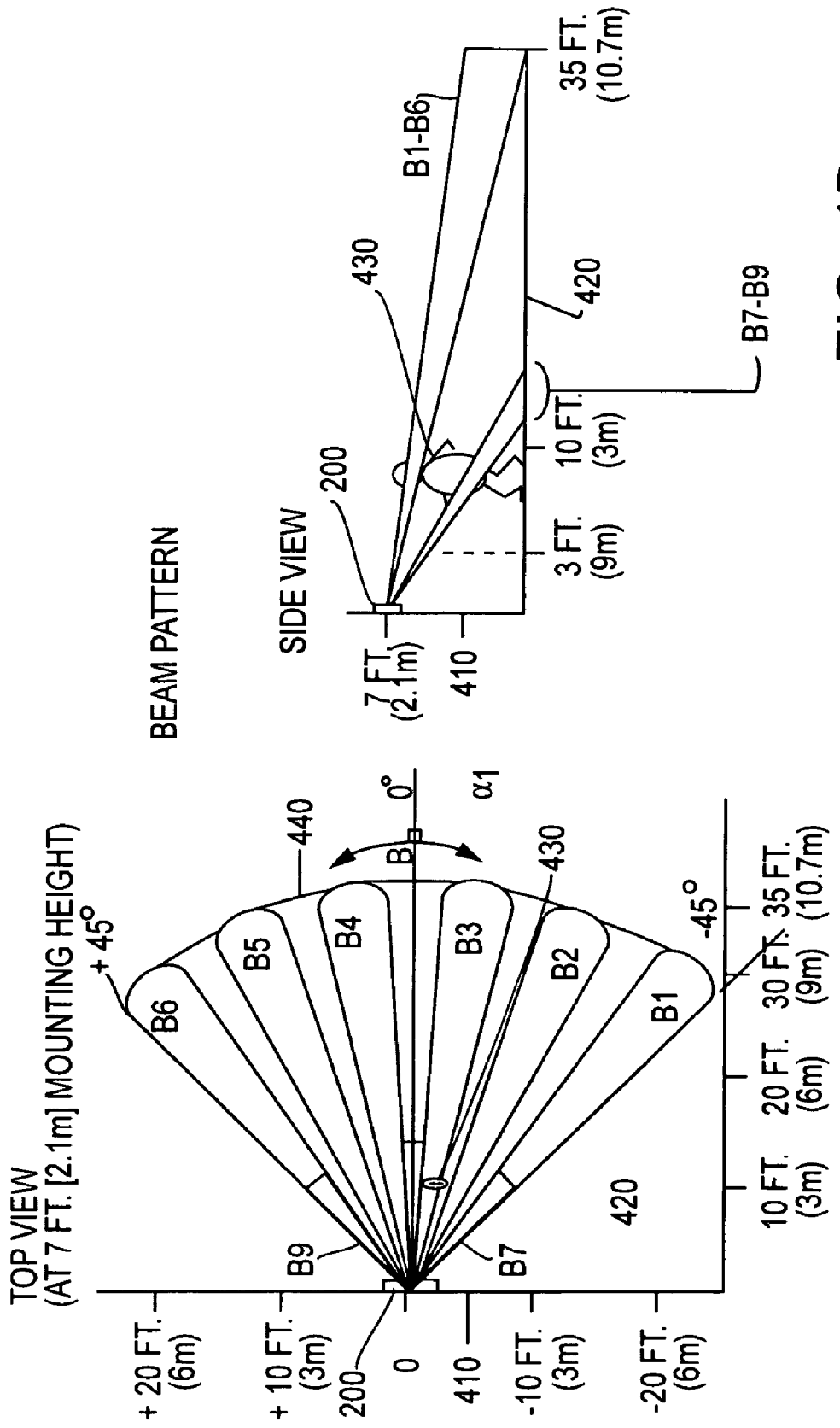
FIG. 4A is a plan view of the IR beam exposure pattern of the prior art sensor of FIGS. 1A–1C and of the present invention.
FIG. 4B is an elevation view of the IR beam exposure pattern of the prior art sensor of FIGS. 1A–1C.

FIG. 4A is a plan view of an IR beam exposure pattern of the prior art sensor detector assembly 100 of FIGS. 1A–1C. FIG. 4B is an elevation or side view of the IR beam exposure pattern of the prior art sensor detector assembly 100 of FIGS. 1A–1C. The enclosure 200 with detector assembly 100 is mounted on a wall 410 and above the floor or ground 420 of a room or an outdoor area to detect an intrusion in a volume of space formed by the wall 410 and the floor or ground 420. The IR energy from each active zone is focused on the IR detector elements 112 as a static pattern in which the first tier of beams B1 above the ground 420 through beams B2, B3, B4, B5 and ending with beam B6 is received simultaneously. A second tier of beams simultaneously lands on the ground to receive beams B7, B8 and B9 to detect an intrusion 430. In this example, there are a total of 9 beams in two tiers: 6 long beams and 3 short beams. The summation of the beams B1 to B9 forms the field of view (FOV) 440. The FOV 440 is bounded by the outer borders of the beams, in this example, beams B1 to B9.

Figure 5:
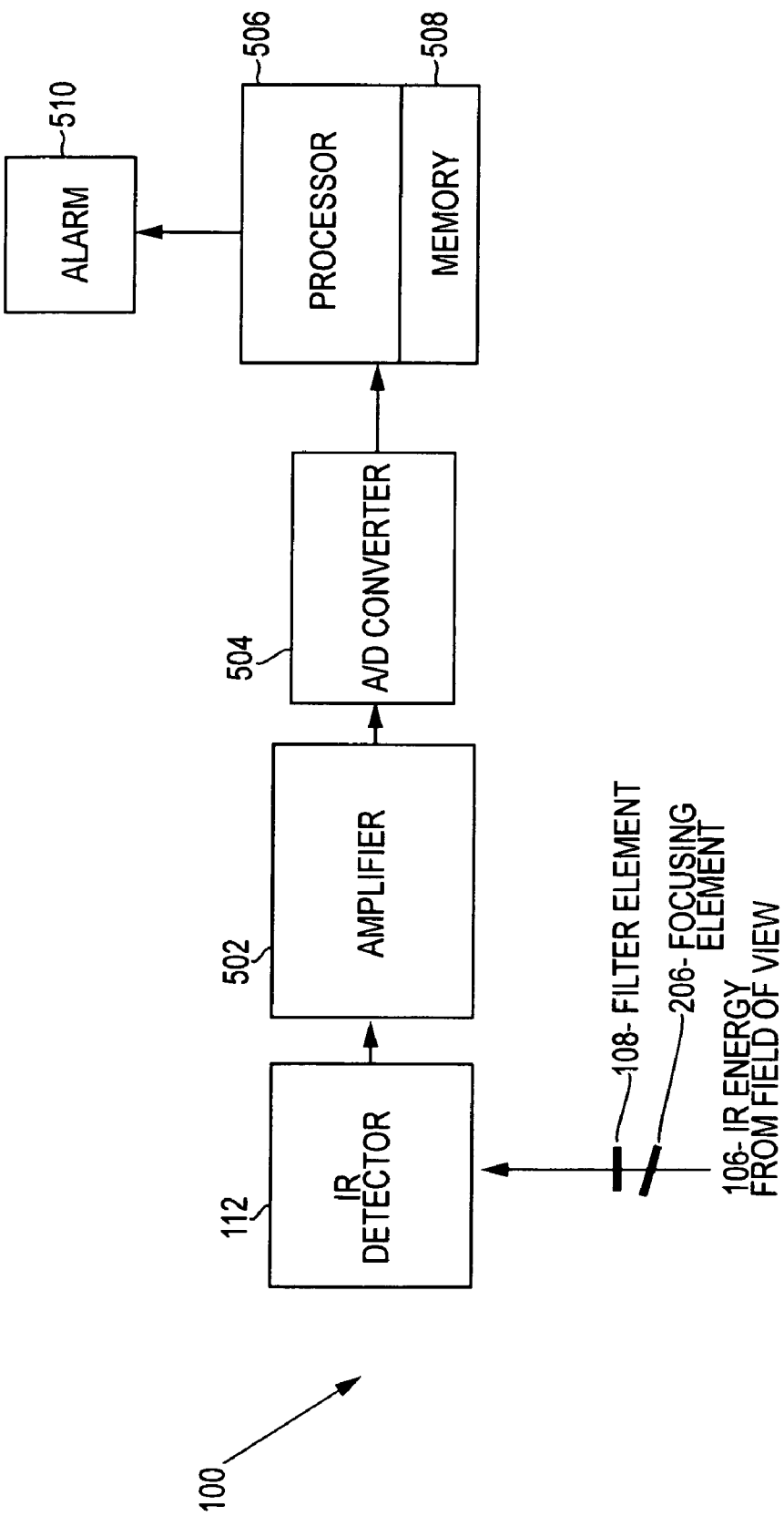
FIG. 5 is a block diagram of a prior art IR sensor detection system.

FIG. 5 is a block diagram of the prior art IR sensor detector assembly 100 arranged in a detection system. The filter element 108 is included within the detector assembly 100 of FIGS. 1A–1C and 2. The focusing element 206 is included within the enclosure 200 of FIG. 3. The IR optical beams 106 from the FOV penetrate the focusing elements 206 and the filter element 108 where the beams are received by IR detector element(s) 112 which convert the IR beam energy to an electrical signal. The electrical signal is then conditioned and amplified by amplifier 502 and converted from analog to digital by A/D converter with sufficient resolution 504. The signal is then forwarded to processor 506 where the signal can be stored in memory 508 and a threshold detection algorithm applied. If appropriate, a signal to activate an alarm 510 can be generated. The passive infrared (IR) sensor detector assembly 100, as noted previously, detects intruders moving within its field of view (FOV) 440 by measuring the temperature gradient caused by an intruder. The sensor's FOV 440 is fixed and is determined by the optical properties of the lens system. The FOV 440 is subdivided into static active and inactive zones; the motion of an intruder from an active to an inactive zone is detected as an alarm. The IR energy from each active zone is focused on the IR detector and the IR detector cannot determine which active zone is collecting the energy. At least one problem with this arrangement is that other sources of heat within a zone or zones can be detected as alarm signals as well.

FIG. 6A illustrates a plan view of the MEMS-based infra-red sensor detector assembly 600 of the present invention showing the bottom of detector housing base 102, which comprises typically the three connection pins 1, 2 and 3. Optical beam 106 is directed towards the sensor assembly 600.

FIG. 6B is a section view along section line 6B—6B of the infra-red sensor detector assembly 600 of FIG. 6A. FIG. 6C illustrates a section view along section line 6C—6C of the infra-red sensor detector assembly 600 of FIG. 6A. The detector housing base 102 is formed with the connection pins 1, 2, 3 and 4, which are typically four in number, one for power, one for ground, one for detector output signal, and one for MEMS control signal. The output signals and control signals are disclosed herein as being electrical but the signals can be generally electromagnetic, i.e., electrical or magnetic or optical, or can be of other types such as, for example but not limited to, acoustical, pneumatic and hydraulic pressure. Electrical power is typically supplied from the general security system within which the MEMS-based infra-red sensor detector assembly 600 is typically included. The optical beam or beams 106 penetrate the infrared filter window 108 within the detector housing cover 110. The optical beam 106 is now first reflected by MEMS mirror array 604 prior to being sensed by the detector element or elements 112 which are mounted on, and electrically coupled to, ceramic substrate 614. The detection signal information provided by the optical beam or beams 106 is transmitted by the detector element or elements 112 for processing by the ceramic substrate 614. The IR energy collected by the optical beam or beams 106 is converted by the detector element of elements 112 to an electrical signal which is conditioned and amplified by a FET and other components on the ceramic substrate 614. Due to the small size of the MEMS mirror array 604, a separate power supply typically is not required. The output signal is disclosed as being electrical but the signal can be generally electromagnetic, i.e., electrical or magnetic or optical, or of other mechanical types such as acoustical or fluidic pressure such as pneumatic or hydraulic. The pneumatic is not limited to air but includes any suitable gas such as nitrogen. The hydraulic is not limited to water but includes oils or other liquids.

FIG. 6C shows essentially the same components as described for FIG. 6B but in the orientation more closely corresponding to the installed configuration for operation. In addition, the optical beam or beams 106 is shown reflected from the MEMS mirror array 604 as optical beam 606 that is directed towards the detector elements 112. The detector element or elements 112 are mounted on, and electrically coupled to, ceramic substrate 614 by means of supports 616.

FIG. 7 is an isometric view of the infra-red sensor detector assembly 600 of FIGS. 6A–6C. A cut-away view shows the optical beam or beams 106 first reflected by MEMS mirror array 604 prior to being sensed by the detector element or elements 112 as reflected optical beam 606. Again, essentially the same components are shown as described for FIG. 6B.

Figure 8:
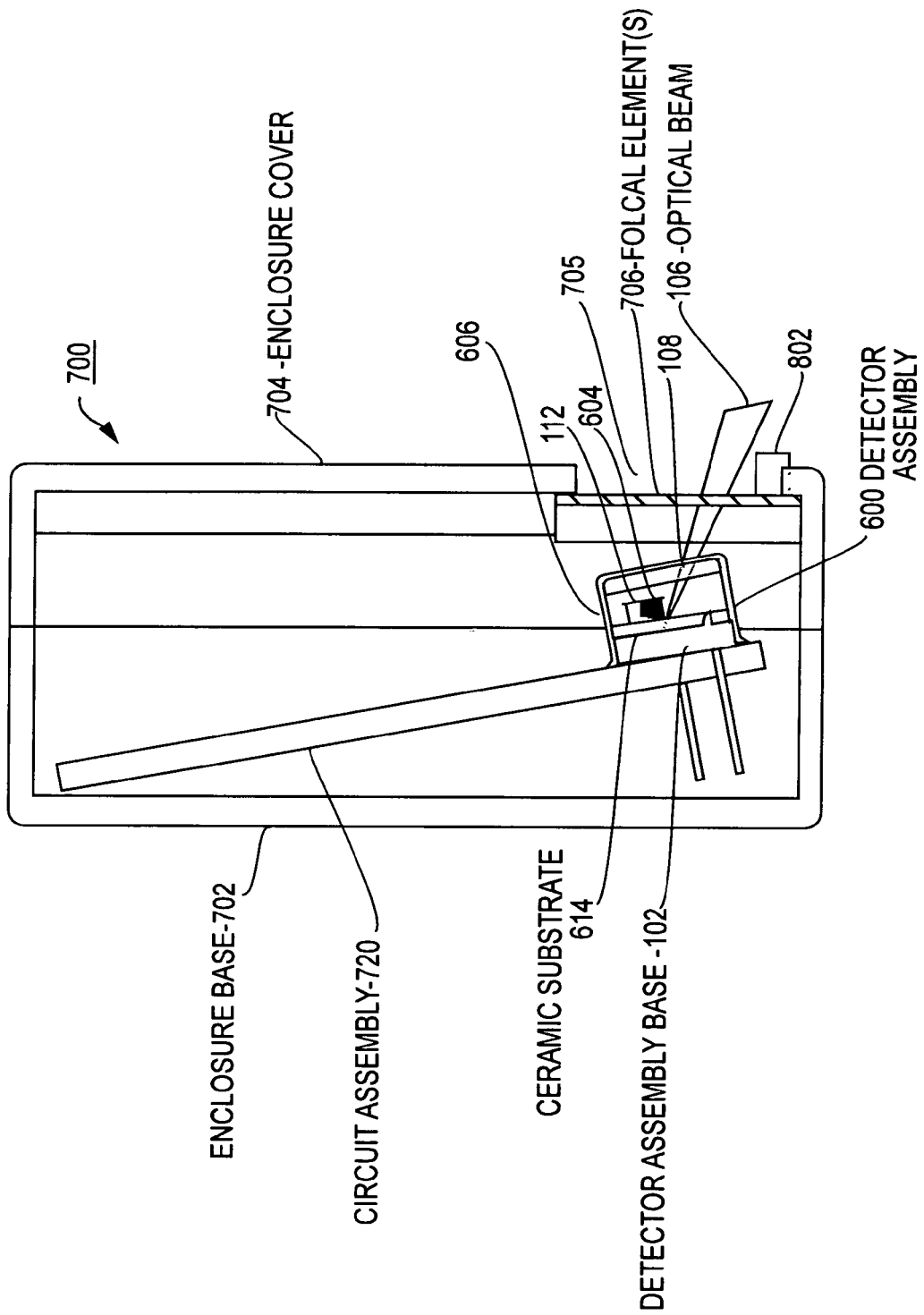
FIG. 8 is an elevation cross-sectional view of the MEMS-based infra-red sensor of FIGS. 6A–6C as mounted within an enclosure.

FIG. 8 is an elevation cross-sectional view of the infra-red sensor detector assembly 600 of FIGS. 6A–6C as mounted within an enclosure 700. The enclosure 700 is comprised of an enclosure base 702 to which an enclosure cover 704 mates to form the enclosure 700. The enclosure cover 704 includes a viewing port 705 for positioning focal element or elements 706. The detector assembly 600 is mounted on printed circuit board (PCB) or circuit assembly 720 and is now positioned within the enclosure 700 at an angle so that the MEMS mirror array 604 first receives the optical signal beam or beams 106 through focal element or elements 706. The optical signal beam or beams are then reflected as beam 606 to the detector elements 112.

To achieve lens supervision, i.e., to detect any unauthorized tampering with, or degradation of, the enclosure 700 or the detector assembly 600, an IR source 802 can be located at a suitable location outside the enclosure cover 704 to provide a known reference signal when the enclosure 700, including the focal elements 706, and the detector assembly 600 are in their normal configuration. FIG. 8 shows a lens or lenslet optical system. A mirrored optical system could be used but is not illustrated as those skilled in the art recognize that the alternate approach can be used.

Figure 9:
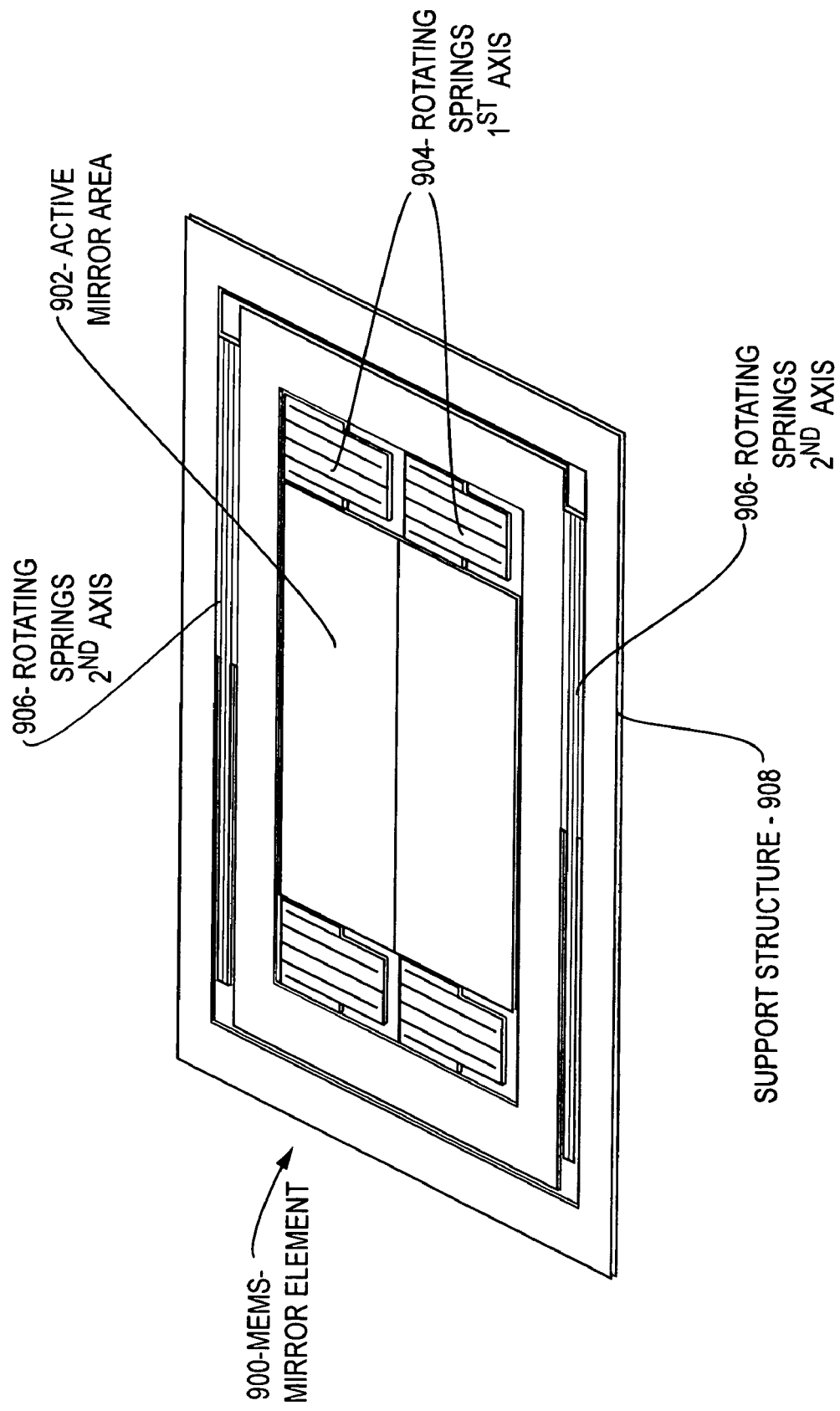
FIG. 9 illustrates one type of MEMS mirror sensor element of the present invention.

FIG. 9 shows one type of an element 900 of a MEMS mirror segment of MEMS mirror array 604. The mirror element 900 is comprised typically of active mirror area 902. The active mirror area 902 is coupled to support structure 908 by means of rotating springs 904 to provide one axis of rotation and to another set of rotating springs 906 to provide a second axis of rotation. In such a configuration, the mirror element 900 can be considered to have an unactuated or start position, as shown, and an actuated or end position (not shown) in which the active mirror area 902 can be rotated to the angular limits permitted by the rotating springs 904 and 906. Such a start and stop MEMS mirror array provides a less expensive means for fabricating a MEMS mirror array.

In a more sophisticated version, the active mirror element 902 can be rotated to any intermediate position of angular rotation permitted by the rotating springs 904 and 906.

For the IR detector elements 112, an active element is the area on the surface of the detector material which has been blackened to allow IR absorption. On the MEMS mirror array element 900, the active area 902 is the area which is selectively plated to be an IR reflective surface. The remaining area around the mirror array element which is for support structure 908, rotating springs 904 or 906 or other mechanism to allow movement and the control mechanism is the inactive area or non IR reflective surfaces.

FIG. 10A shows a 2-dimensional representation of a finite element equivalent of a curved mirror using the MEMS mirror array 604. In this example, the mirror elements are shown as a center element 1000 and four adjacent elements 1000A, 1000B, 1000C and 1000D. The approximate imaging plane occurs transversely to the optical axis of the center element 1000. The multi-axis MEMS mirror array 604, comprised of the center element 1000 and the four adjacent mirror elements 1000A, 1000B, 1000C and 1000D, is placed in close proximity to the active elements of the IR detector 112. The actuated elements are those mirror elements which rotate or otherwise change position, i.e., 1000A, 1000B, 1000C and 1000D are actuated elements while mirror element 1000 is stationary and therefore unactuated. The mirror array 604 collects IR energy 606F from an IR source in the far field in the FOV of the mirror elements 1000, 1004 and 1004A–1004D. The IR energy 606F from the IR source in the far field is filtered by IR filter 108. In FIG. 10A, the IR energy 606F from the IR source in the far field originates from a position such that the IR energy 606F is reflected by the center element 1000 and four adjacent elements 1000A, 1000B, 1000C and 1000D as IR energy beam 606R onto a spot 620C of active elements in the IR detector 112 having a spot size $S_C$. The center element 1000 and four adjacent elements 1000A, 1000B, 1000C and 1000D are positioned so that the focal point 622 of the combination of the elements occurs beyond the IR detector 112 but before the IR filter 108 (shown before the IR filter but may occur on the other side). The focal point 622 is determined by the intersection of the lines 624 perpendicular (normal) to the center element 1000 and four adjacent elements 1000A, 1000B, 1000C and 1000D. The focal length L of the curved mirror elements is in the order of 30 mm or less while the IR source 606 is effectively at an infinite distance, i.e., in the far field at a distance typically of 2.4 meters (8 feet) or more away. The angles $\Phi_A$, $\Phi_B$, $\Phi_C$, and $\Phi_D$, between the optical axis of the MEMS mirror array elements 604 and the optical axis of the IR sensing detector elements 112 defines the placement of the zone within the FOV. By varying the angles $\alpha_A$, $\alpha_B$, $\alpha_C$, and $\alpha_D$, of each of the flat elements 1000A, 1000B, 1000C and 1000D in the mirror array 604, a finite element equivalent of a curved mirror can be created to represent variation in the width of the FOV of the center element 1000 and four adjacent actuated elements 1000A, 1000B, 1000C and 1000D, effectively representing changing of the zone size. The center element 1000 and four adjacent actuated elements 1000A, 1000B, 1000C and 1000D are in actuality part of a 2 dimensional N×M array.

FIG. 10B illustrates a side view of the simulated curved mirror comprised of the mirror element 1000 and four adjacent elements 1000A, 1000B, 1000C and 1000D. As an example, the four rotating elements 1000A to 1000D rotate at different angles $\beta_A$ to $\beta_D$ to focus the optical beam 606F reflected from the center element 1000 and rotating elements 1000A to 1000D as optical beam 606R onto the spot 620C of the active elements of detector 112. In some types of MEMS mirrors commercially available, it is possible for all of the elements to rotate in unison. The elements can rotate each at the same angle β or at different angles to reflect the optical beam 606R onto the detector elements 112. In other types of commercially available MEMS mirrors, for example, in only one-quarter of a 2×2 array do all of the elements move in unison. In FIGS. 10A and 10B, the 2-dimensional N×M array is represented, as an example, by a 5×1 array. Those skilled in the art recognize that any different array dimensions can be applied, depending on the intended application.

FIG. 10C is a plan view of a finite element simulation of a flat mirror. Again, center element 1000 and adjacent elements 1000A to 1000D are positioned to reflect IR energy 606F from an IR source in the far field. However, in this configuration, the IR energy 606F is reflected by the flat configuration of the center element 1000 and adjacent elements 1000A to 1000D towards the detector 112 with a distributed spot 620F having a spot size $S_F$. FIG. 10D is a side view of the finite element simulation of the flat mirror of FIG. 10C. In the flat mirror configuration of both FIGS. 10C and 10D, as expected, there is no focal point.

Figures 1, 11A:
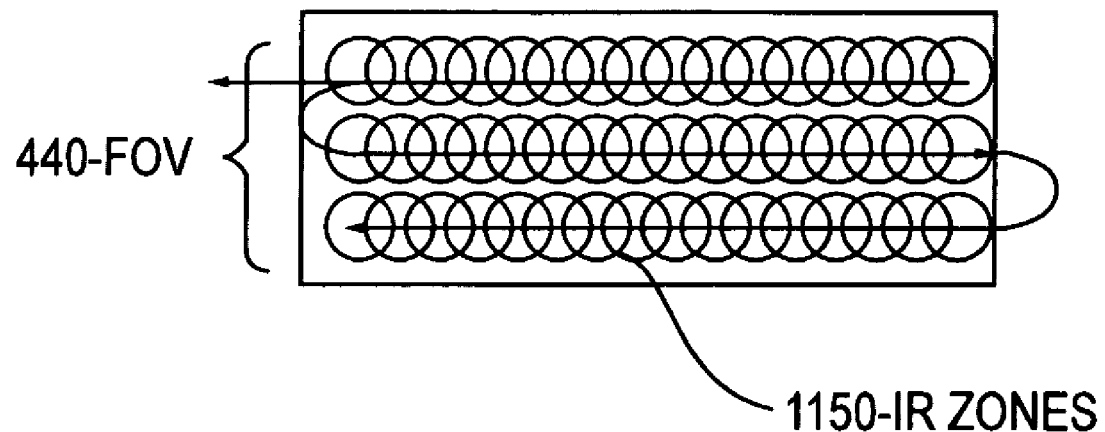
Figures 2, 11A:
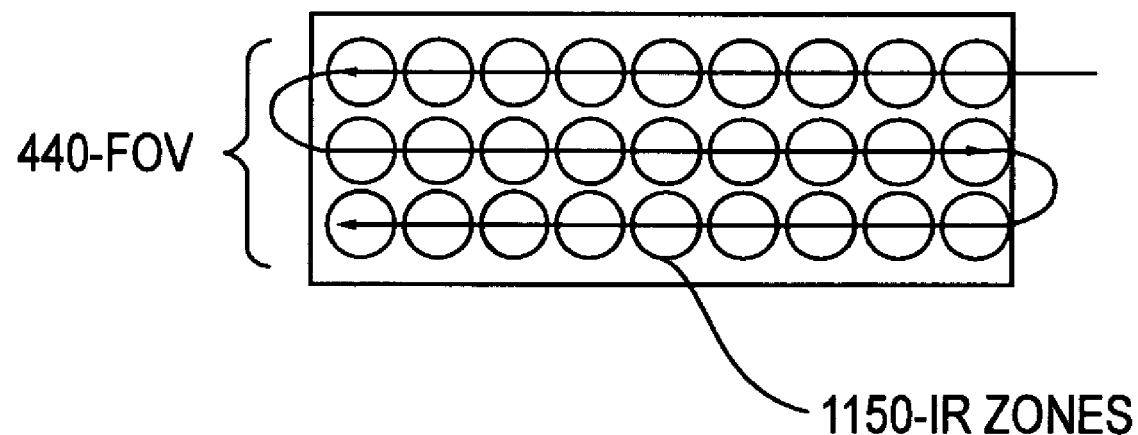
FIG. 11A is a block diagram of one aspect of the MEMS-based IR sensor detection system of the present invention.
Figure 11A:
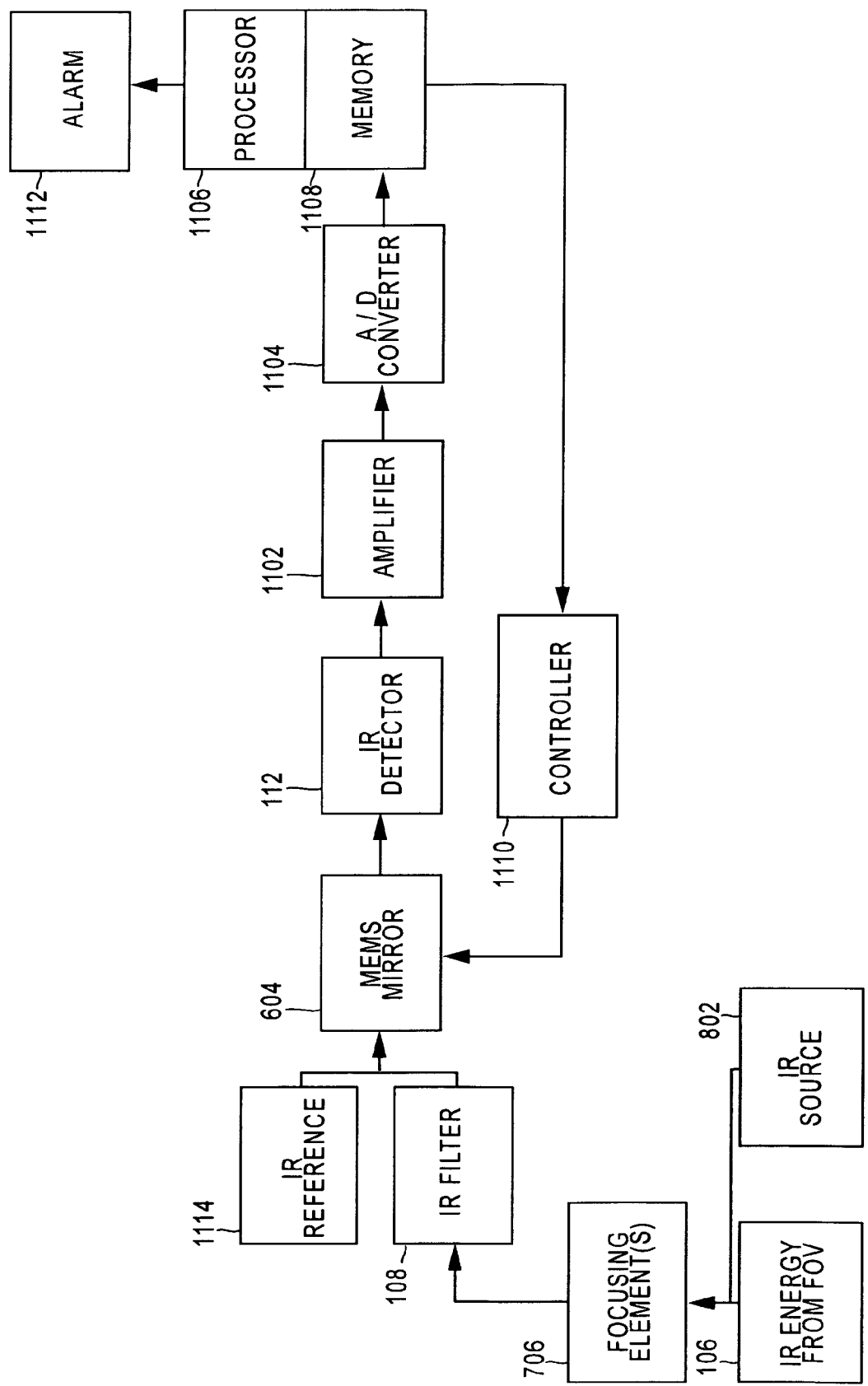

FIG. 11A is a block diagram of the MEMS-based IR sensor detector assembly 600 arranged in a detection system. The filter element 108 is included within the detector assembly 600 of FIGS. 6A–6C and 7. The focusing element 706 is included within the enclosure 700 of FIG. 8. The MEMS mirror array 604 first receives the optical signal beam or beams 106 through focal element or elements 706. The optical signal beam or beams are then reflected as optical beams 606 to the detector elements 112 which convert the IR energy to an electrical signal. Since the electrical signal is only in the range of 50 microamps, it is necessary to have a high resolution A/D converter or an amplifier 1102. The signal is converted from analog to digital by A/D converter 1104. The signal is then forwarded to processor 1106 where the signal can be stored in memory 1108 and an algorithm applied. From the memory 1108, following processing by the processor 1106, a signal can be generated for different modes of operation by controller 1110 to adjust the orientation of the MEMS mirror array elements 900 by controller 1110. If appropriate, a signal to activate alarm 1112 can be generated. The amplifier 1102, the A/D converter 1104, the processor 1106, the memory 1108 and controller 1110 typically are part of the printed circuit board or circuit assembly 720.

Specifically, microprocessor 1106 sends a signal to the controller 1110 to change the voltage V to the elements of the MEMS mirror array 604. Changing this voltage V generates electrical resistance heating which, for example by thermal expansion or electrostatic force, moves the mirror array elements 900. Controller 1110 can perform several different modes of operation. In a non-chopping mode wherein IR reference source 1114 is ignored and the IR energy detection is confined solely to the FOV 440, there are two sub-modes possible. In the first sub-mode, voltage variation changes the orientation of the mirror elements 900 in incremental overlapping steps within the FOV 440. The elements 900 receive the optical beam 106 by traversing the FOV 440 incrementally in steps in a continuous scan. The angles $\alpha_A$, $\alpha_B$, $\alpha_C$, and $\alpha_D$ change and correspondingly the angles $\Phi_A$, $\Phi_B$, $\Phi_C$, and $\Phi_D$, between the mirror array 604 and the IR detector element 112 also change. The first sub-mode is illustrated schematically in FIG. 11A-1 where the IR zones 1150 within the FOV 440 are scanned in incremental steps in a continuous manner. In the first sub-mode, the electrical output signals are produced as the convolution of the target with the FOV 440 which is then shaped by the IR filter 108.

In a second sub-mode in the non-chopping first mode of operation, as illustrated in FIG. 11A-2, the elements 900 receive the optical beam 106, i.e. as IR energy, by traversing the IR zones 1150 within the FOV 440 in discrete, non-continuous steps. Again, the electrical output signals are produced as the convolution of the target with the FOV which is then shaped by the IR filter.

Other means for moving the mirror array elements include translation such as by application of an electrostatic force to move the elements either in a linear or non-linear manner.

Referring again to FIG. 11A, in a second mode of operation, a reference signal Sr is derived by using the MEMS array 604 as an IR chopper that switches between the FOV 440 and an IR reference 1114. As such, the microprocessor or process controller 1106 and controller 1110 can move the IR zone within the FOV and use the reference to compute the target temperature.

By providing a signal to the controller 1110, the microprocessor 106 steps the voltage V to the mirror array 604, records the IR energy in the zone, then steps the voltage V to move the zone an incremental amount within the FOV 440. The electrical signal produced by the IR detector 112 is now an AC signal with a DC bias.

As before, the first sub-mode illustrated schematically in FIG. 11A-1 can be applied to the chopping mode of operation such that the IR zones 1150 are scanned in incremental steps in a continuous manner. In the first sub-mode, the electrical output signals are now produced as AC signals with a DC bias.

Figure 11B:
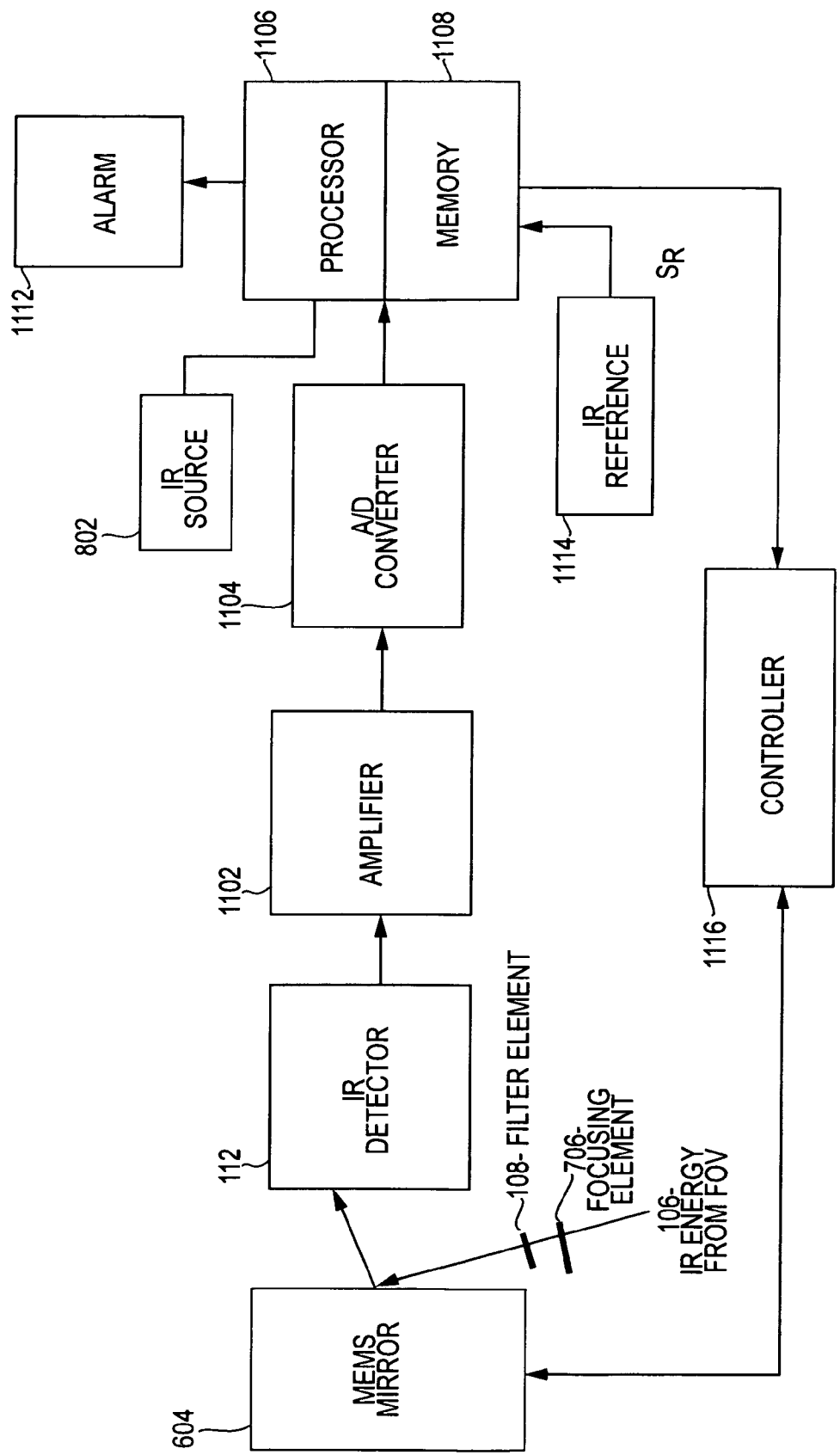
FIG. 11B is a block diagram of a second aspect of the MEMS-based IR sensor detection system of the present invention.

Similarly, the second sub-mode can be applied to the chopping mode of operation, as illustrated in FIG. 11B such that the elements 900 receive the optical beam 106, i.e., as IR energy by traversing the IR zones 1150 within the FOV 440 in discrete, non-continuous steps. Again, the electrical output signals are produced as AC signals with a DC bias.

For both the first and second modes of operation of the embodiment of FIG. 11A, the process is repeated, left to right, up and down, until the entire FOV has been scanned. Once the entire FOV has been scanned the process is repeated and the new IR scan is compared with the previous scan. The IR scans are analyzed for changes in magnitude and position. Changes consistent with motion of an intruder annunciate an alarm signal.

Also, as discussed previously, lens supervision can be achieved to detect tampering or degradation of the detector assembly 600 by verification of a reference signal from IR source 802 to the processor 1106.

FIG. 11B is a block diagram of a second embodiment of the MEMS-based IR sensor detection system of the present invention. This second aspect is essentially identical to the first embodiment described for FIG. 11A, except that controller 1110 is replaced by controller 1116. Those skilled in the art recognize that the functions of controllers 1110 and 1116 can be combined to be performed by a single controller.

In a first mode of operation, which is a non-chopping mode of operation, in place of angle adjustment by voltage variation by way of controller 1110, the MEMS mirror array directs the IR energy beam to one of a plurality of focusing elements 706 representing a zone of interest within the FOV 440. The processor 1106 then signals the controller 1116 to adjust the MEMS mirror array 604 to switch to another of the plurality of focusing elements 706 in discrete, finite steps. The focusing elements 706 can comprise a lens element, e.g., a lenslet, or a mirror focusing element.

As before, either a non-chopping sub-mode of operation can be implemented wherein the IR zones 1150 within the FOV 440 are scanned in incremental steps in a continuous manner, as illustrated in FIG. 11A-1. In this sub-mode, again the electrical output signals are the convolution of the target with the FOV 440 which is then shaped by the IR filter 108.

In a second sub-mode in the non-chopping mode of operation, as illustrated in FIG. 11A-2, the elements 900 receive the optical beam 106, i.e., as IR energy, by traversing the IR zones 1150 within the FOV 440 in discrete, non-continuous steps. Again, the electrical output signals are the convolution of the target with the FOV 440 which is then shaped by the IR filter 108.

In a second mode of operation, which is a chopping mode of operation, in place of angle adjustment by voltage variation by way of controller 1110, the processor 1106 signals the controller 1116 to adjust the MEMS mirror array 604 to switch between one of the plurality of focusing elements 706 to another of the focusing elements 706. The focusing elements 706 can comprise a lens element, e.g., a lenslets or a mirror focusing element. The controller 1116 adjusts the MEMS mirror array 604 to switch between one of the plurality of focusing elements 706 to another focusing element in discrete, finite steps.

In that the second mode of operation is a chopping mode of operation, again a reference signal $S_R$ is derived by using the MEMS array 604 as an IR chopper that switches between the FOV 440 and the IR reference 1114. As such, the microprocessor or process controller 1106 and controller 1116 can step the IR zone within the FOV 440.

In both the first and second modes of operation of the embodiment of either FIG. 11A or FIG. 11, the process is repeated, left to right, up and down, until the entire FOV has been scanned. Once the entire FOV has been scanned the process is repeated and the new IR scan is compared with the previous scan(s) to determine the presence of an intruder. The IR scans are analyzed for changes in magnitude and position. Changes consistent with motion of an intruder annunciate an alarm signal. The ability to switch modes of operation such as to do non-chopping or chopping, or to change the scan rates can further improve false alarm immunity.

Also, as discussed previously, lens supervision can be achieved to detect tampering or degradation of the detector assembly 600 by verification of a reference signal from an IR source outside of the enclosure 802 by the processor 1106.

Figure 12:
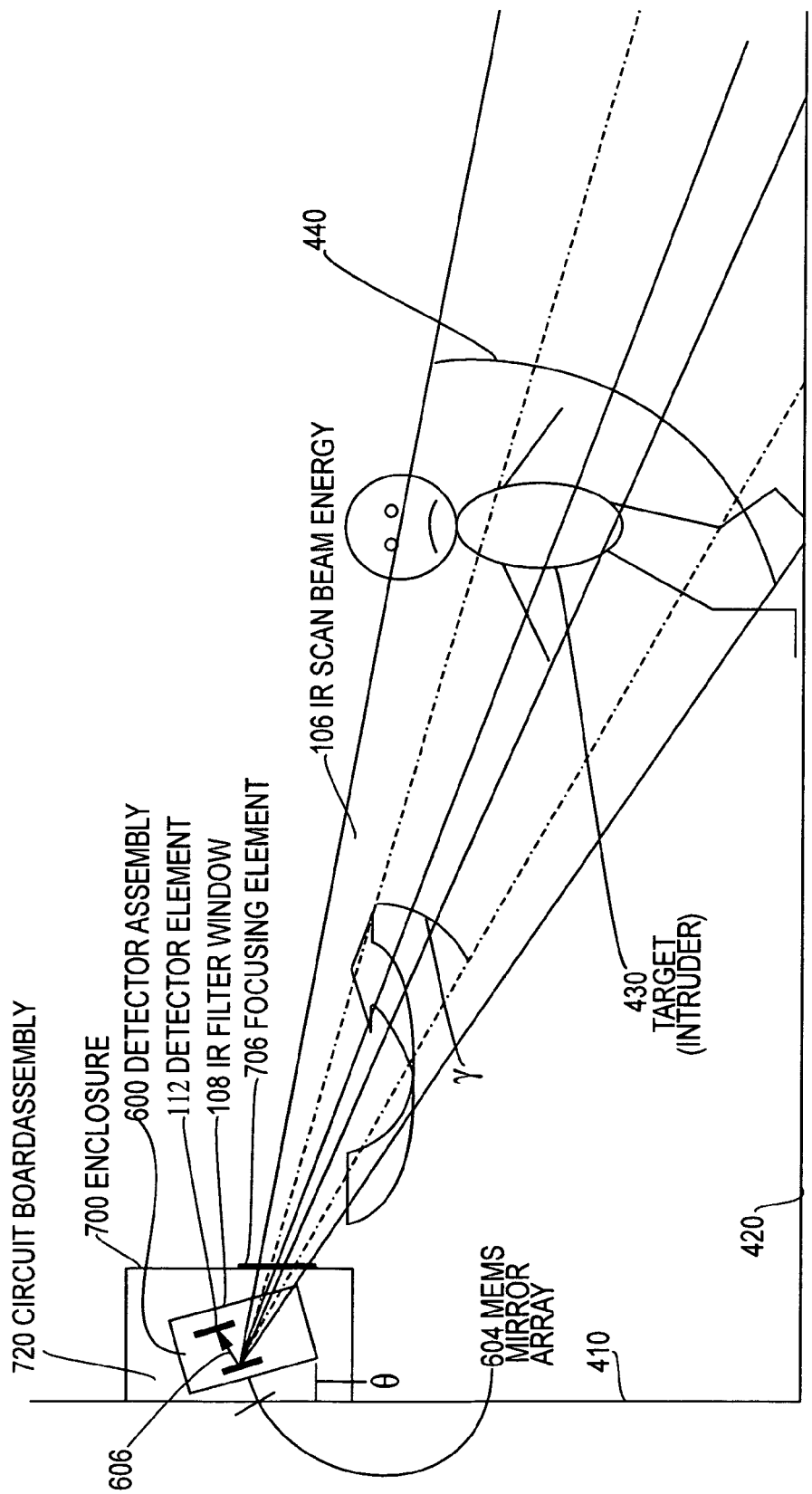
FIG. 12 is a side elevation view of an area coverage pattern of the MEMS-based IR sensor detection system of the present invention.

FIG. 12 is an elevation or side view of the IR beam exposure pattern of the detector assembly 600 of FIGS. 6A–6C. The detector assembly 600 is shown mounted within enclosure 700 on circuit assembly 720. The enclosure 700 is mounted on the wall 410 so as to receive IR energy of optical beam or beams 106 emanating from the volume of space bordered by the floor 420. The enclosure 700 with detector assembly 600 is mounted on a wall 410 and above the floor or ground 420 of a room or an outdoor area to detect an intruder in a volume of space formed by the wall 410 and the floor or ground 420. The IR energy from the beam 106, sweeps the FOV 440 such that the entire FOV 440 is covered.

The enclosure 700 with detector assembly 600 is mounted on the wall 410 and above the floor or ground 420 of the room or outdoor area of FIG. 4B to detect an intruder 430 in the volume of space formed by the wall 410 and the floor or ground 420. The scan signals 106 are separated by an angle γ to detect an intruder 430. The angle theta (θ) between the vertical and the circuit assembly is generally about 30° to 45°.

Figures 1, 13:
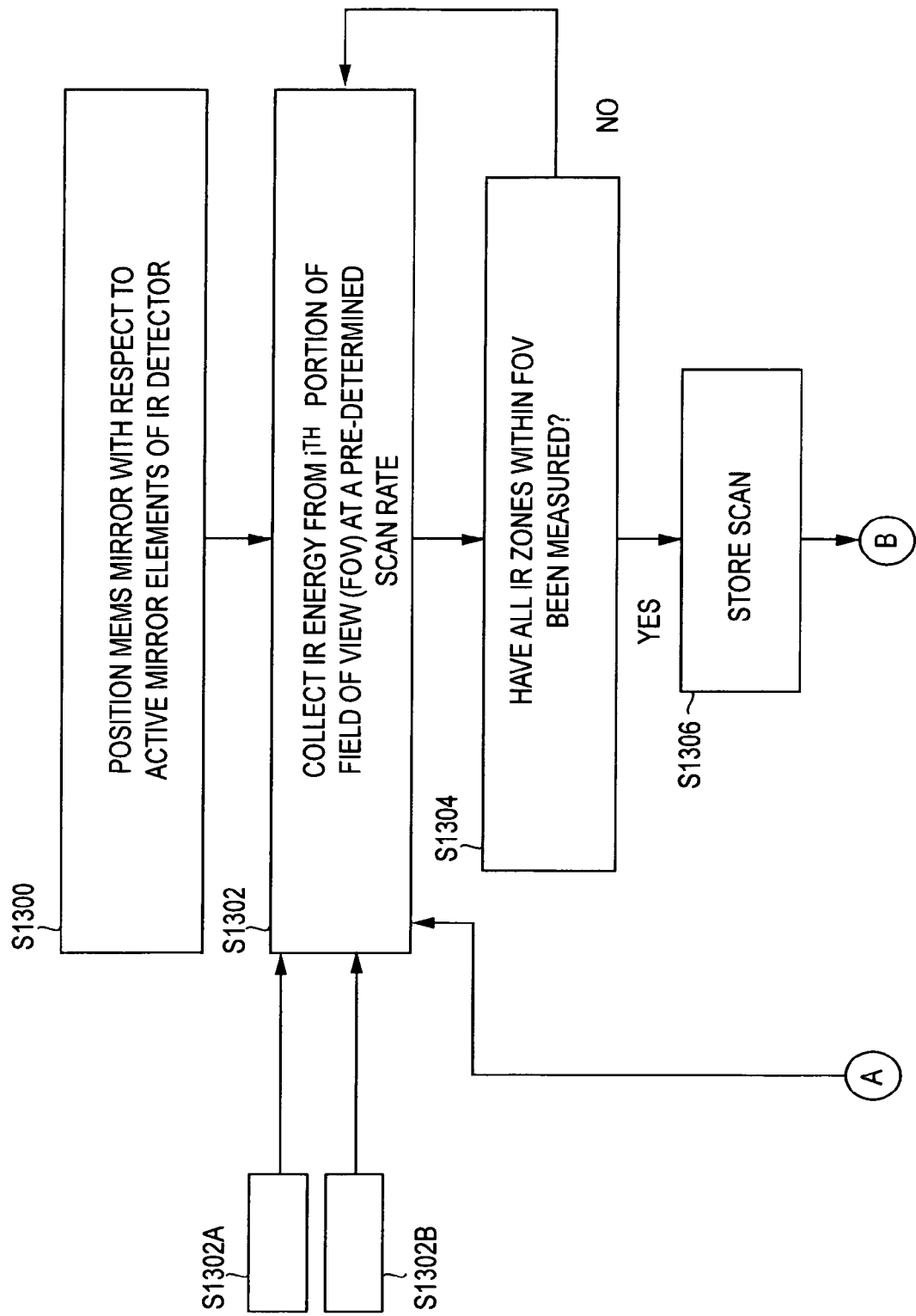
Figures 2, 13:
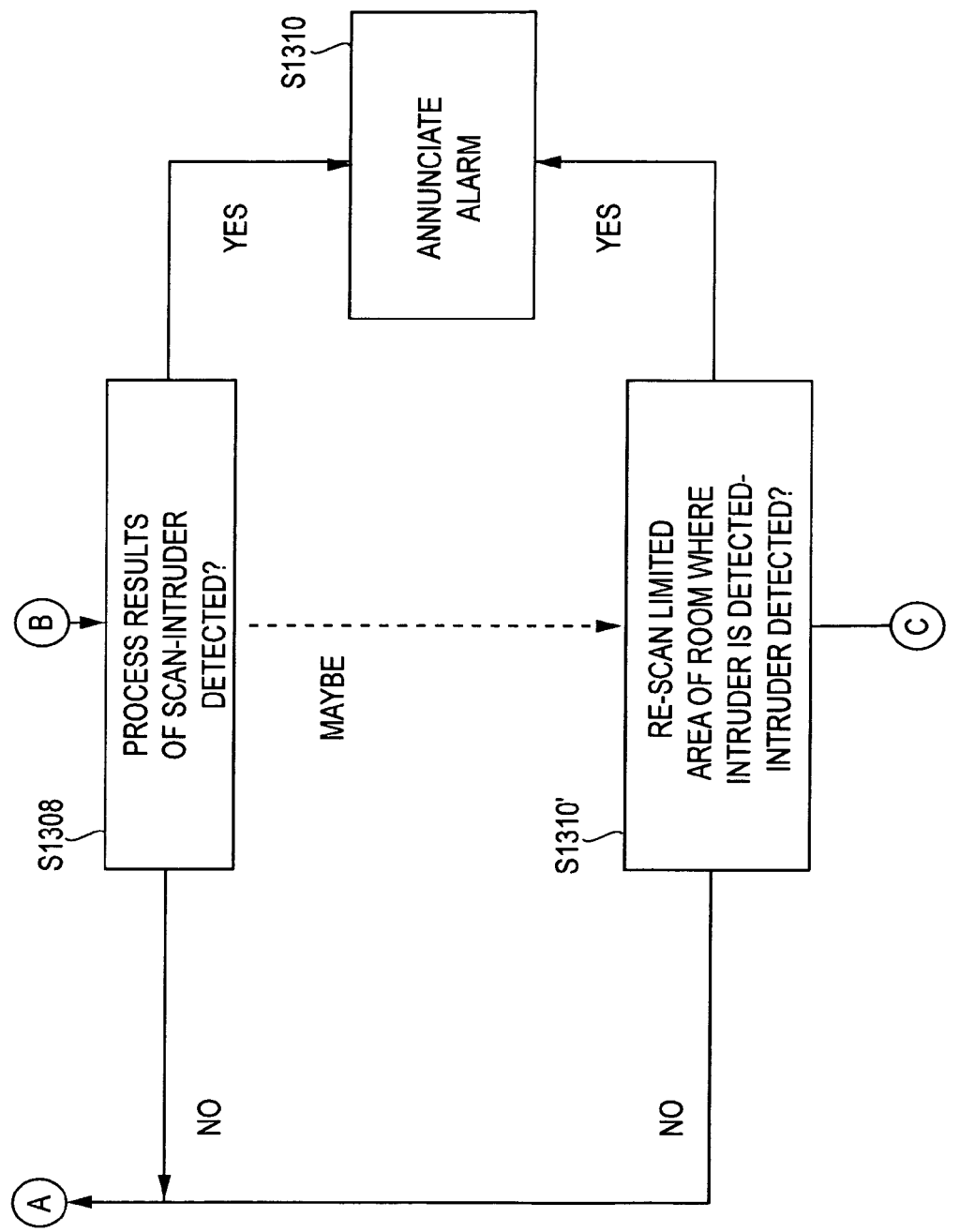
FIG. 13 is a method diagram of the steps of operating the MEMS-based IR sensor detection system of the present invention.
Figures 3, 13:
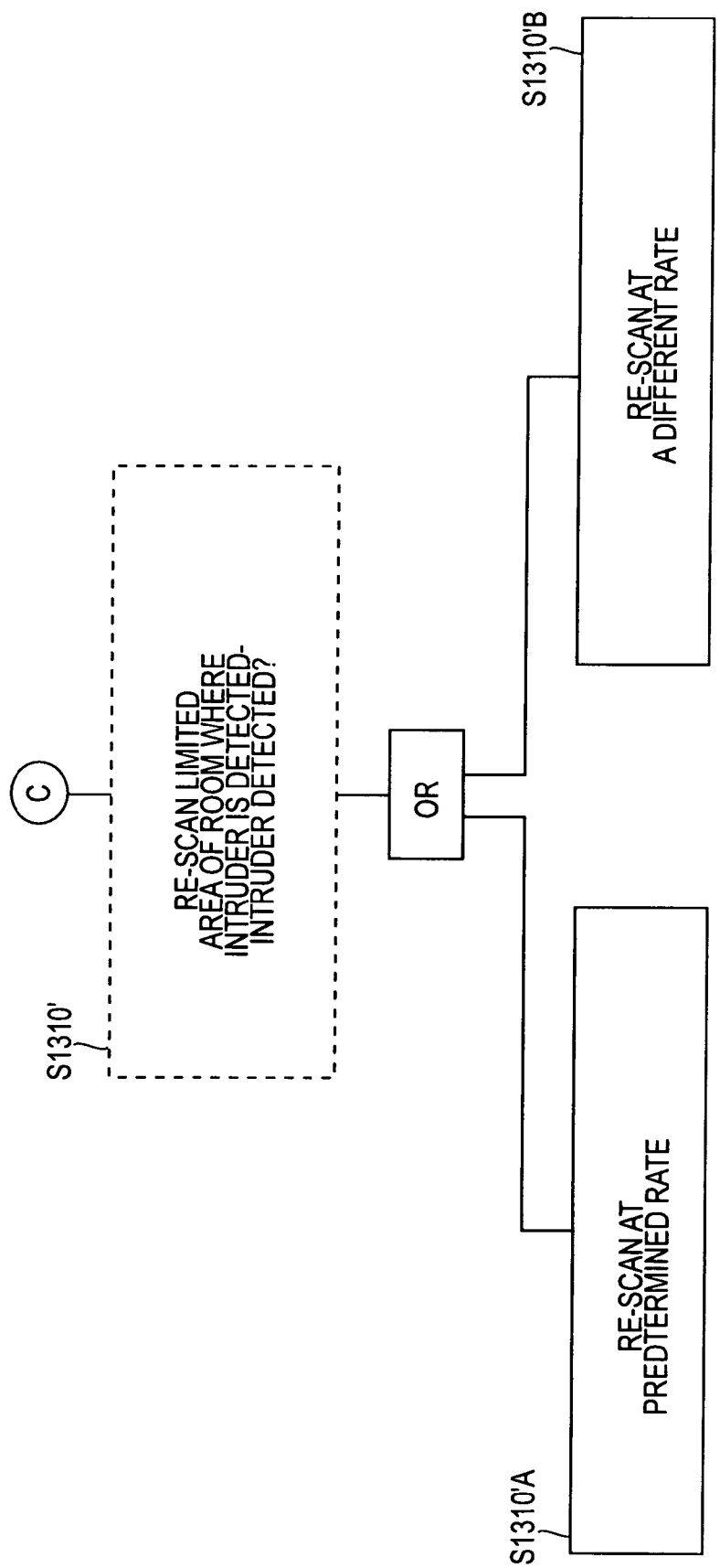

FIG. 13 is a method diagram of the steps of operating the MEMS based passive IR sensor detector assembly 600 of the present invention. In particular, step S1300 directs positioning the MEMS mirror 604 with respect to the active elements of the IR detector assembly 600. Step S1302 directs collecting the IR energy from the $i^{th}$ portion of the field of view (FOV) at a pre-determined scan rate. Step S1302 is achieved by performing either step S1302A or S1302B illustrated in FIGS. 13A and 13B, respectively. Step 1302A directs activating the MEMS mirror 604 of the first embodiment of the present invention to traverse the FOV 440 of the IR detector assembly 600. Step 1302A is performed either by performing step S1302A1 or step S1302A2. Those skilled in the art recognize that step S1302 of collecting the IR energy inherently includes the steps of focusing the IR energy beam, filtering the IR energy beam, reflecting the IR energy beam by the MEMS mirror array onto a detector, detecting the IR energy beam by means of the detector, converting the IR energy beam to an electrical signal, amplifying the electrical signal, converting the electrical signal from analog to digital, processing the electrical signal by means of a processor prior to annunciating detection, and storing the results in a memory. The method can further include the steps of controlling the MEMS mirror array to scan or traverse the field of view 440. All of the foregoing method steps are analogous to the apparatus functions disclosed in FIGS. 11A and 11B.

Step S1302A1 directs traversing the FOV 440 in a non-chopping mode by either performing step 1302A1' which directs traversing the IR zones 1150 of the FOV 440 in incremental, overlapping steps or by performing step S1302A1" which directs traversing the IR zones 1150 of the FOV 440 in discrete, finite steps.

Alternatively, step S1302A2 directs traversing the FOV 440 in a chopping mode by either performing step 1302A2' which directs traversing the IR zones 1150 of the FOV 440 in incremental, overlapping steps or by performing step S1302A2" which directs traversing the IR zones 1150 of the FOV 440 in discrete, finite steps.

In FIG. 13B, the alternative step S1302B of the second embodiment of the present invention directs the signal controller 1116 to adjust the MEMS mirror 604 to switch to another focusing element 706 to traverse the FOV 440 of the IR detector assembly 600. Step S1302B is performed either by performing step S1302B1 or step S1302B2.

Step S1302B1 directs switching to another focusing element 706 during traversal of the FOV 440 in a non-chopping mode by either performing step 1302B1' which directs traversing the IR zones 1150 of the FOV 440 in incremental, overlapping steps or by performing step S1302B1" which directs traversing the IR zones 1150 of the FOV 440 in discrete, finite steps.

Alternatively, step S1302B2 directs switching to another focusing element 706 during traversal of the FOV 440 in a chopping mode by either performing step 1302B2' which directs traversing the IR zones 1150 of the FOV 440 in incremental, overlapping steps or by performing step S1302B2" which directs traversing the IR zones 1150 of the FOV 440 in discrete, finite steps. The chopping mode alternates directing the beam 106 between a portion of the FOV 440 and the reference 1114.

Once step S1302 has been completed by performing step S1302A or step S1302B either separately or in combination, step S1304 directs determining whether all IR zones 1150 within the FOV 440 have been measured. If No, the process returns to step S1302. If Yes, step S1306 directs storing the scan. Step S1308 directs processing the results and determining whether an intruder 430 has been detected. If No, the process returns to step S1302. If Yes, step S1310 directs annunciating an alarm. If Maybe, step S1310' directs re-scanning a limited area of the room where the intruder is suspected and determining whether an intruder has actually been detected. If Yes, step S1310 of annunciating an alarm is performed. The re-scanning process of step S1310' can be implemented either by step S1310'A of re-scanning at the pre-determined rate or by step S1310'B of re-scanning at a different scan rate to minimize the chances of initiating a false alarm.

Although, as noted previously, it is generally intended to screen out as intruders small animate objects such as pets and children, the system and method can also be used to detect such "intruders" in locations where their safety is jeopardized. In indoor locations, such locations include a furnace room or a kitchen area surrounding a stove or other such appliance. The system and method can also be applied in outdoor locations such as swimming pools. In addition, the system and method can be used to detect children, pets and animals in blind spots around mobile vehicles such as the rear end or front end of sports utility vehicles (SUVs), mini-vans, trucks, buses (especially school buses), or construction equipment.

As noted, this system can also be used to detect any gas or vapor with IR absorption characteristics including, but not limited to harmful, toxic, explosive or flammable vapors or gases such as: carbon monoxide (CO), volatile organic compounds (VOCs), hydrogen ($H_2$), methane ($CH_4$), propane ($C_2H_6$), or other beneficial or non-toxic gases such as oxygen ($O_2$) or carbon dioxide ($CO_2$). It can also be used to detect flames.

Figure 14:
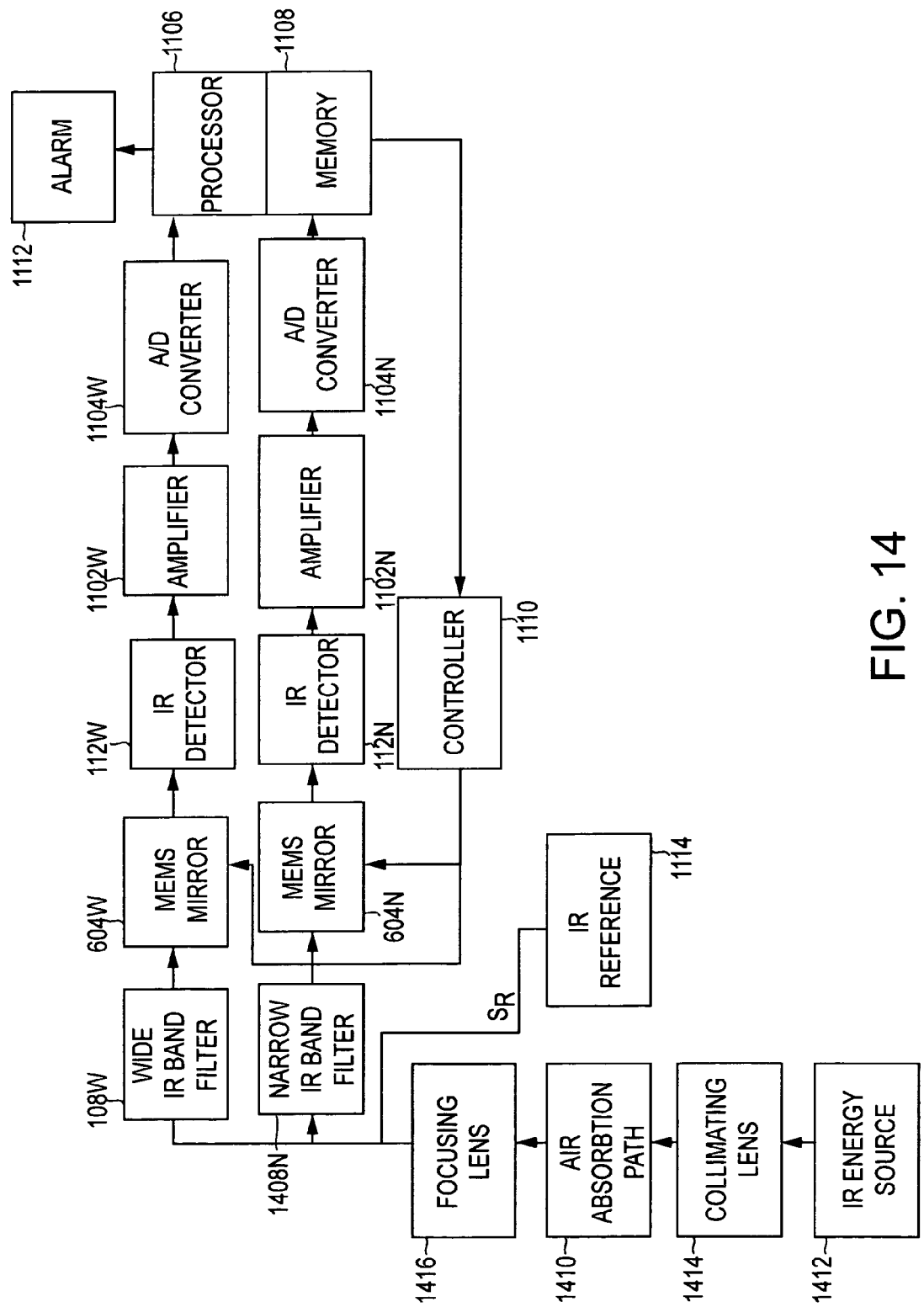
FIG. 14 illustrates a third embodiment of the present invention wherein a MEMS-based IR detector assembly is arranged to detect gases or vapors.

FIG. 14 illustrates a third embodiment of the present invention wherein the IR detector assembly 1400 is arranged to detect gases or vapors. The third embodiment is identical to that shown in FIG. 11A except that an ambient air path or IR absorption path 1410 which provides a potential gas or vapor sample is positioned between a collimating lens 1414 and a focusing element or lens 1416 IR, i.e., thermal, energy reference source 1412 is positioned behind the collimating lens 1414. The collimating lens 1414 collimates the IR energy beam 1420 emitted by the IR reference source 1412 prior to passing through the air path 1410. The IR detector assembly 1400 is identical to detector assembly 600 previously shown in FIGS. 6A–6C, 7 and 8, except that a narrow IR band pass filter element 1408N is provided in addition to the wide IR band pass filter element 108W. The narrow IR band pass filter element 1408N and the wide IR band pass filter element 108W each are positioned in parallel.

During operation, IR energy from the IR energy source 1412 is directed either to the narrow IR band pass filter element 1408N or the wide IR band pass filter element 108W, or to both. Upon emerging from the narrow IR band pass filter element 1408N, the IR energy beam from the IR energy source 1412 is directed sequentially to MEMS mirror array 604N, IR detector element(s) 112N, amplifier 1102N and A/D converter 1104N, and finally to processor 1106/memory 1108. Similarly, upon emerging from the wide IR band pass filter element 1408W, the IR energy beam from the IR energy source 1412 is directed sequentially to MEMS mirror array 604W, IR detector element(s) 112W, amplifier 1102W and A/D converter 1104W and finally to processor 1106/memory 1108.

As before, the signal emerging from the A/D converter 1104 is processed by the processor 1106/memory 1108 by an algorithm and a feed back signal is provided through the controller 1110 to adjust either or both of the MEMS mirrors 604N and 604W. In one manner of operation, the controller 1110 adjusts an angle of at least one mirror element 900 of either or both of the MEMS mirror arrays 604N and 604W. In an alternate manner of operation, the controller toggles the angle position of either or both of the MEMS mirror arrays 604N and 604W. Changing the voltage to the mirror elements 900 causes motion by at least one of thermal expansion and electrostatic force. In still another manner of operation, the controller 1110 can activate either or both of the MEMS mirror arrays 604N and 604W to switch in a chopping mode between the IR source 1412, which is focused by the focusing lens 1416, and the IR reference 1114. The IR reference 1114 bypasses the collimating lens 1414, the air absorption path 1410, and the focusing lens 1416, and supplies reference signal $S_R$ directly to the wide IR band filter 108W and to the narrow IR band filter 1408N. With the narrow band pass filter element 1408N added to the optical path detected by the detector assembly 1400, detection is achieved in an IR chopping mode by comparing the IR absorption characteristics of any gases or vapors present within the FOV 440 with the reference signal $S_R$. The reference signal $S_R$ is derived by using the MEMS mirror array 1400 as an IR chopper that switches between the FOV 440 and IR reference 1114. As noted, the IR source 1412 emits a wideband signal. The narrowband IR filter 1408N limits the spectrum to the portion of interest for a given gas.

Figures 15A, 15B:
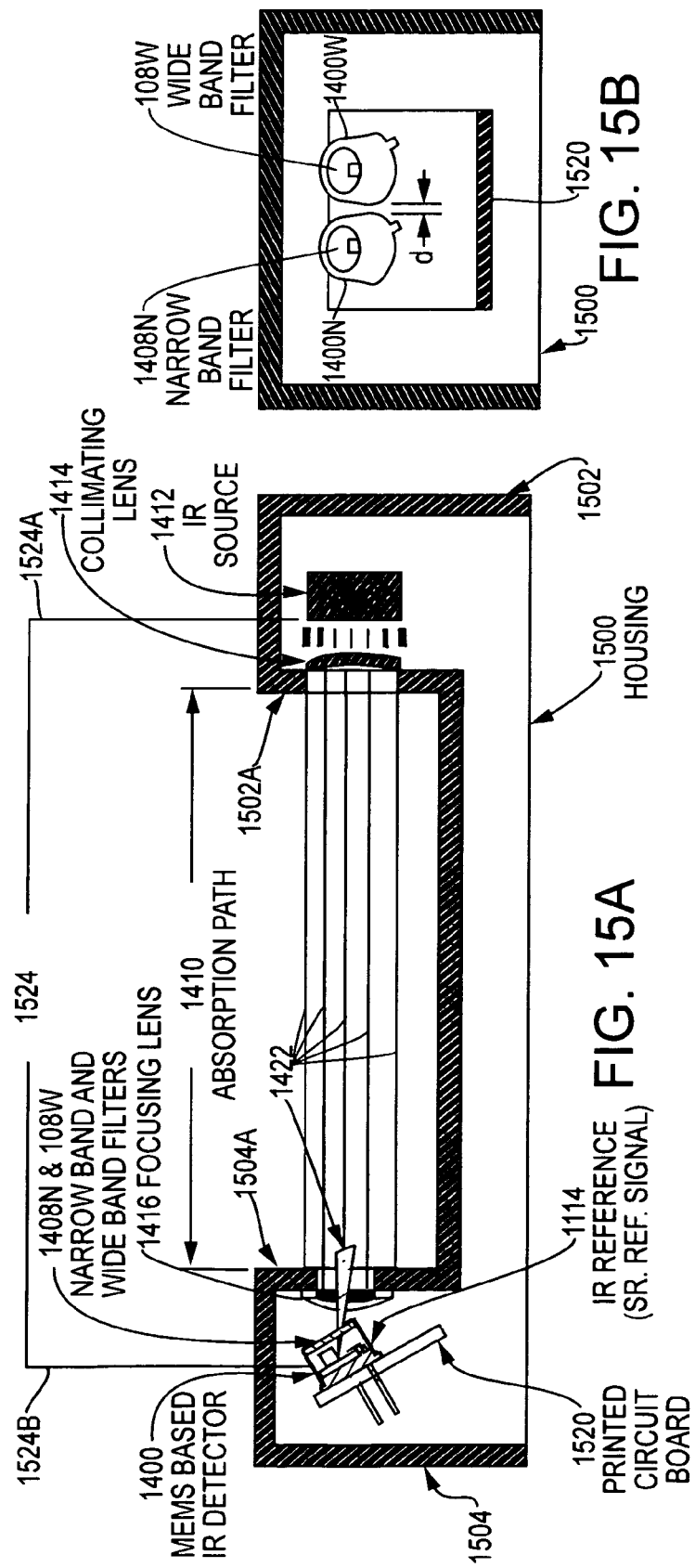
FIG. 15A illustrates an elevation cross-sectional view of the infra-red sensor detector assembly of FIG. 14 designed for the detection of gases or vapors.
FIG. 15B illustrates an elevation cross-sectional view of a variation of the infra-red sensor detector assembly of FIG. 15A designed for the detection of gases or vapors.

FIG. 15A illustrates an elevation cross-sectional view of the infra-red sensor detector assembly 1400 as mounted within an enclosure 1500 designed for the detection of gases or vapors. The enclosure 1500 is in the form preferably of a "C" shape to enable the ambient air path 1410 to be disposed between the IR (thermal) energy source 1412 and the narrow band pass filter element 1408. Since the housing 1500 is in the form preferably of a "C" shape, there are two opposite legs 1502 and 1504. Leg 1502 has a surface 1502a which faces surface 1504a of leg 1504. The IR source 1412 is mounted within an interior region of one of the legs, 1502 as shown. The MEMS-based IR detector 1400 is shown mounted within an interior region of the opposite leg 1504. The collimating lens 1414 is positioned to penetrate the surface 1502a while the focusing lens 1416 is positioned to penetrate the surface 1504a. The IR source 1412 therefore emits the uncollimated beam 1420 which is collimated by lens 1414 and emerges from the lens 1414 as collimated beam 1422. The ambient air absorption path 1410 comprises any potential gas or vapor sample to be detected. The collimated beam 1422 passes through the ambient air absorption path 1410 and passes through any potential gas or vapor sample. The collimated beam 1422 then penetrates the focusing lens 1416 and proceeds through the narrow band pass filter 1408N of the MEMS based IR detector assembly 1400 where it is reflected by a MEMS mirror array and reflected onto a detector element in the same manner as described previously with respect to detector assembly 600. The detector assembly 1400 is mounted on printed circuit board 1520 which comprises the logic circuitry and memory storage of data regarding the IR spectrum absorption characteristics of the gases or vapors of interest to be detected by the detector assembly 1400. The system is self calibrated by using a second detector with a wide band IR filter such as that used in the first embodiment to compensate for variations such as intensity of the IR source and ambient lighting. The FOV in this case is limited to the IR zone defined by the collimated beam 1422.

The IR heat source 1412 is at the distal end 1524A of the optical path 1524 and of the air (absorption) path 1410 and the temperature of the IR heat source 1412 is measured in the vicinity of the IR heat source 1412 and the sidewall 1502. The optical path 1524 includes the collimating lens 1414, the air (absorption) path 1410, the focusing lens 1416, the filter windows 108W and 1408N, the MEMS mirror arrays 604N and 604W, and the detector element(s) 112N and 112W. The temperature of a point at a known temperature is measured at the distal end 1524B of the optical path 1524. The proximal end of the optical path 1524 includes the side wall 1504 of the detector housing 1500, the MEMS mirror arrays 604N and 604W, and the detector element(s) 112N and 112W.

When a decrease is detected in the ratio $S_{NB}/S_{WB}$ of the narrow band $S_{NB}$ to wide band $S_{WB}$ detector signals, which indicates the presence of the gas or vapor of interest, a series of measurements can be taken to minimize the occurrence of false alarms. Once a positive identification is made of a gas or vapor of interest, the alarm 1112 is annunciated in the same manner as with respect to detection of an intruder.

In reality, traversing the FOV for gas detection is a generalization. Only one point on the FOV need be looked at. Traversing the FOV requires either one large IR source or multiple IR sources. In such a case, the housing 1500 would be separated into two parts: one for the IR source(s) 1412 and one for the detector 1412.

FIG. 15B is cross-sectional elevation view of a variation of the third embodiment of the present invention wherein the wideband elements, i.e., wide IR band filter 108W; MEMS mirror 604W; IR detector 112W; amplifier 1102W; and A/D converter 1104W are each enclosed in or associated with a discrete wide band MEMS based IR detector 1400W while the narrow band elements, i.e., narrow IR band filter 108N; MEMS mirror 604N; IR detector 112N; amplifier 1102N are each enclosed in or associated with a discrete narrow band MEMS based IR detector 1400N. The two detectors 1400W and 1400N are separated by a distance d which is minimized to reduce the area which the collimated IR beam needs to be focused onto. An alternative approach is to make one detector housing which contains both the narrow IR band and wide IR band elements and separate them with a partition in the middle so as to minimize reflections and/or cross talk between the two detectors 1400W and 1400N.

FIG. 16 illustrates a plan view of a MEMS based IR detector assembly 1600 which houses both narrow band and wide band detectors for gas detection. FIG. 16A is a section view along section line 16A—16A. FIG. 16B is a section view along section line 16B—16B. FIG. 16C is a section view along section line 16C—16C. The detector assembly 1600 includes five pins 1, 2, 3, 4 and 5: one for power, one for ground, one for signal out from the narrow band detector portion 1602N, one for signal out from the wide band detector portion 1602W, and one for MEMS control signal. FIG. 16D is a perspective view of the detector assembly 1600. FIG. 16E is a cutaway view of the detector assembly 1600. A partition 1604 can be used to combine the narrow IR band detector portion 1602N and wide IR band detector portion 1602W into one detector housing 1610. The partition 1604 is included inside the detector assembly 1600 to separate the wideband elements, i.e., wide IR band filter 108W; MEMS mirror 604W; IR detector 112W; amplifier 1102W; and A/D converter 1104W, from the narrow band elements, i.e., narrow IR band filter 1408N; MEMS mirror 604N; IR detector 112N; amplifier 1102N; and A/D converter 1104N. The purpose of the partition is to reduce reflections and/or cross talk between the two sections of the detector 1400. Typically, the detector 1400 is sealed with the wide band filter 108W; the narrow band filter 1408N is placed either on top of or below the wide band filter 108W, as shown in FIG. 16E. Those skilled in the art recognize that the diameter or perimeter of the housing 1610 is generally larger than the embodiment shown in FIGS. 6A–6C and 7 and is a function of the optics and physical size of the narrow band and wide band portions of the detector.

Figure 13A:
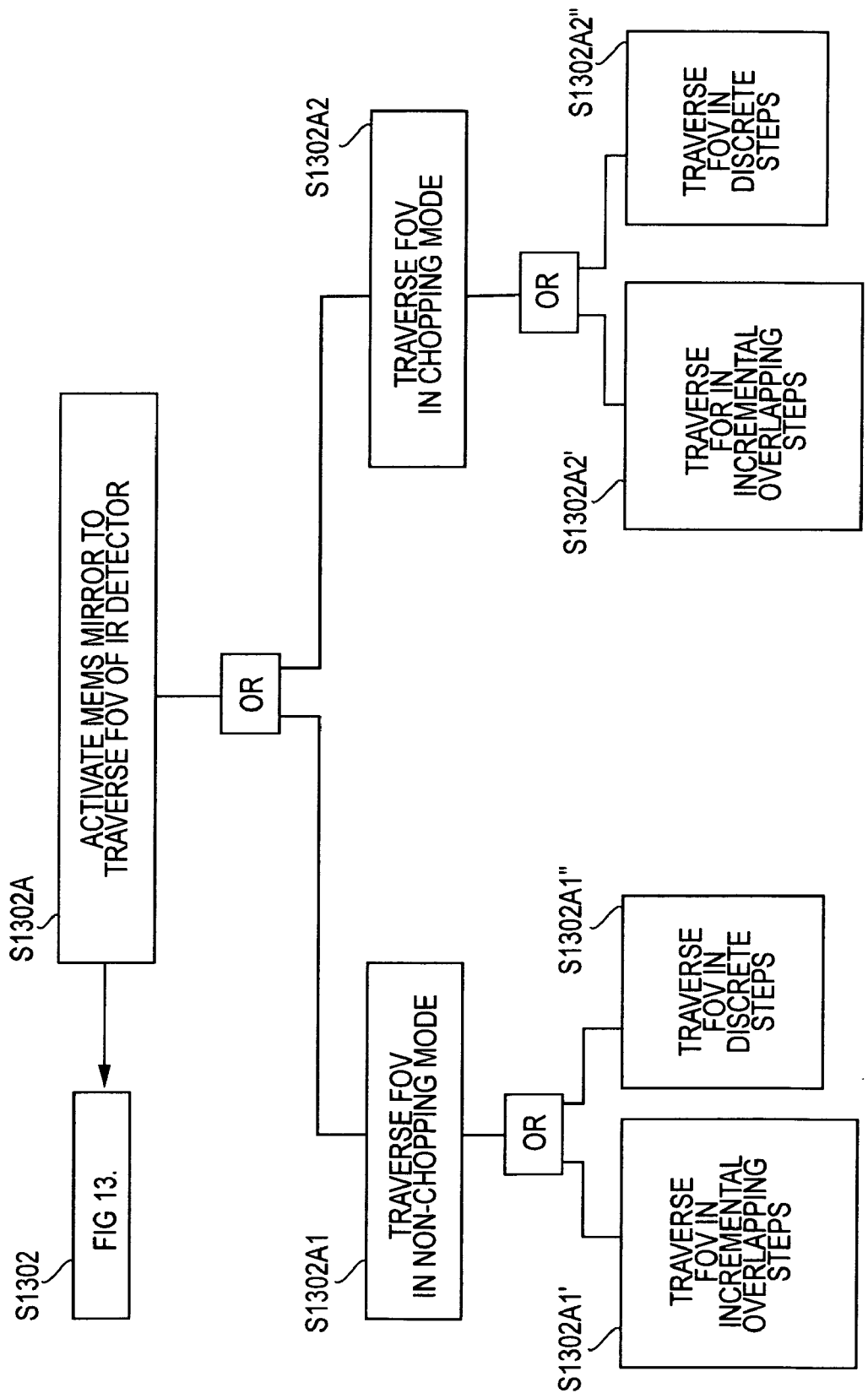
FIG. 13A is a method diagram of a first alternative method of operating the MEMS-based IR sensor detection system of the present invention.

FIG. 16A1 illustrates an example of a scan output for detecting an intruder by traversing the FOV 440 in a non-chopping mode corresponding to step S1302A1 of FIG. 13A. The x-axis represents the time in seconds. The y-axis represents the angle $\alpha_1$, of the mirror, $\Phi$ of FIG. 4A. It should be noted that the plan view shown in FIG. 4A is the same for the present invention as it is for the prior art. The pyroelectric detector 600 is a rate of change or second order detector. Therefore, a signal is generated when a change in temperature is detected. A room at a constant temperature produces no electrical signal. A room divided into three temperatures "0", "+1", "−1" produces a positive signal on the transition between 0 and +1 and a negative signal of twice the magnitude between +1 and −1, assuming the crystal is positively polarized. The width of the signal generated is a function of the sensitivity of the detector, the scan rate or the system and the shape of the beam. FIG. 16A1 shows pointing angle $\alpha_1$ of the system and the duration of time spent t in seconds. The actual electrical signal is a function of the type of scan performed and the IR characteristics of the room. This discussion applies as well to the following FIGS. 16A2, 16B1 and 16B2. It should be noted that FIGS. 16A1, 16A2, 16B1 and 16B2 are planar representations of the horizontal movement. There are several, typically three (3), vertical tiers.

FIG. 16A2 illustrates an example of a scan output for detecting an intruder by traversing the FOV in a chopping mode corresponding to step S1302A2 of FIG. 13A. The x-axis represents the time in seconds. The y-axis represents the angle $\alpha 1$, within the FOV $\Phi$ of FIG. 4A.

FIG. 16B1 illustrates an example of a scan output for detecting an intruder by switching on/off of a lens element in a non-chopping mode corresponding to step S1302B1 of FIG. 13B. The x-axis represents the time in seconds. The left side y-axis represents the angle $\alpha 1$, within the FOV $\Phi$ of FIG. 4A. Specifically, the right side y-axis represents a plurality of focal elements $A_1 \ldots A_N$ where in this example, N=7, each of which corresponds to an angular range in an angle $\alpha 1$ of the FOV. The plurality of focal elements corresponds to the focal element(s) 706 of FIG. 8.

FIG. 16B2 illustrates an example of a scan output for detecting an intrusion by switching from one to another lens element in a chopping mode corresponding to step S1302B2 of FIG. 13B. The x-axis represents the time in seconds. The left side y-axis represents the angle $\alpha 1$, within the FOV $\Phi$ of FIG. 4A and specifically, as before, the right side y-axis represents a plurality of focal elements $A_1 \ldots A_N$. FIG. 16B2' is an enlarged detail of the chopping mode corresponding to FIG. 16B2 of switching from one to another lens element. Following a dwell time $T_D$, there is a transition time $T_T$.

Figure 17:
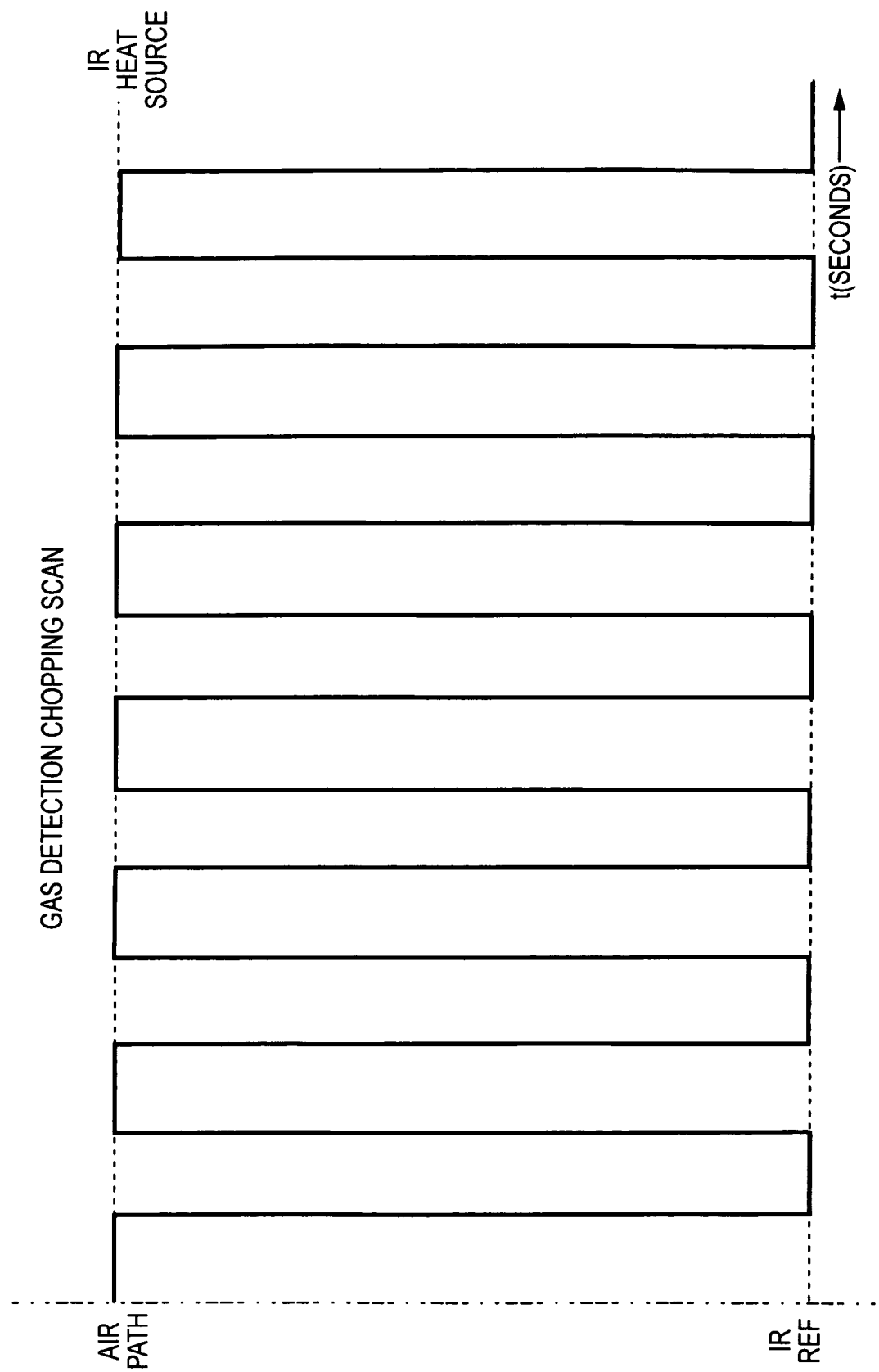
FIG. 17 illustrates a chopping scan for the gas detection method of FIGS. 13 and 13B.

FIG. 17 illustrates an example of a scan output for detecting a gas or vapor by scanning in a chopping mode the air absorption path as the FOV, as corresponds to use of the gas detector apparatus of FIGS. 14 and 15 in a chopping mode according to step S1302A2 of FIG. 13A2. The x-axis represents the time in seconds. The y-axis represents the FOV of the system. The air or absorption path 1410 points at the IR heat source 1412 and a location outside of view of the heat source, IR reference 1114, thereby providing radiant contrast by alternating between the IR source 1412 and room temperature.

Figures 19, 20:
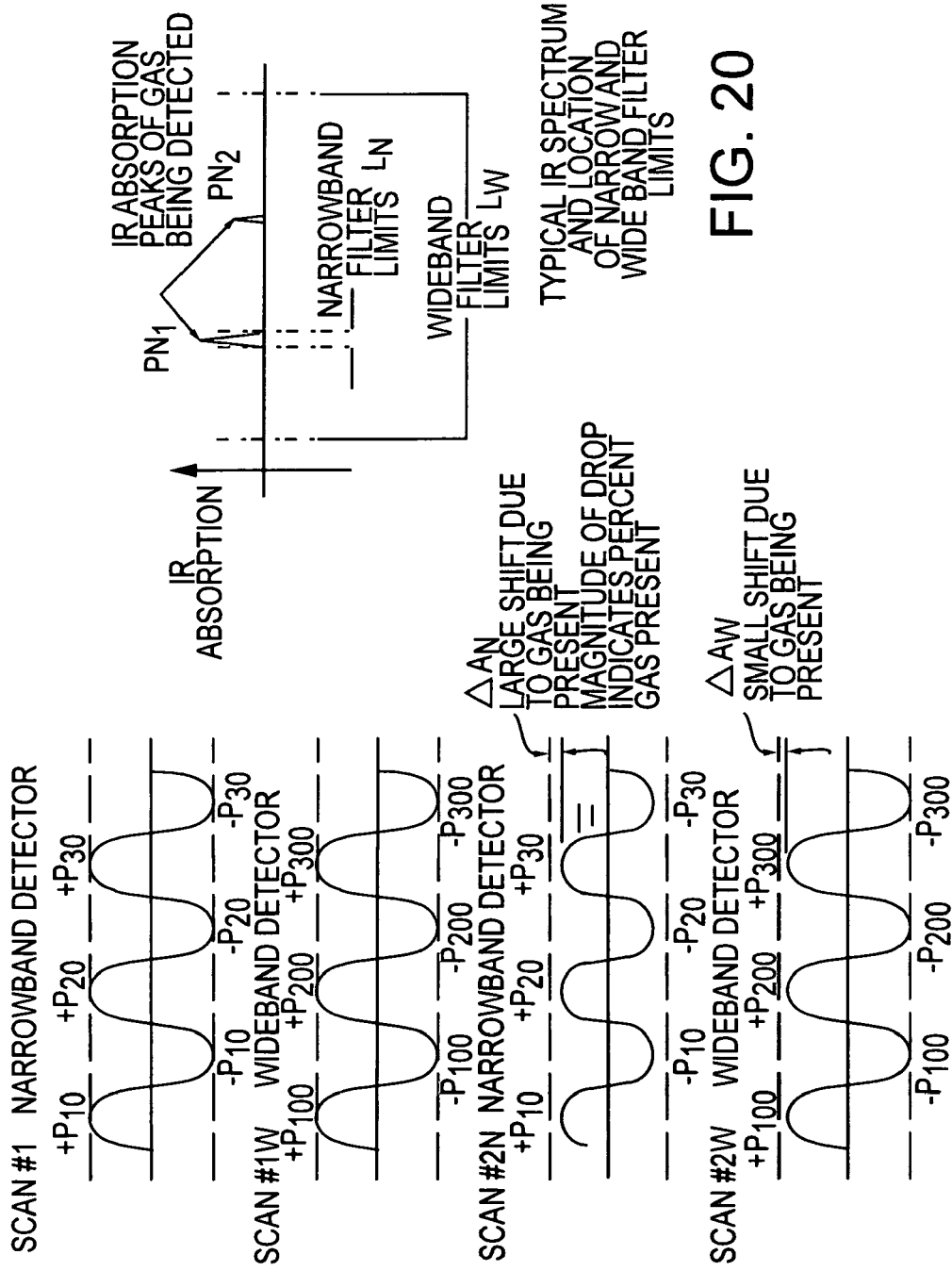
FIG. 19 illustrates an electrical signal output for the gas detection chopping scan of FIG. 17.
FIG. 20 illustrates IR absorption peaks for the gas detection chopping scan of FIG. 19.

In other words, the gas detection scheme measures IR energy at two points: the IR energy of the IR heat source 1412 which is on the other side of the air (absorption) path 1410 and the IR energy of a point at a known temperature, i.e., IR reference 1114 in the side wall of the MEMS-based IR detector 1400. FIG. 17 represents the IR energy level of the FOV, whereas, the output of the detector 1400 is illustrated in FIG. 19, which is discussed later. Specifically, the FOV in this case is effected by switching between the IR source 1412 and the IR reference 1112. Since the output of the narrow band detector decreases by approximately 30–40% when the gas of interest is present and the output of the wide band detector decreases by 1–4% when the gas of interest is present, the ratio of the narrow band signal to the wideband signal is far less sensitive to noise (ambient light, IR source variations) fluctuations, and represents more definitive evidence of the presence of a gas or vapor of interest within the air path 1410.

The method of operation of the gas or vapor detection system of the third embodiment of the present invention is analogous to implementing steps S1302A or S1302B in the chopping modes of steps S1302A2 or S1302B2, respectively. Those skilled in the art recognize that the steps S1302A or S1302B of collecting the IR energy inherently include the steps of focusing the IR energy beam, filtering the IR energy beam, reflecting the IR energy beam by the MEMS mirror array onto a detector, detecting the IR energy beam by means of the detector, converting the IR energy beam to an electrical signal, amplifying the electrical signal, converting the electrical signal from analog to digital, and processing the electrical signal by means of a processor prior to annunciating detection. In addition, the method can include the step of controlling the MEMS mirror array. All of the foregoing method steps are analogous to the apparatus functions disclosed in FIG. 14.

However, the gas detection method does not include a step of scanning of the FOV. Rather, the method includes the steps of measuring the IR energy of the IR heat source 1412 which is on the other side of the air (absorption) path 1410 and measuring the IR energy of a point at a known temperature, i.e., IR reference 1114 in the side wall of the MEMS-based IR detector 1400. Each IR energy is measured through both the narrow IR band filter 1408 and narrow IR band detector 112N and through the wide IR band filter 108 and wide IR band detector 112W. The step of detecting of gas occurs by measuring a decrease in the IR energy beam received by the detector with the narrowband filter 112N. In addition, the step of calibrating the detector system occurs by measuring the IR energy beam received by the detector with the wideband filter 112W.

Figure 18:
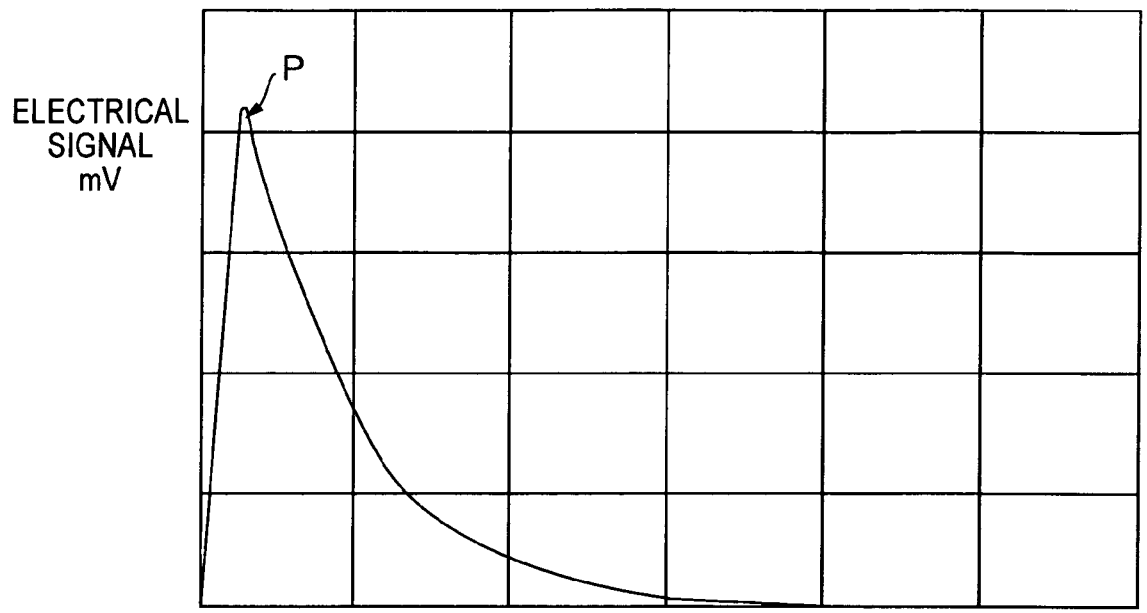
Figure 1:
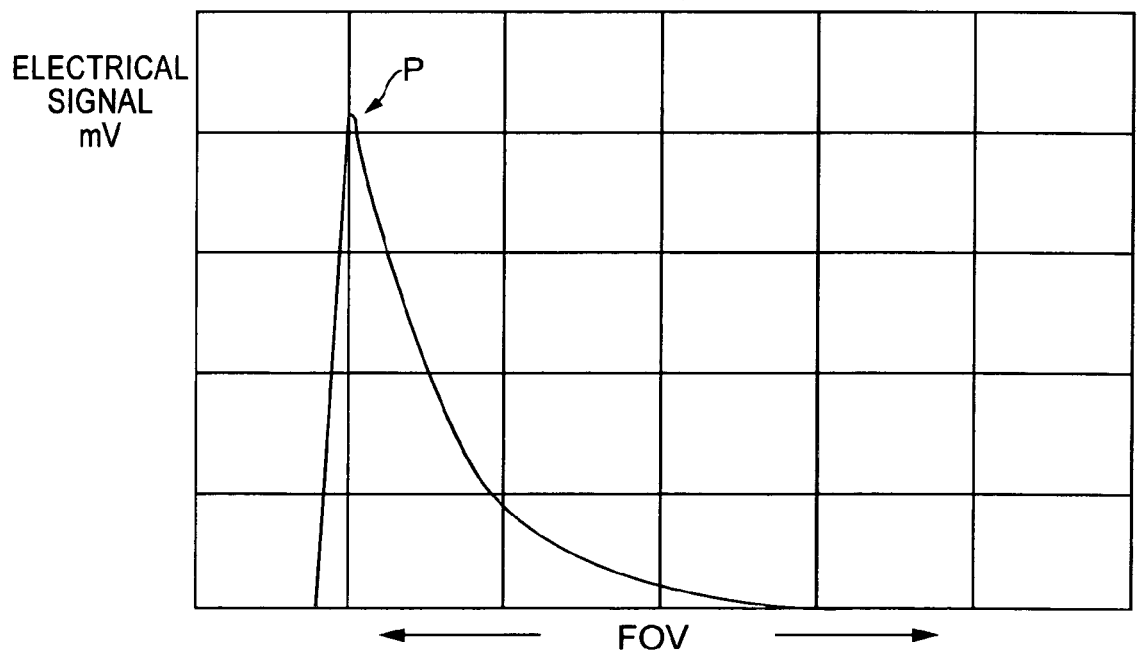
Figures 2, 18:
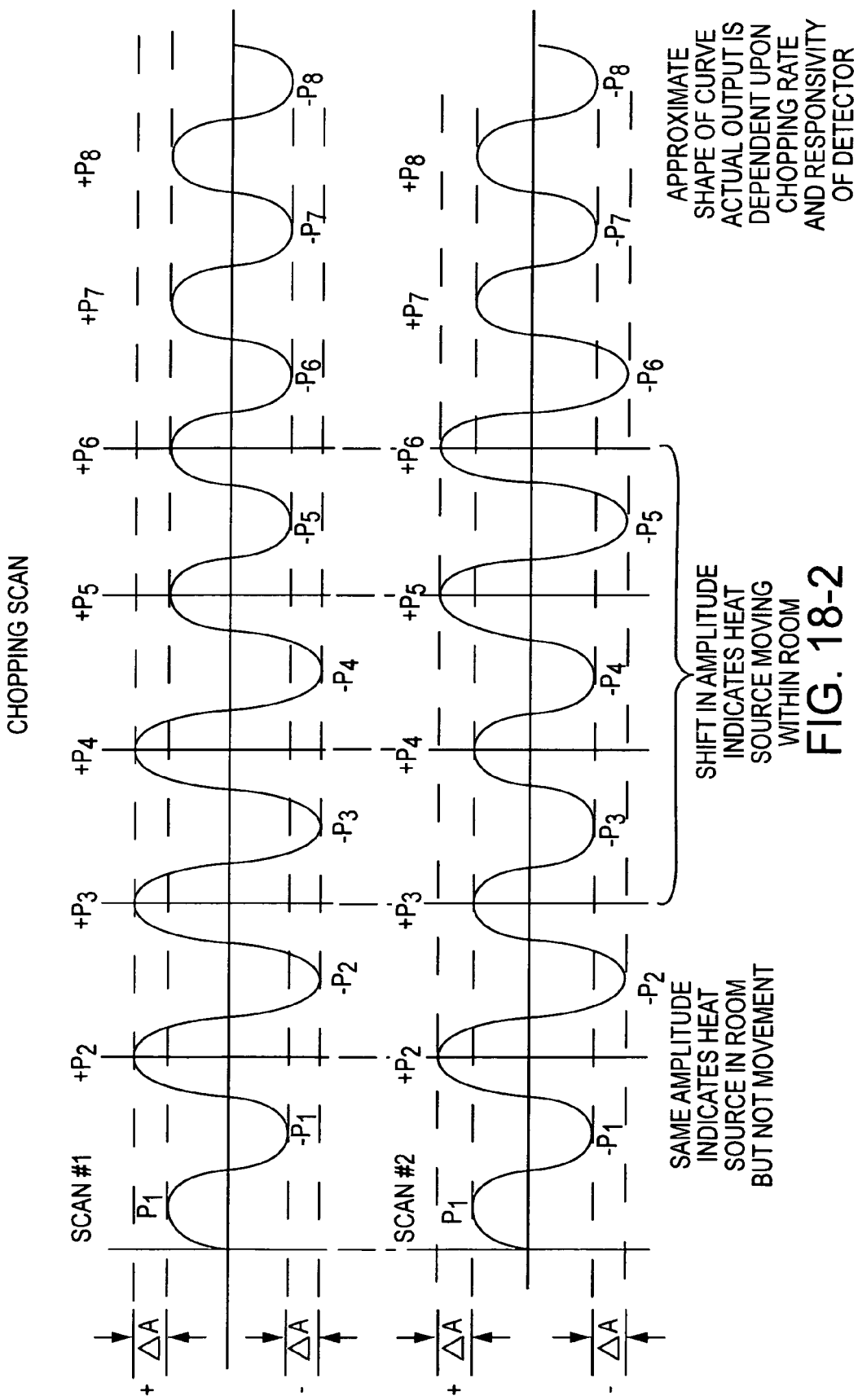

FIG. 18-1 illustrates an example of detector output versus the FOV as a comparison of two scans 1 and 2 in the non-chopping mode for the intrusion detection system corresponding to either FIGS. 16A1 or 16B1. A comparison between Scan 1 and Scan 2 shows that the peak P of the electrical signal has shifted from left to right within the FOV. The shift of the signal peak P indicates the movement of a heat source within the room, potentially providing grounds for annunciation of an alarm signal.

FIG. 18-2 illustrates an example of an electrical signal output in millivolts, mv, versus the FOV as a comparison of two scans 1 and 2 in the chopping mode for the intrusion detection system corresponding to either FIGS. 16A2 or 16B2. A difference in amplitude $\pm\Delta A$ in the electrical signal gives rise to peak signals $+P_1$ to $+P_8$ and $-P_1$ to $-P_8$. In a comparison between Scans 1 and 2, detection of the same amplitude $\pm\Delta A$ of the peaks $\pm P_1$ to $\pm P_2$ indicates the presence of a heat source in the room but not movement of the heat source. A change in the amplitude of the peaks $\pm P_3$ to $\pm P_6$ indicates movement of the heat source within the room, potentially providing grounds for annunciation of an alarm signal. The shape of the curves is approximate. The actual output is dependent upon the chopping rate and the responsivity of the detector. Responsivity is a measure of the time constant of the detector.

FIG. 19 illustrates an example of detector output versus the FOV, i.e., the air path as a comparison of two scans 1 and 2 in the chopping mode for the gas detection system corresponding to FIG. 17. Scan 1 includes both a narrowband detector scan output 1N and a wideband detector scan output 1W. Similarly, scan 2 includes both a narrowband detector scan output 2N and a wideband detector scan output 2W. The narrowband scans 1N and 2N each include peaks $\pm P_{10}$ to $\pm P_{30}$, while wideband scans 1W and 2W each include peaks $\pm P_{100}$ to $\pm P_{300}$.

A large difference in amplitude $\pm \Delta A_N$ in the peaks $\pm P_{10}$ to $\pm P_{30}$ of the electrical signal of the narrowband scans 1N and 2N indicates the presence of a gas or vapor of interest. The magnitude of the difference in amplitude indicates the percentage of gas or vapor that is present. Correspondingly, only a small difference in amplitude $\pm \Delta A_W$ occurs in the peaks $\pm P_{100}$ to $\pm P_{300}$ of the electrical signal of the wideband scans 1W and 2W due to the presence of the gas or vapor of interest.

FIG. 20 illustrates a typical IR absorption spectrum for a gas of interest for gas detection of FIG. 19. Within the narrowband filter limits $L_N$ an absorption peak $P_{N1}$ is observed as a result of a gas or vapor of interest being detected. Correspondingly, within the wideband filter limits $L_W$ one or more absorption peaks $P_{N1}$ and $P_{N2}$ are observed. The figure illustrates two peaks. The absorption peaks $P_{N1}$ and $P_{N2}$ are offset within the spectrum. The bandwidth of the wideband filter is selected such that the presence of the gas does not significantly affect the signal produced by the IR source.

Figure 20A:
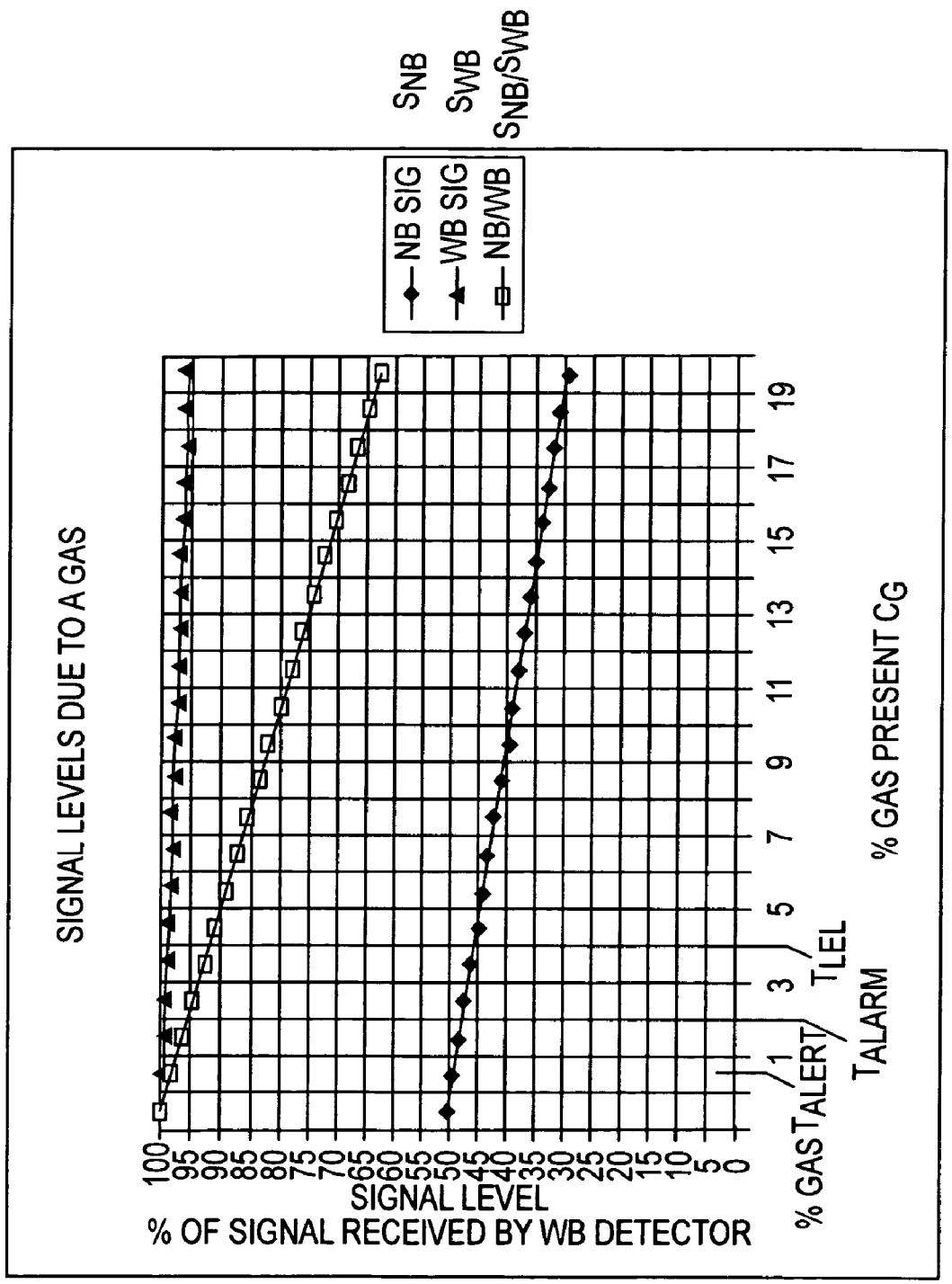
FIG. 20A illustrates signal levels detected by both narrow band and wide band detectors and the ratio of the narrow band to wide band signal levels in the presence of a gas.

FIG. 20A is a graph representing the output signals generated by the narrow band and wide band IR detectors 112N and 112W, respectively, in the presence of a gas. The x-axis represents the percentage concentration of gas present, designated as $C_G$. The y-axis represents the percentage of the output signal $S_{WB}$ generated by the wideband detector 112W. The output signal $S_{NB}$ generated by the narrow band detector 112N is shown as 50% of the signal $S_{WB}$ generated by the wide band detector 112W. In reality, $S_{NB}$ will be closer to 100 times smaller due to the absorption of a significant amount of IR energy by the narrow band filter window 1408N. This reduction in IR energy absorption is compensated for with additional gain in the amplification circuit of the narrow band signal $S_{NB}$. In this example, for a 20% concentration of the gas, $C_G$ in the air path, the output signal $S_{NB}$ from the narrow band decreases by approximately 40%, while the output signal $S_{WB}$ from the wide band decreases by approximately 4%. The actual value of interest is the ratio of the narrow band to the wide band output signals, $S_{NB}/S_{WB}$. This ratio, $S_{NB}/S_{WB}$, is directly proportional to the concentration of the gas or vapor present in the air path.

The ratio of the narrow band to the wide band output signals $S_{NB}/S_{WB}$ can be calculated by the processor 1106 in several ways. Typically, this ratio $S_{NB}/S_{WB}$ is calculated by comparing the average of the instantaneous narrow band peak values to the average of the instantaneous wide band peak values over a given time period. Alternatively, this ratio $S_{NB}/S_{WB}$ can be calculated by averaging the ratios $S_{NB}/S_{WB}$ based on the instantaneous narrow band peak values to the instantaneous wide band peak values over a given time period. The ratio $S_{NB}/S_{WB}$ can also be calculated based on unaveraged instantaneous peak values. The different methods of calculating the ratios are considered depending upon the responsivity required for the particular application. Greater responsivity to the presence of a gas might be desired for application in a home environment as opposed to an industrial environment, for example.

The normalized signal ratio $S_{NB}/S_{WB}$ is presented so that all of the data can appear on one chart. The signal ratio $S_{NB}/S_{WB}$ typically is characterized by one or more thresholds. A signal ratio $S_{NB}/S_{WB}$ significantly less than 1 represents the presence of a gas or vapor. An alert threshold, $T_{ALERT}$, indicates a possible problem and an alarm threshold, $T_{ALARM}$, indicates an emergency. For example, the LEL (lower explosion level) of methane gas is approximately 4% i.e. the percentage of gas necessary to cause an explosion, $T_{LEL}$. Lower percentages will only cause a flame. Therefore, an alert threshold $T_{ALERT}$ of 20% of the LEL or $C_G$=0.8% gas and an alarm threshold $T_{ALARM}$ of 50% of the LEL or $C_G$=2% gas would be reasonable. The actual value of the thresholds is dependent upon the requirements of the application. Likewise, for carbon monoxide, danger levels are determined by PPM (parts per million) of gas. Again the limits are dependent upon application, where permissible levels in a commercial environment would be higher than those levels permissible in residential or educational environments.

Figure 20B:
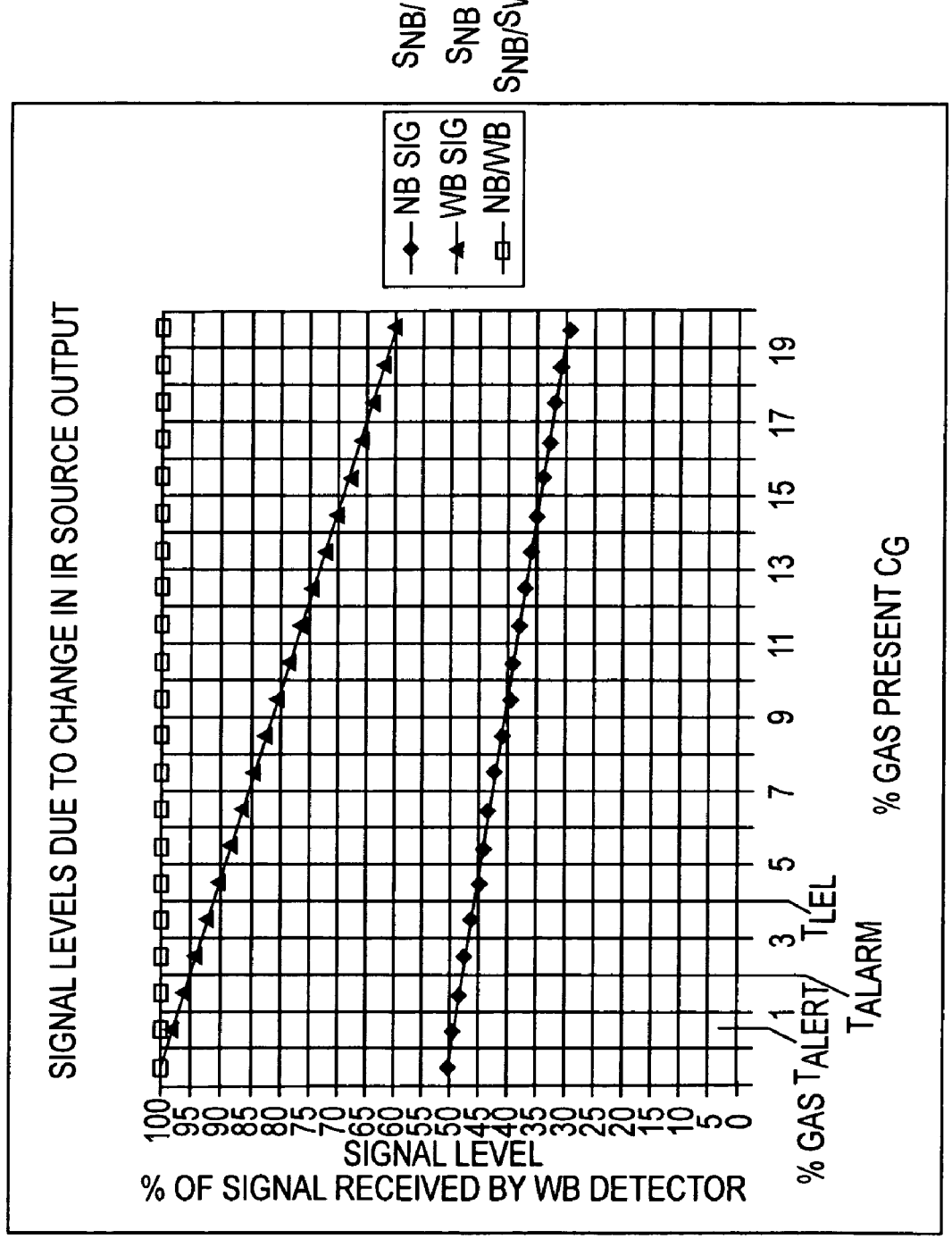
FIG. 20B illustrates signal levels detected by both narrow band and wide band detectors due to change in IR source output or ambient IR noise levels.

FIG. 20B is a graph representing the output signals $S_{NB}$ and $S_{WB}$ generated by the narrow band and wide band IR detectors 112N and 112W, respectively, in the presence of a gas, as affected by changes in output from IR energy source 1412. The basis for calculating the ratio $S_{NB}/S_{WB}$ is the same as discussed previously with respect to FIG. 20A. The processor 1106 calculates the ratio $S_{NB}/S_{WB}$ for self calibration with respect to changes in the IR energy which reach the top surface of the filter windows 108W and 1408N that are caused by changes in intensity of the IR source 1412 or ambient lighting. For example, a 10% decrease in the output power of the IR source 1412 would translate to 10% lower signals $S_{NB}$ and $S_{WB}$ from the narrow band and wide band detectors 112N and 112W, respectively. However, the ratio of the signal $S_{NB}/S_{WB}$ from the two detectors does not change significantly. Therefore, the processor 1106 can monitor and self calibrate the narrow band and wide band detector 112N and 112W respectively by observing how close the ratio $S_{NB}/S_{WB}$ is to 1.

Figure 21A:
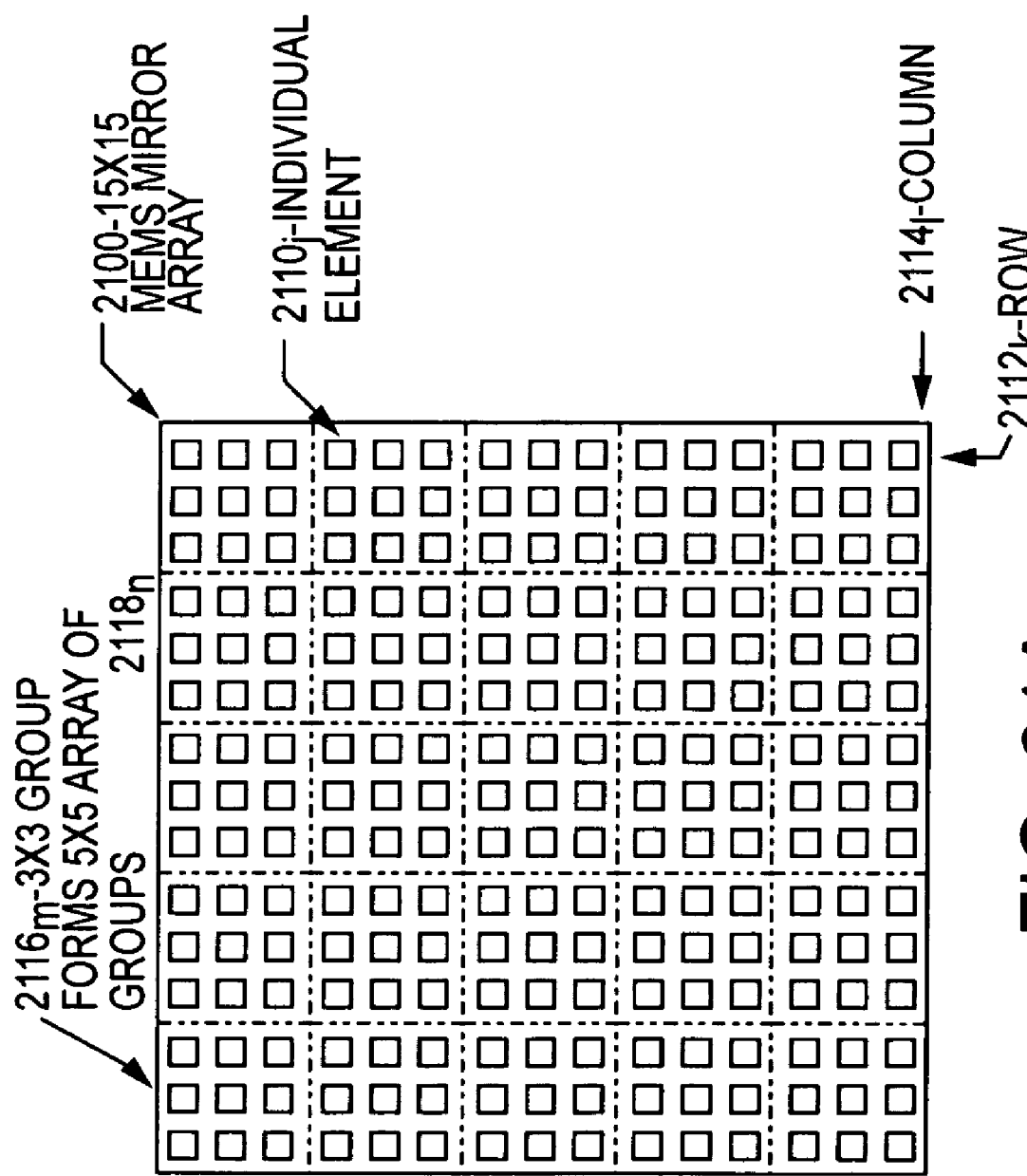
FIG. 21A illustrates a plan view of a MEMS mirror array incorporating MEMS mirror elements of FIG. 9.

FIG. 21A illustrates a plan view of MEMS mirror array 2100, which is comprised of individual mirror elements $2110_j$ that are arranged in rows $2112_k$ and columns $2214_j$. In the example shown, a 3×3 arrangement of elements $2110_j$ forms a 3×3 group $2116_m$ within a 5×5 array of groups $2118_n$. Therefore, the MEMS mirror array 2100 is a 15×15 array.

As discussed previously with respect to FIG. 9, MEMS mirrors generally operate in two different modes. In the first mode, the MEMS mirror array 2100 operates with mirror elements $2110_j$ operating between start and end positions in a manner of operation similar to that of a mechanical relay. That is, in the first mode, the start and end position are fixed, and the MEMS mirror array 2100 is either in an unactuated or actuated mode. Once a control signal is applied, the MEMS mirror active elements move rapidly to the end or final position. In the second mode, the MEMS mirror 2100 operates with a smooth transition across the angular adjustment, or a series of angular steps can be effected. Also, the range of motion is limited to a specified angle, say +20 to 0 degrees. This range of motion provides a 40 degree field of view, FOV 440.

FIG. 21B-1 illustrates how an IR ray 2120 hitting the active area of an unactuated individual MEMS mirror element 2110$_j$ is reflected as a ray 2122 at an angle η. In the example shown, η$_i$ in the unactuated or initial position=40°.

FIG. 21B-2 illustrates how the IR ray 2120 hitting the active area of now actuated individual MEMS mirror element 2110$_j$ is reflected as ray 2122 at angle η where, in the example shown, η$_f$ in the actuated or final position=80°. That is, there occurs twice the angular movement (η$_f$-η$_i$) of the element 2110$_j$ from its unactuated position in FIG. 21B-1, to its actuated position in FIG. 21B-2, i.e., 20 degrees of angular movement of the MEM's mirror element provides a reflected beam movement of 40 degrees from the initial angle η$_i$=40° to the final angle η$_f$=80°.

Figure 21C:
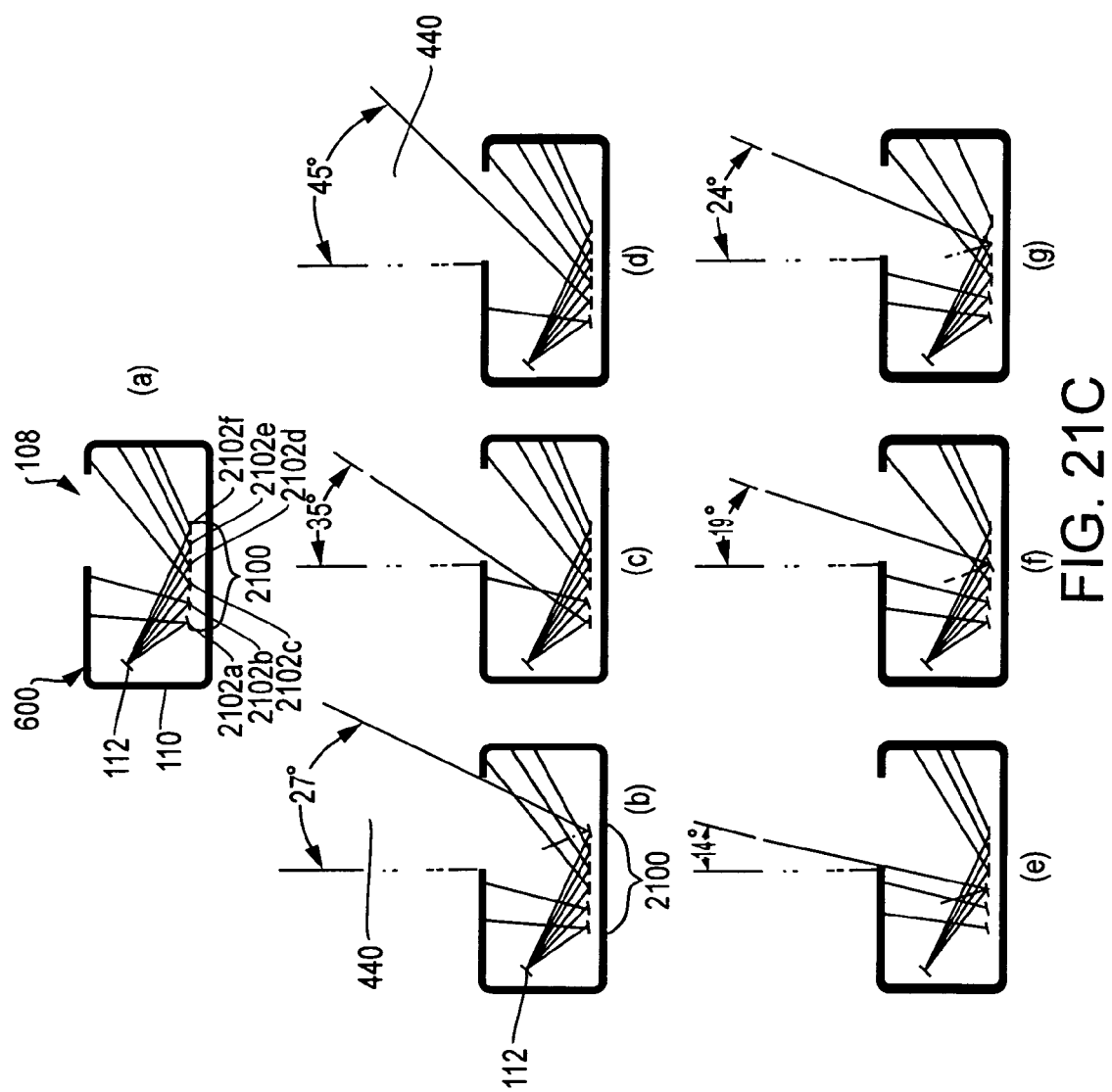
FIG. 21C illustrates an IR ray trace for a MEMS device which has only a start and an end position.

FIG. 21C illustrates an IR ray trace for a MEMS mirror device which is comprised of elements each capable of operating between only a start and an end position. By manipulating only portions of the start and end mirror array 2100 at any given time, discrete steps can be created with a MEMS mirror device which comprises mirror elements 2102a through 2102f that are only capable of being actuated between a start and end position. The actual orientation of the detector assembly 600 is the same as shown in FIG. 12. In the example (a), rows of active elements 2102a and 2102b are at the +20° position and the four rows of elements 2102c through 2102f at the 0° position with none of the elements viewing through the port 705 outside of the detector housing cover 110. In (e), the three rows of mirror elements 2102a through 2102c are moved to the +20° position with a beam pointed at 14° from the normal to the detector housing cover 110 and coming from element 2102c, thereby viewing outside the detector housing cover 110 through IR filter window 108. The opening in detector assembly 600 for the IR filter window 108 is in reality an optical field stop. In (f), the third row 2102c is returned to the 0° position and the fourth row 2102d is moved to the +20° position with a beam pointing at 19° from the normal to the detector housing cover 110 and coming from element row 2102d. For clarity, the IR filter 108 is not shown in the detector housing cover 110.

Figure 22:
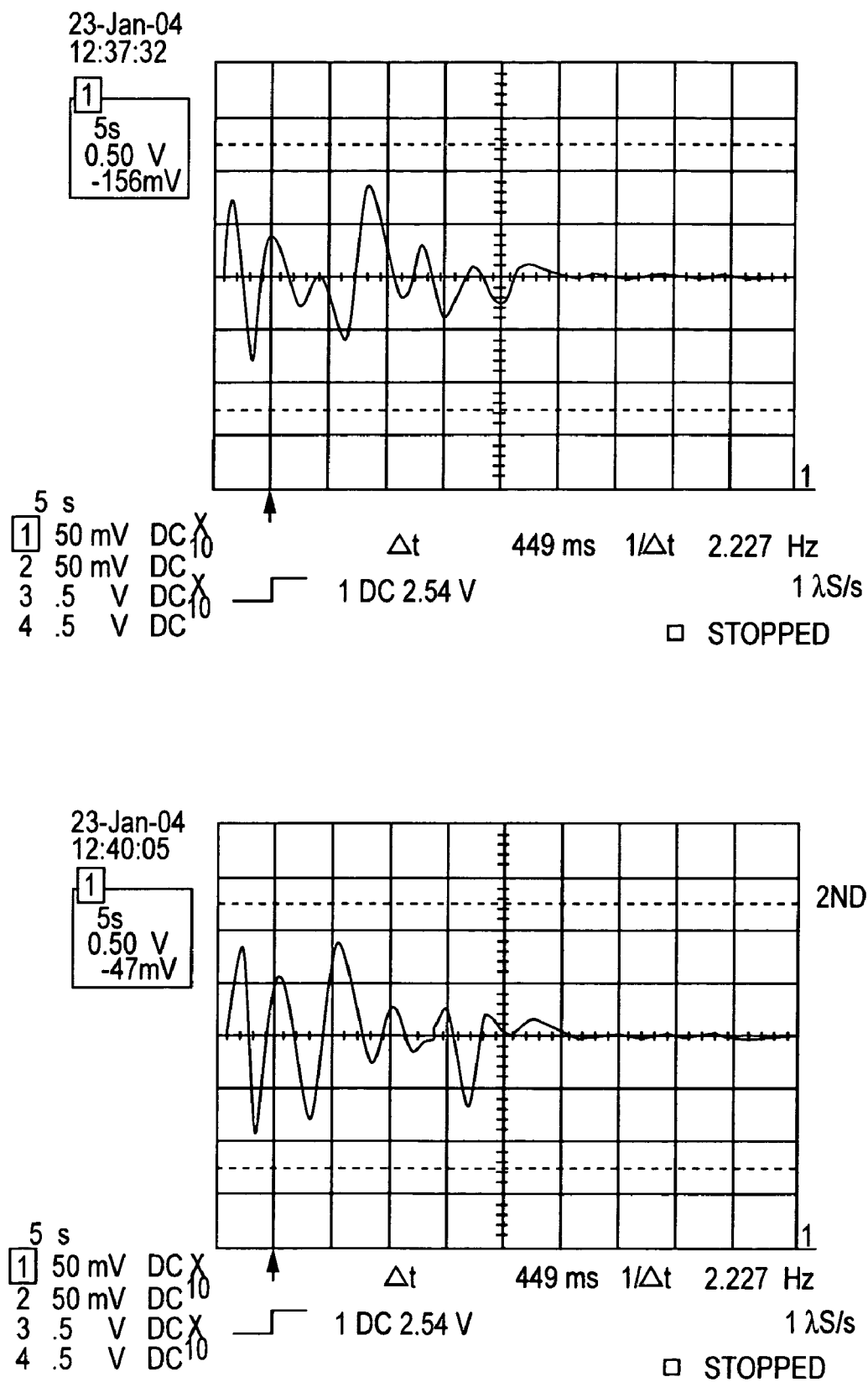
FIG. 22 illustrates actual electrical output from a mockup simulation of the non-chopping (sweeping) mode of the passive IR sensor of FIG. 16A1.

FIG. 22 illustrates actual electrical output from a mockup simulation of the non-chopping (or simulated sweeping) scan of the passive IR sensor of the present invention illustrated in FIG. 16A1.

As can be appreciated from the previous discussions, there are four modes of operation for motion detection:

(1) a large number of steps or a continuous movement of the MEMS mirror array simulating a sweep or a non-chopping scan;

(2) a finite number of discrete steps in which each lens element is evaluated one at a time;

(3) a chopping scan with a large number of steps or a continuous movement of the MEMS mirror array;

(4) a chopping scan with a finite number of discrete steps.

Therefore, FIG. 22 represents scan output from the first mode of operation.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A space safety apparatus monitoring a volume of space encompassing a field of view (FOV), said space safety apparatus comprising:
    a focusing element for focusing an infra-red (IR) energy beam collected from within the volume of space;
    a filter element for filtering the infra-red (IR) energy collected from within the volume of space;
    a micro electro-mechanical system (MEMS) having mirror elements in a mirror array for reflecting the IR energy beam;
    an IR energy detector for detecting the IR energy reflected by said MEMS array and converting the IR energy to an output signal;
    an amplifier for amplifying the output signal;
    an analog to digital converter for converting the output signal from analog to digital;
    a processor for processing the output signal;
    a memory storage for storing the output signal;
    a controller for adjusting an angle of at least one mirror element of said MEMS mirror array; and
    an alarm for annunciating detection of an intrusion resulting from a change in amplitude of the output signal corresponding to a change in amplitude of the IR energy beam.

2. The space safety apparatus of claim 1, wherein the output signal is one of electrical, magnetic, optical, acoustical, pneumatic and hydraulic pressure.

3. The space safety apparatus of claim 1, wherein said controller adjusts an angle by varying a control signal to said at least one mirror element of said MEMS mirror array.

4. The space safety apparatus of claim 3, wherein the control signal is one of electrical, magnetic, optical, acoustical, pneumatic and hydraulic pressure.

5. The space safety apparatus of claim 4, wherein said the control signal is electrical and said controller varies voltage or current of said electrical signal to said MEMS mirror array to cause motion of at least one mirror element of said MEMS mirror array.

6. The space safety apparatus of claim 5, whereby said varying voltage or current causes motion by at least one of thermal expansion and electrostatic force.

7. The space safety apparatus of claim 1, wherein said controller derives a reference signal by switching said MEMS mirror array between the FOV and an IR reference.

8. The space safety apparatus of claim 7, wherein said controller actuates said MEMS mirror array to traverse the FOV of said IR apparatus by traversing the FOV in a chopping mode.

9. The space safety apparatus of claim 8, whereby said traversing of the FOV in a chopping mode is achieved by traversing the FOV in incremental, overlapping steps.

10. The space safety apparatus of claim 8, whereby said traversing of the FOV in a chopping mode is achieved by traversing the FOV in discrete, finite steps.

11. The space safety apparatus of claim 1, wherein said controller actuates said MEMS mirror array to traverse the FOV of said IR space safety apparatus by traversing the FOV in a non-chopping mode.

12. The space safety apparatus of claim 11, whereby said traversing of the FOV in a non-chopping mode is achieved by traversing the FOV in incremental, overlapping steps.

13. The space safety apparatus of claim 11, whereby said traversing of the FOV in a non-chopping mode is achieved by traversing the FOV in discrete, finite steps.

14. The space safety apparatus of claim 1, further comprising an IR source providing a reference value for detecting at least one of tampering with and degradation of said space safety apparatus.

15. The space safety apparatus of claim 1, wherein said MEMS mirror array is comprised of mirror elements each capable of rotation to simulate a finite element representation of a curved mirror.

16. The space safety apparatus of claim 1, wherein said MEMS mirror array is comprised of mirror elements configured to simulate a finite element representation of a flat mirror.

17. The space safety apparatus of claim 1, wherein a detector assembly comprises:
said filter element;
said MEMS mirror array disposed on a ceramic substrate; and
said IR energy beam detector disposed to detect the IR beam reflected by said MEMS array.

18. The space safety apparatus of claim 17, wherein said detector assembly further comprises:
a detector assembly housing enclosing at least said filter element;
said MEMS mirror array disposed on a ceramic substrate;
said IR energy beam detector disposed to detect the IR beam reflected by said MEMS array; and
a detector assembly housing base for coupling to said detector assembly housing.

19. The space safety apparatus of claim 18, wherein said detector assembly housing base further comprises at least four pins for coupling to a printed circuit board.

20. The space safety apparatus of claim 19, wherein one of said pins receives power, one of said pins is a ground, one of said pins sends a signal, and one of said pins provides MEMS mirror array control signal.

21. The space safety apparatus of claim 17, wherein said detector assembly is coupled to a printed circuit board.

22. The space safety apparatus of claim 21, wherein said printed circuit board comprises:
said amplifier;
said analog to digital converter;
said processor;
said memory storage;
said controller for adjusting an angle of at least one mirror element of said MEMS mirror array; and
said alarm for annunciating detection of an intrusion.

23. The space safety apparatus of claim 22, wherein said printed circuit board and said detector assembly are disposed within an enclosure housing and disposed on an enclosure base for coupling to said enclosure housing such that said MEMS mirror array within said detector assembly can receive the IR energy beam through a window within said enclosure housing.

24. The space safety apparatus of claim 23, wherein said detector assembly is disposed on said printed circuit board such that said MEMS mirror array within said detector assembly is parallel to said printed circuit board and said printed circuit board is disposed at an angle of about 30° to 45° with respect to said enclosure base.

25. The space safety apparatus of claim 23, wherein said window is comprised of at least one focusing element for focusing the IR energy beam.

26. The space safety apparatus of claim 23, wherein said enclosure housing further comprises an IR source disposed in proximity to said window such that said MEMS mirror array can receive and reflect IR energy from said IR source onto said IR detector elements, said IR source providing a reference value for detecting at least one of tampering with and degradation of said space safety apparatus.

27. The space safety apparatus of claim 17, wherein said detector assembly further comprises a viewing port and said mirror elements of said MEMS mirror array are disposed within the detector assembly.

28. The space safety apparatus of claim 27, wherein said mirror elements are start and end position mirror elements.

29. The space safety apparatus of claim 28, wherein said start and end position mirror elements are configured in rows and columns.

30. The space safety apparatus of claim 29, wherein all rows and columns of said start and end position mirror elements are oriented in start and end positions such that all of said mirror elements view inside said detector assembly housing.

31. The space safety apparatus of claim 30, wherein at least a portion of said rows and columns of said start and end position mirror elements are oriented in start and end positions such that at least a portion of said mirror elements view outside said detector assembly housing.

32. A space safety apparatus monitoring a volume of space encompassing a field of view (FOV), said space safety apparatus for detecting an intrusion within the volume of space, said space safety apparatus comprising:
a plurality of focusing elements for focusing an infra-red (IR) energy beam collected from within the volume of space;
a filter element for filtering the IR energy beam collected from within the volume of space;
a micro-electro-mechanical system (MEMS) mirror array for reflecting the IR energy beam;
an IR signal detector for detecting the IR energy beam reflected by said MEMS array and converting the IR beam to an electrical signal;
an amplifier for amplifying the output signal;
an analog to digital converter for converting the output signal from analog to digital;
a processor for processing the output signal;
a memory storage for storing the output signal;
a controller for adjusting said MEMS array by switching from one to another of said plurality of focusing elements; and
an alarm for annunciating detection of an intrusion resulting from a change in amplitude of the electrical signal corresponding to a change in amplitude of the IR energy beam.

33. The space safety apparatus of claim 32, wherein the output signal is one of electrical, magnetic, optical, acoustical, pneumatic and hydraulic pressure.

34. The space safety apparatus of claim 32, wherein said controller derives a reference signal by switching said MEMS mirror array between the FOV and an IR reference.

35. The space safety apparatus of claim 32, wherein said plurality of focusing elements comprises at least one of (a) a lens element and (b) a mirror focusing element.

36. The space safety apparatus of claim 32, wherein said controller adjusts said MEMS array by switching from one to another of said plurality of focusing elements by traversing the FOV in a non-chopping mode.

37. The space safety apparatus of claim 36, whereby said traversing of the FOV in a non-chopping mode is achieved by traversing the FOV in incremental, overlapping steps.

38. The space safety apparatus of claim 36, whereby said traversing of the FOV in a non-chopping mode is achieved by traversing the FOV in discrete, finite steps.

39. The space safety apparatus of claim 38, wherein said controller actuates said MEMS mirror array to traverse the FOV of said IR detection apparatus by traversing the FOV in a chopping mode.

40. The space safety apparatus of claim 39, whereby said traversing of the FOV in a chopping mode is achieved by traversing the FOV in incremental, overlapping steps.

41. The space safety apparatus of claim 39, whereby said traversing of the FOV in a chopping mode is achieved by traversing the FOV in discrete, finite steps.

42. The space safety apparatus of claim 32, further comprising an IR source providing a reference value for detecting at least one of tampering with and degradation of said intrusion detection apparatus.

43. The space safety apparatus of claim 32, wherein said MEMS mirror array is comprised of mirror elements each capable of rotation to simulate a finite element representation of a curved mirror.

44. The space safety apparatus of claim 32 wherein said MEMS mirror array is comprised of mirror elements configured to simulate a finite element representation of a flat mirror.

45. The space safety apparatus of claim 32 wherein a detector assembly comprises:
   said filter element;
   said plurality of focusing elements;
   said MEMS mirror array disposed on a ceramic substrate; and
   said IR energy beam detector disposed to detect the IR beam reflected by said MEMS array.

46. The space safety apparatus of claim 45, wherein said detector assembly further comprises:
   a detector assembly housing, said detector assembly housing enclosing at least:
   said plurality of focusing elements;
   said filter element;
   said MEMS mirror array disposed on a ceramic substrate;
   said IR energy beam detector disposed to detect the IR beam reflected by said MEMS array; and
   a detector assembly housing base for coupling to said detector assembly housing.

47. The space safety apparatus of claim 46, wherein said detector assembly housing base further comprises at least four pins for coupling to a printed circuit board.

48. The space safety apparatus of claim 47, wherein one of said pins receives power, one of said pins is a ground, one of said pins sends a signal, and one of said pins provides MEMS control signal.

49. The space safety apparatus of claim 47, wherein said detector assembly is coupled to a printed circuit board.

50. The space safety apparatus of claim 47, wherein said printed circuit board comprises:
   said amplifier;
   said analog to digital converter;
   said processor;
   said memory storage;
   said controller; and
   said alarm.

51. The space safety apparatus of claim 50, wherein said printed circuit board and said detector assembly are disposed within an enclosure housing and disposed on an enclosure base for coupling to said enclosure housing such that said MEMS mirror array within said detector assembly can receive the IR energy beam through a window within said enclosure housing.

52. The space safety apparatus of claim 51, wherein said detector assembly is disposed on said printed circuit board such that said MEMS mirror array within said detector assembly is parallel to said printed circuit board and said printed circuit board is disposed at an angle of about 30° to 45° with respect to said enclosure base.

53. The space safety apparatus of claim 51, wherein said window is comprised of a focusing element for focusing the IR energy beam.

54. The space safety apparatus of claim 51, wherein said enclosure housing further comprises an IR source disposed in proximity to said window such that said MEMS mirror array can receive and reflect IR energy from said IR source onto said IR detector elements, said IR source providing a reference value for detecting at least one of tampering with and degradation of said intrusion detection apparatus.

55. The space safety apparatus of claim 45, wherein said detector assembly further comprises a viewing port and said mirror elements of said MEMS mirror array are disposed within the detector assembly.

56. The space safety apparatus of claim 55, wherein said mirror elements are start and end position mirror elements.

57. The space safety apparatus of claim 56, wherein said start and end position mirror elements are configured in rows and columns.

58. The space safety apparatus of claim 57, wherein all rows and columns of said start and end position mirror elements are oriented in start and end positions such that all of said mirror elements view inside said detector assembly housing.

59. The space safety apparatus of claim 58, wherein at least a portion of said rows and columns of said start and end position mirror elements are oriented in start and end positions such that at least a portion of said mirror elements view outside said detector assembly housing.

60. A method of detecting an intrusion in a volume of space encompassing a field of view (FOV), the method comprising the steps of:
   a) positioning a micro-electro-mechanical system (MEMS) mirror array of rows and columns of mirror elements to reflect an infra-red (IR) energy beam with respect to active elements of an IR detector corresponding to the FOV; and
   b) collecting the IR energy from an ith portion of the FOV at a pre-determined scan rate.

61. The method according to claim 60, wherein the step (b) of collecting the IR energy from an ith portion of the FOV at a pre-determined scan rate comprises the steps of:
   (b'1) focusing the IR energy beam;
   (b'2) filtering the IR energy beam;
   (b'3) reflecting the IR energy beam by the MEMS mirror array onto a detector;
   (b'4) detecting the IR energy beam by means of the detector;
   (b'5) converting the IR energy beam to an output signal;
   (b'6) amplifying the output signal;
   (b'7) converting the output signal from analog to digital; and
   (b'8) processing the output signal by means of a processor prior to annunciating detection.

62. The method of claim 61, wherein the output signal is one of electrical, magnetic, optical, acoustical, pneumatic and hydraulic pressure.

63. The method according to claim 61, further comprising the step of:
   (b'9) controlling the MEMS mirror array to measure all active mirror elements corresponding to the entire field of view by scanning.

64. The method according to claim 61, wherein the step (b) of collecting the IR energy from an ith portion of the FOV includes the steps of at least one of:
- b1') actuating the MEMS mirror to traverse the FOV; and
- b1") directing a signal controller to adjust the MEMS mirror to switch from one to another focusing element of said MEMS mirror array.

65. The method according to claim 64, wherein at least one of the step (b1') of actuating the MEMS mirror to traverse the FOV, and (b1") directing a signal controller to adjust the MEMS mirror to switch from one to another focusing element includes the steps of at least one of:
- b2) traversing the FOV in a non-chopping mode, and
- b3) traversing the FOV in a chopping mode.

66. The method according to claim 65, wherein the step (b2) of traversing the FOV in a non-chopping mode includes the steps of at least one of:
- b2') traversing the FOV in incremental, overlapping steps; and
- b2") traversing the FOV in discrete, finite steps.

67. The method according to claim 65, wherein the step (b3) of traversing the FOV in a chopping mode includes the steps of at least one of:
- b3') traversing the FOV in incremental, overlapping steps; and
- b3") traversing the FOV in discrete, finite steps.

68. The method according to claim 65, wherein said step (b5) of said control signal is electrical and varying of voltage or current causes motion by at least one of thermal expansion and electrostatic force.

69. The method according to claim 65, wherein the step (b2) of traversing the FOV in a non-chopping mode produces an output signal with a peak value such that a shift in the peak value indicates movement of a heat source within the FOV.

70. The method according to claim 65, wherein the step (b3) of traversing the FOV in a chopping mode produces an output signal with a plurality of peak values such that a shift in amplitude of at least one of the plurality of peak values indicates movement of a heat source within the FOV.

71. The method according to claim 64, wherein said focusing element comprises at least one of (a) a lens element; and (b) a mirror focusing element.

72. The method according to claim 60, further comprising the steps of:
- (c) determining whether all active mirror elements corresponding to the entire field of view have been measured by the scan;
- d1) if no, repeating step (b);
- d2) if yes, storing the scan of the field of view;
- e) processing the results of the scan;
- f) determining if an intrusion has been detected based on the results of the scan by detecting a change in the IR energy beam level;
- g1) if yes, annunciating an alarm;
- g2) if maybe, returning to step (b) of collecting IR energy from an ith portion of a field of view (FOV) by re-scanning a limited volume of the space where an intrusion appears to be detected, and
- g3) if no, returning to step (b).

73. The method according to claim 72, wherein the step of
(g2) of re-scanning a limited volume of the space where an intrusion appears to be detected includes the steps of at least one of:
- g2') re-scanning at the pre-determined scan rate; and
- g2") re-scanning at a different scan rate.

74. The method according to claim 60, wherein the step (b) of collecting the IR energy from an ith portion of the FOV includes the step of:
- b4) adjusting an angle of at least one mirror element of said MEMS mirror array.

75. The method according to claim 74, wherein the step (b4) of adjusting an angle includes the step of:
- b5) varying a control signal to said at least one mirror element of said MEMS mirror array.

76. The method according to claim 75, wherein the step (b5) of varying a control signal to said at least one mirror element of said MEMS mirror array causes motion of said at least one mirror element of said MEMS mirror array.

77. The method of detecting an intrusion in a volume of space according to claim 60, wherein said mirror elements are start and end position mirror elements disposed in a detector assembly housing having an IR filter window for viewing outside said detector assembly housing, said method comprising the step of:
orienting in start and end positions all rows and columns of said mirror elements to view inside said detector assembly housing.

* * * * *